(12) United States Patent
Takahashi et al.

(10) Patent No.: US 9,569,821 B2
(45) Date of Patent: Feb. 14, 2017

(54) IMAGE PROCESSING DEVICE, IMAGE PROCESSING METHOD, AND PROGRAM

(71) Applicant: Sony Corporation, Tokyo (JP)

(72) Inventors: Hiroaki Takahashi, Tokyo (JP); Tomoo Mitsunaga, Kanagawa (JP); Masaki Handa, Kanagawa (JP); Haruka Asai, Tokyo (JP); Shin Yoshimura, Kanagawa (JP); Yasushi Shibata, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 14/760,266

(22) PCT Filed: Dec. 20, 2013

(86) PCT No.: PCT/JP2013/084201
§ 371 (c)(1),
(2) Date: Jul. 10, 2015

(87) PCT Pub. No.: WO2014/112291
PCT Pub. Date: Jul. 24, 2014

(65) Prior Publication Data
US 2016/0125575 A1 May 5, 2016

(30) Foreign Application Priority Data
Jan. 17, 2013 (JP) .................................. 2013-006218

(51) Int. Cl.
*G06K 9/40* (2006.01)
*G06T 5/00* (2006.01)
(Continued)

(52) U.S. Cl.
CPC ............. *G06T 5/002* (2013.01); *G06K 9/6202* (2013.01); *G06K 9/6267* (2013.01); *G06T 5/50* (2013.01);
(Continued)

(58) Field of Classification Search
CPC ...... H04N 1/387; H04N 1/4074; H04N 1/409; H04N 3/1587; H04N 5/20; H04N 5/23232; H04N 5/235; H04N 5/2355; H04N 5/2351; H04N 5/2352; H04N 5/243; H04N 5/35536; G06K 9/6202; G06K 9/6207; G06T 5/002; G06T 5/004; G06T 5/009; G06T 5/20; G06T 5/40; G06T 5/50; G06T 7/003; G06T 2207/20032; G06T 2207/20208; G03B 37/02
See application file for complete search history.

(56) References Cited

U.S. PATENT DOCUMENTS

2003/0214600 A1* 11/2003 Kido ...................... H04N 5/235
348/362
2007/0014551 A1* 1/2007 Fujisawa ................ G03B 37/02
396/20
2009/0284618 A1 11/2009 Kurahashi et al.

FOREIGN PATENT DOCUMENTS

JP 2001-245213 A 9/2001
JP 2004-254151 A 9/2004
(Continued)

*Primary Examiner* — Jose Couso
(74) *Attorney, Agent, or Firm* — Wolf, Greenfield & Sacks, P.C.

(57) ABSTRACT

An image on which a noise reduction and a dynamic range expansion process have been performed is generated by a sequential synthesis process using continuous-photographed images of different exposure conditions. The continuous-photographed images of different exposure conditions are input, configuration pixels of an input image and an inter- (Continued)

mediate synthetic image are classified into a noise pixel, an effective pixel, or a saturation pixel, a synthesis processing method of a pixel unit is decided according to a combination of pixel classification results of the corresponding pixels, and the intermediate synthetic image is updated according to the decided method. A 3DNR process is performed when at least one of the corresponding pixels of the input image and the intermediate synthetic image is the effective pixel, the pixel value of the intermediate synthetic image is output without change when both of the corresponding pixels of the input image and the intermediate synthetic image are the saturation pixel or the noise pixel, and the 3DNR process is performed or the pixel value of the intermediate synthetic image is output when one is the saturation pixel, and the other is the noise pixel.

12 Claims, 31 Drawing Sheets

(51) Int. Cl.
*H04N 1/409* (2006.01)
*H04N 1/387* (2006.01)
*G06T 5/50* (2006.01)
*H04N 5/235* (2006.01)
*G06K 9/62* (2006.01)
*G06T 7/00* (2006.01)

(52) U.S. Cl.
CPC ............... *G06T 7/003* (2013.01); *H04N 1/387* (2013.01); *H04N 1/409* (2013.01); *H04N 5/2355* (2013.01); *G06T 2207/10144* (2013.01); *G06T 2207/20208* (2013.01); *G06T 2207/20216* (2013.01); *G06T 2207/20221* (2013.01)

(56) References Cited

FOREIGN PATENT DOCUMENTS

| JP | 2006-311240 A | 11/2006 |
| JP | 2007-049227 A | 2/2007 |
| JP | 2008-160881 A | 7/2008 |
| JP | 2009-276956 A | 11/2009 |
| JP | 2010-041200 A | 2/2010 |
| JP | 2012-151732 A | 8/2012 |

\* cited by examiner

FIG. 12
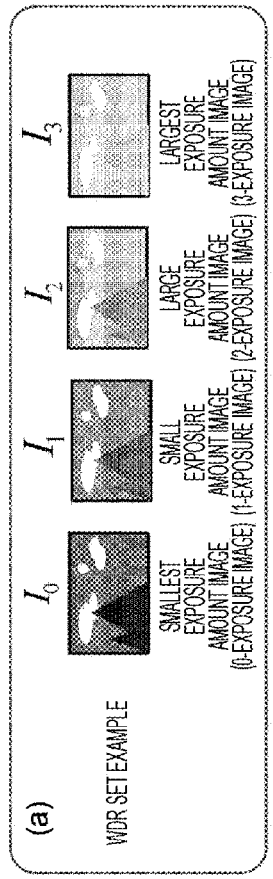
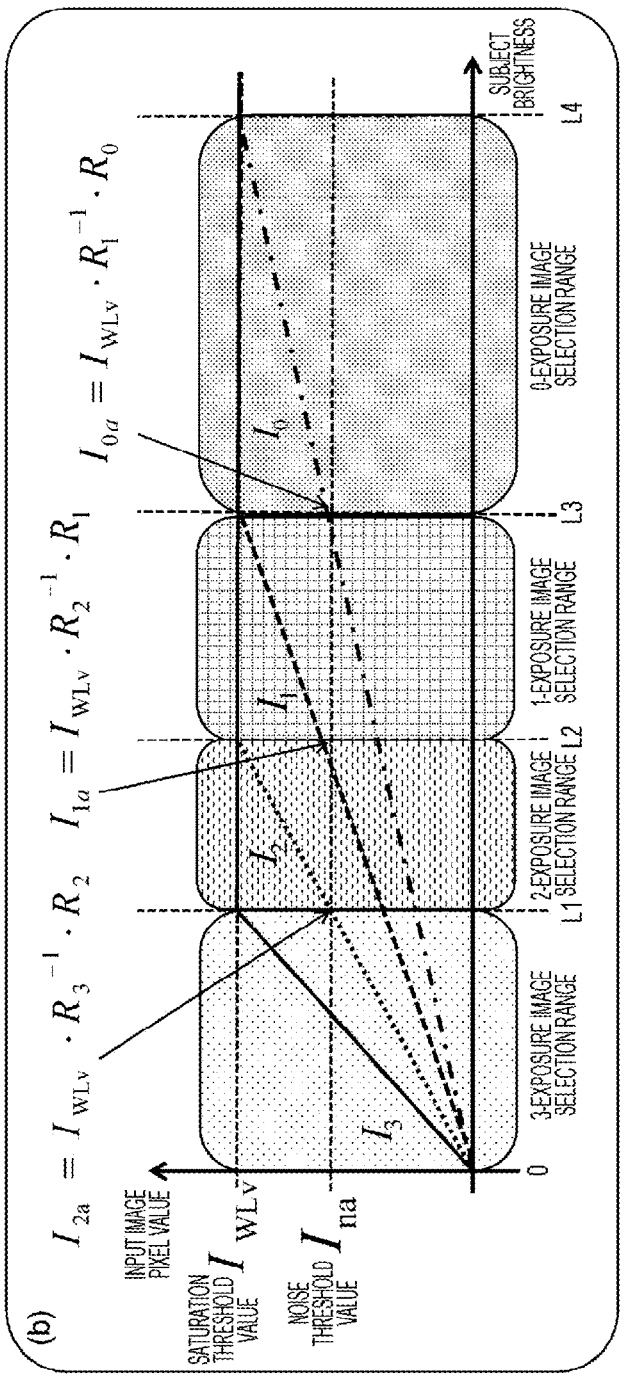

FIG. 15

| INTERMEDIATE SYNTHETIC IMAGE | INPUT IMAGE | | |
|---|---|---|---|
| | SATURATION | EFFECTIVE | NOISE |
| SATURATION | INTERMEDIATE SYNTHETIC IMAGE OUTPUT | 3DNR | — |
| EFFECTIVE | 3DNR | 3DNR | 3DNR |
| NOISE | — | 3DNR | INTERMEDIATE SYNTHETIC IMAGE OUTPUT |

| INTERMEDIATE SYNTHETIC IMAGE | | INPUT IMAGE | | |
|---|---|---|---|---|
| | | SATURATION | EFFECTIVE | NOISE |
| | SATURATION | INTERMEDIATE SYNTHETIC IMAGE OUTPUT | 3DNR | 3DNR |
| | EFFECTIVE | 3DNR | 3DNR | 3DNR |
| | NOISE | 3DNR (clip) | 3DNR | INTERMEDIATE SYNTHETIC IMAGE OUTPUT |

(b)

| INTERMEDIATE SYNTHETIC IMAGE | | INPUT IMAGE | | |
|---|---|---|---|---|
| | | SATURATION | EFFECTIVE | NOISE |
| | SATURATION | INTERMEDIATE SYNTHETIC IMAGE OUTPUT | 3DNR | INTERMEDIATE SYNTHETIC IMAGE OUTPUT |
| | EFFECTIVE | 3DNR | 3DNR | 3DNR |
| | NOISE | 3DNR (clip) | 3DNR | INTERMEDIATE SYNTHETIC IMAGE OUTPUT |

(c)

| INTERMEDIATE SYNTHETIC IMAGE | | INPUT IMAGE | | |
|---|---|---|---|---|
| | | SATURATION | EFFECTIVE | NOISE |
| | SATURATION | INTERMEDIATE SYNTHETIC IMAGE OUTPUT | 3DNR | 3DNR |
| | EFFECTIVE | 3DNR | 3DNR | 3DNR |
| | NOISE | INTERMEDIATE SYNTHETIC IMAGE OUTPUT | 3DNR | INTERMEDIATE SYNTHETIC IMAGE OUTPUT |

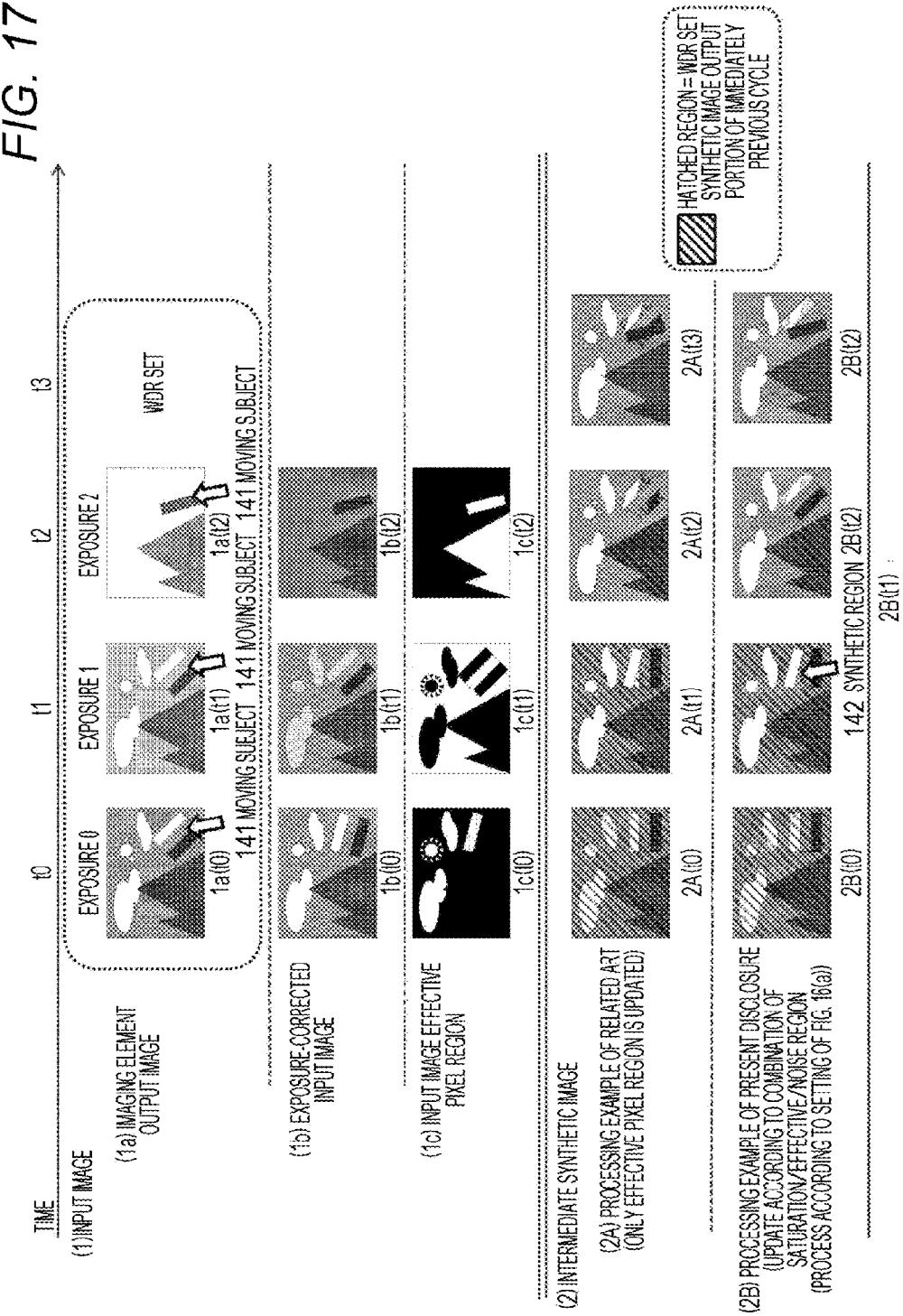

FIG. 28
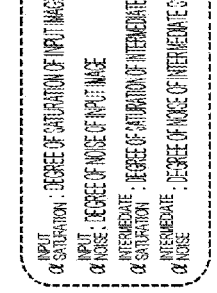
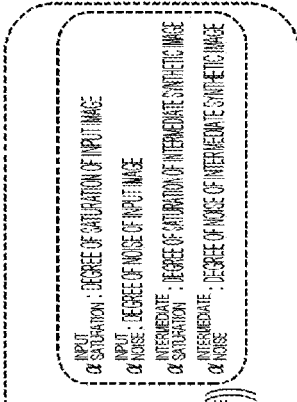

IMAGE PROCESSING DEVICE, IMAGE PROCESSING METHOD, AND PROGRAM

CROSS-REFERENCE TO RELATED APPLICATIONS

This application is a National Stage of International Application No. PCT/JP2013/084201, filed in the Japanese Patent Office as a Receiving office on Dec. 20, 2013, which claims priority to Japanese Patent Application Number 2013-006218, filed in the Japanese Patent Office on Jan. 17, 2013, each of which is hereby incorporated by reference in its entirety.

TECHNICAL FIELD

The present disclosure relates to an image processing device, an image processing method, and a program. Particularly, the present disclosure relates to an image processing device, an image processing method, and a program in which, for example, a noise reduction process or a dynamic range expansion process of an image is performed by a synthesis process of a plurality of images.

BACKGROUND ART

A synthesis process using a plurality of continuously photographed images is known to be effective as an image noise reduction (NR) process. Specifically, a pixel value in which noise is reduced is calculated by detecting a corresponding pixel serving as a photographing pixel region of the same subject from a plurality of continuously photographed images and performing, for example, a synthesis process of averaging pixel values of a plurality of corresponding pixels.

A technique of performing noise reduction by continuously photographed images is a process using three-dimensional (3D) data in which a plurality of images at different photographing times as well as a two-dimensional region of one image are included, that is, an image in a time axis direction is also added and thus referred to as a 3D noise reduction process, that is, three-dimensional noise reduction (3DNR).

FIG. 1 illustrates an exemplary configuration of a device that performs an image noise reduction process using the 3DNR.

A 3DNR processing unit 20 illustrated in FIG. 1 sequentially receives input images 11 serving as images photographed by a camera. For example, the input images 11 are continuously photographed images each of which includes noise as indicated by an input image sequence in FIG. 1(a).

The 3DNR processing unit 20 receives the input image 11 and an intermediate synthetic image 12 generated based on a previous input image, and calculates a synthetic ratio ($\alpha$) of corresponding pixels of the two images through a synthetic ratio ($\alpha$) calculating unit 21.

For example, in the case of a static region, averaging is performed in a state in which an addition ratio of pixel values of corresponding pixels of the input image 11 and the intermediate synthetic image 12 is set to 1:1. A ratio at which added noise is smallest in terms of a noise estimation value of each pixel may be caused as the addition ratio. In the case of a moving region, a synthetic ratio calculation in which a synthetic ratio is set such that the addition ratio of the pixel value of the input image 11 is increased is performed.

For example, it may be determined whether or not a corresponding region is a moving region by comparing a sum of absolute differences (SAD) of pixel values of pixel regions at corresponding positions of respective images with a noise level. In other words, when a differential value is sufficiently larger than a noise level of a target pixel, a corresponding subject can be regarded as a moving subject.

A process of generating an output image based on a plurality of continuously photographed images is used in a dynamic range-expanded image generation process using continuous-photographed images of different exposure conditions as well as the noise reduction process. The dynamic range-expanded image is an image in which high accuracy pixel values are set from a low brightness region to a high brightness region and referred to a wide dynamic range (WDR) image.

A process of generating a WDR image using continuous-photographed images of different exposure conditions is performed as a process of continuously photographing a small exposure amount image having a small exposure amount and a large exposure amount image having a large exposure amount, selectively using or combining (blending) effective pixel values included in the respective images, and setting pixel values of an output image. Through this process, it is possible to generate the WDR image in which effective pixel values are set from a low brightness region to a high brightness region.

Specifically, pixel values of an image having a small exposure amount (a small exposure amount image) are preferentially used for a saturation pixel region included in an image having a large exposure amount (a large exposure amount image), and pixel values of a large exposure amount image is preferentially used for a noise region of a small exposure amount image. By combining a plurality of images having different exposure amounts, it is possible to generate a dynamic range-expanded image in which high-accuracy effective pixel values are set from a low brightness region to a high brightness region. At this time, a method of changing an exposure amount may be implemented, for example, by a method of changing an exposure period of time, a method of changing an F value (diaphragm), or a method of inserting a neutral density filter having a different light transmittance each time of photographing. Further, an exposure amount may be changed by a combination of the above-mentioned methods.

FIG. 2 illustrates an exemplary configuration of a device that performs a WDR image generation process.

A WDR processing unit 40 illustrated in FIG. 2 sequentially receives input image 31 serving as an image photographed by a camera. For example, the input images 31 are continuous-photographed images of different exposure conditions as indicated in an input image sequence in FIG. 2(a).

FIG. 2(a) illustrates an image sequence of continuous-photographed images of exposure conditions R1 to R4 as an exemplary input image sequence.

The exposure amounts of the images have the following magnitude relation:

R1<R2<R3<R4

For example, images of four different types of exposure conditions are regarded as one WDR set, and one WDR image is generated by combining configuration images of the WDR set and output. When a moving image is photographed, the WDR sets of the exposure conditions R1 to R4 are consecutively acquired, and one WDR image is sequentially generated from each WDR set. A frame rate of an output image is lower than a frame rate of a photographed image, but the output image becomes a wide dynamic range image in which high-accuracy pixel values are set from a low brightness region to a high brightness region.

The WDR processing unit 40 illustrated in FIG. 2 receives the input image 31 and an intermediate synthetic image 32 generated based on a previous input image, and calculates a synthetic ratio (α) of corresponding pixels of the two images through a synthetic ratio (α) calculating unit 41.

As described above, when the WDR image is generated, pixel values of a small exposure amount image having a small exposure amount are preferentially used for a saturation pixel region included in a large exposure amount image having a large exposure amount, and pixel values of a large exposure amount image having a large exposure amount are preferentially used for a noise region in a small exposure amount image having a small exposure amount.

The synthetic ratio (α) calculating unit 41 detects a pixel region having an effective pixel value and a saturation region or an ineffective region having large noise in the input image 31 according to the exposure amount of the input image 31, and sets a synthetic ratio of the pixel value of the input image 31 to be higher than that of the pixel value of the intermediate synthetic image 32 for the effective pixel value region. On the other hand, for the ineffective region, the synthetic ratio of the pixel value of the input image 31 is set to be lower than that of pixel value of the intermediate synthetic image 32.

A synthesis processing unit 42 performs the process of synthesizing pixel values of corresponding pixels of the input image 31 and the intermediate synthetic image 32 according to the synthetic ratio (α) calculated by the synthetic ratio calculating unit 41, and generates a WDR output image 33.

The image generated by the synthesis processing unit 42 is used as a next intermediate synthetic image 32 until processing of one WDR set unit ends and then output as the WDR output image 33 when processing of one WDR set unit ends.

Both the noise reduction process described above with reference to FIG. 1 and the WDR image generation process described above with reference to FIG. 2 are necessary to acquire a high-quality output image, and a device that sequentially performs the two processes has been proposed.

As documents disclosing a configuration of performing a noise reduction process and a wide dynamic range process together through an image synthesis process, there are, for example, Patent Document 1 (Japanese Patent Application Laid-Open No. 2010-041200), Patent Document 2 (Japanese Patent Application Laid-Open No. 2008-160881), Patent Document 3 (Japanese Patent Application Laid-Open No. 2007-049227), and Patent Document 4 (Japanese Patent Application Laid-Open No. 2006-311240).

An exemplary configuration of a device that performs two processes, the noise reduction process described above with reference to FIG. 1 and the WDR image generation process described above with reference to FIG. 2, will be described with reference to FIGS. 3 and 4.

FIG. 3 illustrates an exemplary configuration of an image processing device in which a 3DNR processing unit 53 performing noise reduction functions as a preceding processing unit, and a WDR processing unit 57 performing wide dynamic range image generation functions as a subsequent processing unit.

On the other hand, FIG. 4 illustrates an exemplary configuration of an image processing device in which a WDR processing unit 65 performing wide dynamic range image generation functions as a preceding processing unit, and a 3DNR processing unit 67 performing noise reduction functions as a subsequent processing unit.

In both configurations, input images 51 and 61 are a repeated input of continuous-photographed images set to different exposure conditions, that is, a repeated input of a WDR set including continuous-photographed images set to different exposure conditions illustrated in FIG. 2(a).

Here, a problem lies in that the 3DNR processing unit performing the noise reduction has to perform a synthesis using a plurality of images of the same exposure condition, and the WDR processing unit performing the wide dynamic range image generation has to perform a synthesis process of synthesizing a plurality of images of different exposure conditions.

In the configuration illustrated in FIG. 3, the 3DNR processing unit 53 performing the noise reduction functions as the preceding processing unit, and includes frame memories a to d that store images having four different exposure amounts R1 to R4 illustrated in FIG. 2(a), respectively.

The frame memories have a double buffer configuration including memories 54a to 54d and memories 56p to 56s, respectively.

In other words, each of a set of the memory 54a and the memory 56p, a set of the memory 54b and the memory 56q, a set of the memory 54c of the memory 56r, and a set of the memory 54d and the memory 56s has a double buffer configuration, and performs reading and writing alternately.

For example, the image of the exposure condition R1 is written in the frame memory a 54a, and images of an immediately previous WDR set are read from the frame memory p 56p.

Thereafter, the image of the exposure condition R1 is written in the frame memory p 56p, and images of an immediately previous WDR set are read from the frame memory a Ma.

The writing and the reading are alternately performed as described above.

Similarly, the image of the exposure condition R2 uses the frame memory b 54b and the frame memory q 56q.

The image of the exposure condition R3 uses the frame memory c 54c and the frame memory r 56r.

The image of the exposure condition R4 uses the frame memory d 54d and the frame memory s 56s.

A setting is performed as described above.

Through the Double buffer configuration, a smooth process can be performed without adjusting a write timing and a read timing.

The 3DNR processing unit 53 serving as the preceding processing unit selectively reads a synthetic image based on a previous input image having the same exposure condition as an exposure condition of the input image 51 from the frame memory 56, and performs an image synthesis for noise reduction.

Further, the WDR processing unit 57 serving as the subsequent processing unit reads a set (WDR set) of noise-reduced images having different exposure conditions from the frame memories p to q 56p to 56q, performs a synthesis process in which effective pixel regions of each image are preferentially reflected, performs an image wide dynamic range process, and generates one output image.

Through a series of processes described above, an output image that has been subjected to the noise reduction process and the wide dynamic range process, that is, an output image 58 illustrated in FIG. 3 is generated and output.

On the other hand, in the configuration illustrated in FIG. 4, an input image 61 is alternately written in frame memories a to d 63a to 63d and frame memories p to s 64p to 64s according to each exposure condition. The four written images correspond to one WDR set described above with reference to FIG. 2(a).

Further, each of a set of the memory 63a and the memory 64p, a set of the memory 63b and the memory 64q, a set of the memory 63c and the memory 64r, and a set of the memory 63d and the memory 64s has a double buffer configuration, and performs reading and writing alternately.

The images written in the memory are read by the WDR processing unit 65, and one WDR image is generated through the wide dynamic range process using the images.

One WDR image generated in a WDR set unit including the images of a plurality of different exposure conditions by the WDR processing unit 65 is output to the 3DNR processing unit 67 serving as the subsequent processing unit.

The 3DNR processing unit 67 acquires the WDR image input from the WDR processing unit 65 and a previously input WDR image input from a frame memory z 68, performs a synthesis process of synthesizing the two images, and generates and outputs a new noise-reduced image. The output image is rewritten in the frame memory z 68 and output as an output image 69 illustrated in FIG. 4. At this time, the frame memory z may have a double buffer configuration using two frame memories.

In both of the configurations of FIGS. 3 and 4, there is a problem in that an operation circuit portion is increased in size since the synthesis process is independently performed, and a memory capacity necessary to temporarily store a plurality of images is increased.

In the configurations illustrated in FIGS. 3 and 4, the image synthesis process is performed without considering an alignment between images, but when an alignment is considered, a processing configuration is further complicated.

An exemplary configuration including a motion-compensated image generating unit that performs an alignment process of images of a synthesis target is illustrated in FIGS. 5 and 6.

Similarly to the configuration of FIG. 3, FIG. 5 illustrates an exemplary configuration of an image processing device in which a 3DNR processing unit 53 performing noise reduction functions as a preceding processing unit, and a WDR processing unit 57 performing wide dynamic range image generation functions as a subsequent processing unit.

On the other hand, similarly to the configuration of FIG. 4, FIG. 6 illustrates an exemplary configuration of an image processing device in which a WDR processing unit 65 performing wide dynamic range image generation functions as a preceding processing unit, and a 3DNR processing unit 67 performing noise reduction functions as a subsequent processing unit.

In both configurations, input images 51 and 61 are a repeated input of continuous-photographed images set to different exposure conditions, that is, a repeated input of a WDR set including continuous-photographed images set to different exposure conditions illustrated in FIG. 2(a).

The configuration of FIG. 5 differs from the configuration of FIG. 3 in that a motion-compensated image generating unit 71 and motion-compensated image generating units 72p to 72r are added.

The motion-compensated image generating unit performs an alignment between images serving as a synthesis target.

In an image alignment process, first, an image serving as a motion matching reference is decided. A motion estimation (ME) process of estimating a motion of an image serving as an alignment target in view of the reference image is performed, and then a motion compensation (MC) process of performing an alignment of an image according to an estimated motion is performed.

The motion-compensated image generating unit 71 and the motion-compensated image generating units 72p to 72r perform the process (MEMC) and perform an alignment between images serving as a synthesis target.

In FIG. 5, the image of the exposure condition R4 is used as the reference image for the alignment, but the reference image is not limited to this example, and any of the exposure conditions R1 to 4 may be used.

The configuration illustrated in FIG. 6 is a configuration in which motion-compensated image generating units 81p to 81r and a motion-compensated image generating unit 82 are added to the configuration illustrated in FIG. 4.

The motion-compensated image generating units 81p to 81r and a motion-compensated image generating unit 82 also perform motion estimation (ME) and motion compensation (MC) between images, and perform an alignment between images serving as a synthesis target.

In the configuration in which an alignment between synthetic images is considered as illustrated in FIGS. 5 and 6, there is a problem in that compared to the configurations illustrated in FIGS. 3 and 4, a configuration is more complicated, and a size of hardware performing the above processes is increased.

As documents disclosing a configuration of performing a noise reduction process and a wide dynamic range process together through an image synthesis process, there are, for example, Patent Document 1 (Japanese Patent Application Laid-Open No. 2010-041200), Patent Document 2 (Japanese Patent Application Laid-Open No. 2008-160881), Patent Document 3 (Japanese Patent Application Laid-Open No. 2007-049227), and Patent Document 4 (Japanese Patent Application Laid-Open No. 2006-311240).

CITATION LIST

Patent Documents

Patent Document 1: Japanese Patent Application Laid-Open No. 2010-041200
Patent Document 2: Japanese Patent Application Laid-Open No. 2008-160881
Patent Document 3: Japanese Patent Application Laid-Open No. 2007-049227
Patent Document 4: Japanese Patent Application Laid-Open No. 2006-311240

SUMMARY OF THE INVENTION

Problems to be Solved by the Invention

For example, the present disclosure was made in light of the above problems, and it is an object of the present disclosure to provide an image processing device, an image processing method, and a program in which a noise reduction process and a dynamic range expansion process are performed together through a simple configuration.

Solutions to Problems

A first aspect of the present disclosure lies in an image processing device, including:
an image synthesis processing unit that sequentially receives continuous-photographed images photographed under different exposure conditions as an input image, performs a synthesis process of the input image and an intermediate synthetic image serving as a previously processed image, and generates an output image, wherein the image synthesis processing unit includes a region determining unit that classifies configuration pixels of the input image and the intermediate synthetic image into a noise pixel, an effective pixel, or a saturation pixel according to a threshold value, an update method deciding unit that decides a synthesis processing method of a pixel unit according to a combination of pixel classification results of the corresponding pixels of the input image and the intermediate synthetic image, and an image update processing unit that performs a synthesis process of the input image and the intermediate synthetic image according to an update method decided by the update method deciding unit, and generates the output image.

Further, in an embodiment of the image processing device according to the present disclosure, the input image is an image whose exposure condition is changed by changing an exposure period of time.

Further, in an embodiment of the image processing device according to the present disclosure, the update method deciding unit decides the following processes according to the combination of the pixel classification results of the corresponding pixels of the input image and the intermediate synthetic image:

(A) when at least one of the corresponding pixels of the input image and the intermediate synthetic image is the effective pixel, a process of performing a three-dimensional noise reduction (3DNR) process by a pixel value synthesis of the input image and the intermediate synthetic image and updating the pixel value of the intermediate synthetic image;

(B) when both of the corresponding pixels of the input image and the intermediate synthetic image are the saturation pixel or the noise pixel, a process of outputting the pixel value of the intermediate synthetic image without change without performing a synthesis using the input image; and (C) when the corresponding pixels of the input image and the intermediate synthetic image is a combination in which one is the saturation pixel, and the other is the noise pixel, (C1) the 3DNR process by the pixel value synthesis of the input image and the intermediate synthetic image, or (C2) the process of outputting the pixel value of the intermediate synthetic image without change without performing the synthesis using the input image, and the update method deciding unit decides the processes of (A) to (C) as the synthesis processing method of the pixel unit according to the combination of the pixel classification results of the corresponding pixels of the input image and the intermediate synthetic image.

Further, in an embodiment of the image processing device according to the present disclosure, the region determining unit receives photographing information including exposure period of time information of the input image, calculates the threshold value using the photographing information, and classifies the configuration pixels of the input image and the intermediate synthetic image into the noise pixel, the effective pixel, or the saturation pixel according to the calculated threshold value.

Further, in an embodiment of the image processing device according to the present disclosure, the photographing information includes an exposure period of time T, ISO sensitivity, and an F value of the input image, and the region determining unit calculates the threshold value using the exposure period of time T, the ISO sensitivity, and the F value of the input image.

Further, in an embodiment of the image processing device according to the present disclosure, the image update processing unit includes an exposure correcting unit that generates an exposure-corrected input image obtained by correcting the pixel value of the input image to a pixel value when an exposure process corresponding to the same exposure condition as the intermediate synthetic image is performed, and the image update processing unit sets the exposure condition of the intermediate synthetic image to the same exposure condition as an image having a largest exposure amount among a plurality of input images.

Further, in an embodiment of the image processing device according to the present disclosure, the image update processing unit includes an exposure correcting unit that generates an exposure-corrected input image obtained by correcting the pixel value of the input image to a pixel value when an exposure process corresponding to the same exposure condition as the intermediate synthetic image is performed, a synthesis processing unit that performs a synthesis process of corresponding pixels of the exposure-corrected input image and the intermediate synthetic image, and an output control unit that receives pixel unit update information decided by the update method deciding unit, and performs switching as to whether the pixel value of the intermediate synthetic image is output to the synthesis processing unit or the pixel value of the intermediate synthetic image is output as the pixel value of the output image without change according to the received information.

Here, the exposure condition of the intermediate synthetic image may be an arbitrary exposure condition. In other words, the exposure condition of the intermediate synthetic image may be an exposure condition configured with an arbitrary exposure period of time $T_{WDR}$, an arbitrary F value $F_{WDR}$, and arbitrary ISO sensitivity $ISO_{WDR}$. Generally, it is desirable to cause an exposure condition of one of images photographed under different exposure conditions serving as the input image to be equal to a condition in which an exposure amount is largest from a point of view of increasing an effective accuracy of a sensor output value.

Further, in an embodiment of the image processing device according to the present disclosure, the image update processing unit includes an exposure correcting unit that generates an exposure-corrected input image obtained by correcting the pixel value of the input image to a pixel value when an exposure process corresponding to the same exposure condition as the intermediate synthetic image is performed among the continuous-photographed images, a synthesis processing unit that performs a synthesis process of corresponding pixels of the exposure-corrected input image and the intermediate synthetic image, and a selector that receives pixel unit update information decided by the update method deciding unit, and selects and outputs either of a synthesis processing result of the synthesis processing unit or the pixel value of the intermediate synthetic image as the pixel value of the output image according to the received information.

Further, in an embodiment of the image processing device according to the present disclosure, the region determining unit performs a smoothing process on each of the input image and the intermediate synthetic image, calculates a degree of pixel saturation and a degree of pixel noise corresponding to each of configuration pixels of a smoothed input image and a smoothed intermediate synthetic image, and outputs the degree of pixel saturation and the degree of pixel noise to the update method deciding unit.

Further, in an embodiment of the image processing device according to the present disclosure, the update method deciding unit calculates an addition ratio of the following pixel values (a) and (b) using the degree of pixel saturation and the degree of pixel noise:

(a) a 3DNR processed pixel value by the pixel value synthesis of the input image and the intermediate synthetic image; and (b) the pixel value of the intermediate synthetic image, and outputs the addition ratio to the image update processing unit, and the image update processing unit performs an addition process of the pixel values (a) and (b) according to the addition ratio, and decides the pixel value of the output image.

Further, in an embodiment of the image processing device according to the present disclosure, the image synthesis processing unit further corrects the intermediate synthetic image to the same pixel value as one photographed under an exposure condition having the same exposure amount as the exposure condition of the input image, and includes an intermediate synthetic image correcting unit that generates a corrected intermediate synthetic image, and the region determining unit performs a smoothing process on each of the input image and the corrected intermediate synthetic image, calculates a degree of pixel saturation and a degree of pixel noise corresponding to each of the configuration pixels of the respective images, and outputs the degree of pixel saturation and the degree of pixel noise to the update method deciding unit.

Further, in an embodiment of the image processing device according to the present disclosure, the update method deciding unit calculates an addition ratio of the following pixel values (a) and (b) using the degree of pixel saturation and the degree of pixel noise:

(a) a 3DNR processed pixel value by a pixel value synthesis of the input image and the corrected intermediate synthetic image; and (b) the pixel value of the intermediate synthetic image, and outputs the addition ratio to the image update processing unit, and the image update processing unit generates a 3DNR synthetic image by the pixel value synthesis of the input image and the corrected intermediate synthetic image, performs an exposure correction of correcting the generated 3DNR synthetic image to a pixel value when the exposure condition is set to the same exposure condition as the intermediate synthetic image, adds corresponding pixels of the generated exposure-corrected 3DNR synthetic image and the intermediate synthetic image according to the addition ratio, and decides the pixel value of the output image.

Further, a second aspect of the present disclosure lies in an image processing method performed in an image processing device, including:

performing, by an image synthesis processing unit, an image synthesis process of sequentially receiving continuous-photographed images photographed under different exposure conditions as an input image, performing a synthesis process of the input image and an intermediate synthetic image serving as a previously processed image, and generating an output image, wherein the image synthesis processing unit performs, in the image synthesis process, a region determining process of classifying configuration pixels of the input image and the intermediate synthetic image into a noise pixel, an effective pixel, or a saturation pixel according to a threshold value, an update method deciding process of deciding a synthesis processing method of a pixel unit according to a combination of pixel classification results of the corresponding pixels of the input image and the intermediate synthetic image, and an image update process of performing a synthesis process of the input image and the intermediate synthetic image according to an update method decided by the update method deciding unit and generating the output image.

Further, a third aspect of the present disclosure lies in a program causing an image processing device to execute image processing, the program causing an image synthesis processing unit to execute an image synthesis process of sequentially receiving continuous-photographed images photographed under different exposure conditions as an input image, performing a synthesis process of the input image and an intermediate synthetic image serving as a previously processed image, and generating an output image, wherein in the image synthesis process includes a region determining process of classifying configuration pixels of the input image and the intermediate synthetic image into a noise pixel, an effective pixel, or a saturation pixel according to a threshold value, an update method deciding process of deciding a synthesis processing method of a pixel unit according to a combination of pixel classification results of the corresponding pixels of the input image and the intermediate synthetic image, and an image update process of performing a synthesis process of the input image and the intermediate synthetic image according to an update method decided by the update method deciding unit and generating the output image.

For example, the program according to the present disclosure is a program that can be provided to an information processing device or a computer system capable of executing various program codes through a storage medium provided in a computer readable form or a communication medium. By providing such a program in the computer readable form, processing according to the program is implemented on the information processing device or the computer system.

Other objects, features, and advantages of the present disclosure will become apparent by the detailed description based on the embodiments of the present disclosure which will be described and the appended drawings. Further, a system in this specification refers to a logical aggregation configuration of a plurality of devices, and is not limited to a form in which devices of respective configurations are arranged within the same housing.

Effects of the Invention

According to a configuration of an embodiment of the present disclosure, it is possible to generate an image obtained by performing a noise reduction process and a dynamic range expansion process by a simple configuration through a sequential synthesis process using continuous-photographed images of different exposure conditions.

Specifically, continuous-photographed images of different exposure conditions are input, configuration pixels of an input image and an intermediate synthetic image are classified into a noise pixel, an effective pixel, or a saturation pixel, a synthesis processing method of a pixel unit is decided according to a combination of pixel classification results of the corresponding pixels, and the intermediate synthetic image is updated according to the decided method.

A 3DNR process is performed when at least one of the corresponding pixels of the input image and the intermediate synthetic image is the effective pixel, the pixel value of the intermediate synthetic image is output without change when both of the corresponding pixels are the saturation pixel or the noise pixel, and the 3DNR process is performed, or the pixel value of the intermediate synthetic image is output when one of the corresponding pixels is the saturation pixel, and the other is the noise pixel.

Through the present configuration, it is possible to generate an image obtained by performing a noise reduction process and a dynamic range expansion process by a simple configuration through a sequential synthesis process using continuous-photographed images of different exposure conditions.

Further, as the process of the present disclosure is performed, even when there is a moving subject in an image, and there is a moving subject region, an image is updated at least once based on any one image in a WDR set serving as a set of photographed images of different exposure conditions. Thus it is possible to remove a remaining region of a previous image.

BRIEF DESCRIPTION OF DRAWINGS

FIG. 12 is a diagram for describing a threshold value applied to a pixel classification process of an input image performed by an image processing device according to an embodiment of the present disclosure.

FIG. 15 is a diagram for describing an image update processing method decision process performed by an update method deciding unit of an image processing device according to an embodiment of the present disclosure.

FIGS. 16(a) to 16(c) are diagrams for describing an image update processing method decision process performed by an update method deciding unit of an image processing device according to an embodiment of the present disclosure.

FIG. 17 is a diagram for describing a specific example of an image update process performed by an image processing device according to an embodiment of the present disclosure.

FIG. 28 is a diagram for describing a calculation process of an addition ratio β in an update method deciding unit of an image processing device according to an embodiment of the present disclosure.

MODE FOR CARRYING OUT THE INVENTION

Figure 1:
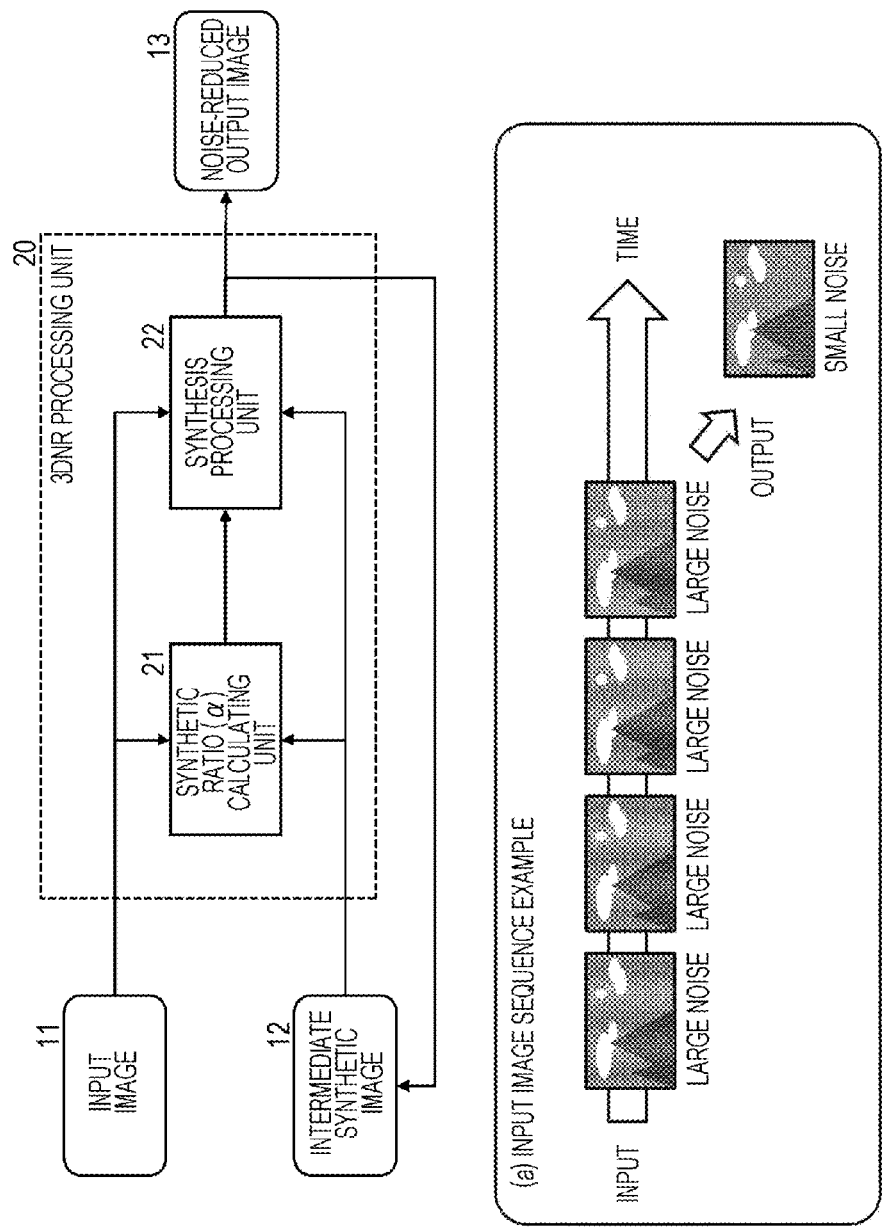
FIG. 1 is a diagram for describing an exemplary configuration of a device that performs an image noise reduction process using three-dimensional noise reduction (3DNR).

Hereinafter, an image processing device, an image processing method, and a program according to the present disclosure will be described in detail with reference to the appended drawings. A description will proceed according to the following items.

1. Overview of image processing performed by image processing device according to present disclosure and exemplary overall configuration of image processing device 2. Configuration and processing of image synthesis processing unit 2-1. Processing of input image region determining unit 2-2. Processing of intermediate synthetic image region determining unit 2-3. Processing of update method deciding unit 2-4. Configuration and processing of image update processing unit 3. Example of performing pixel-unit addition process of 3DNR synthesis pixel and pixel of intermediate synthetic image 4. Example of generating corrective image of same photographing condition as input image based on intermediate synthetic image and performing processing 5. Exemplary overall configuration of image processing device 6. Conclusion of configuration of present disclosure

[1. Overview of Image Processing Performed by Image Processing Device According to Present Disclosure and Exemplary Configuration of Image Processing Unit]

First, an overview of image processing performed by an image processing device according to the present disclosure and an exemplary configuration of an image processing unit will be described.

The image processing device according to the present disclosure sequentially receives continuous-photographed images set to a plurality of different exposure conditions, expands a dynamic range through an image synthesis process using the images, and generates a noise-reduced output image.

Figure 7:
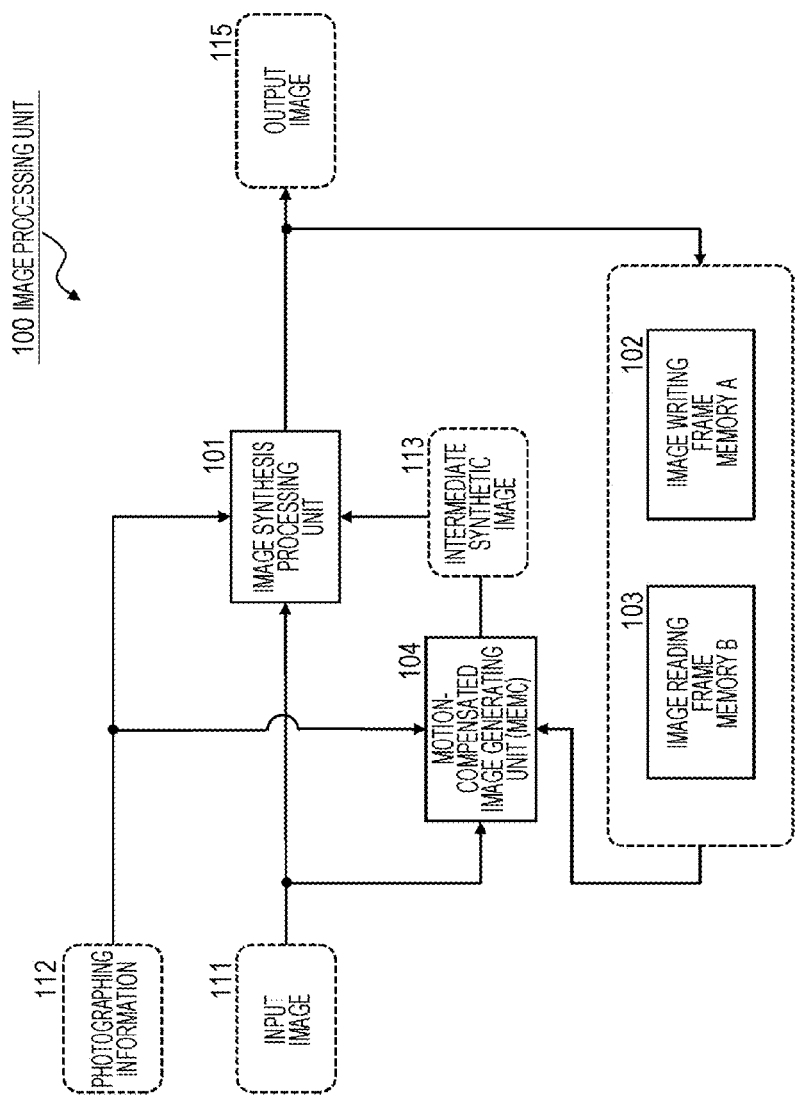
FIG. 7 is a diagram for describing a configuration and processing of an image processing unit according to an embodiment of the present disclosure.

FIG. 7 illustrates an exemplary configuration of an image processing unit 100 of the image processing device according to the present disclosure.

As illustrated in FIG. 7, the image processing unit 100 includes an image synthesis processing unit 101, an image writing frame memory A 102 and an image reading frame memory B 103 configuring a double buffer, and a motion-compensated image generating unit 104.

Input images 111 input to the image processing unit 100 are an image sequence including a repetition of a plurality of continuous-photographed images (WDR set) set to different exposure conditions.

An exemplary sequence of the input images 111 will be described with reference to FIGS. 8 and 9.

Figure 2:
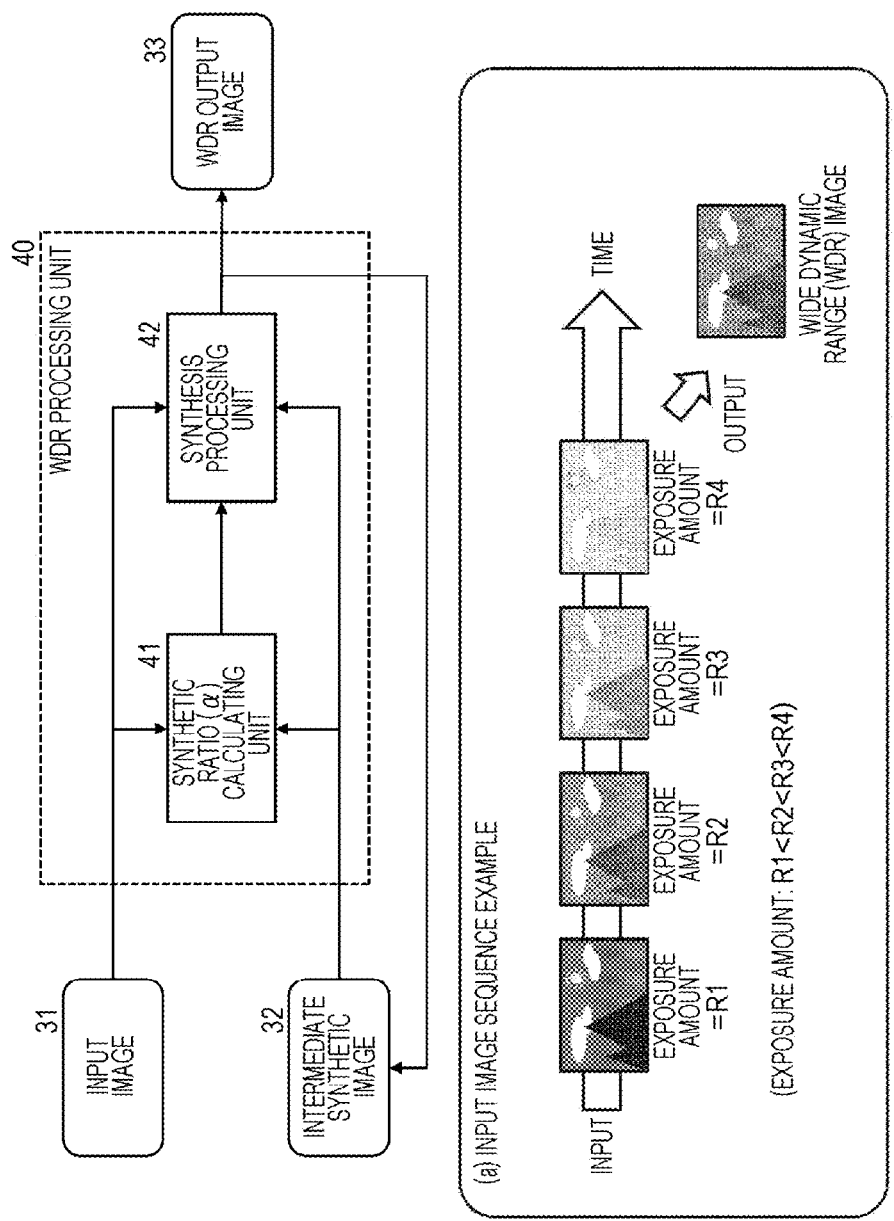
FIG. 2 is a diagram for describing an exemplary configuration of a device that performs a wide dynamic range (WDR) image generation process.
Figure 3:
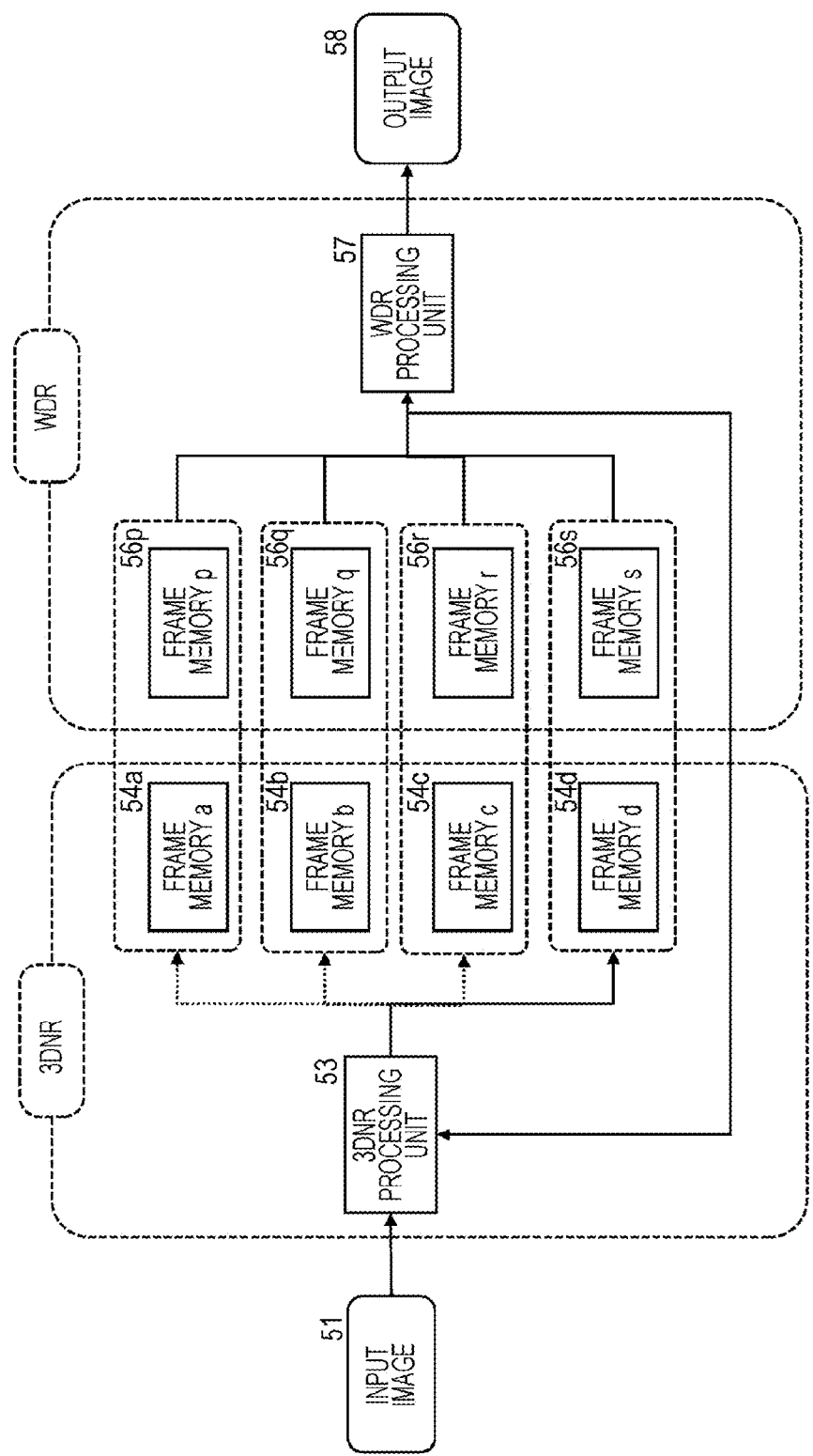
FIG. 3 is a diagram for describing an exemplary configuration of an image processing device in which a 3DNR processing unit performing noise reduction functions as a preceding processing unit, and a WDR processing unit performing WDR image generation functions as a subsequent processing unit.
Figure 4:
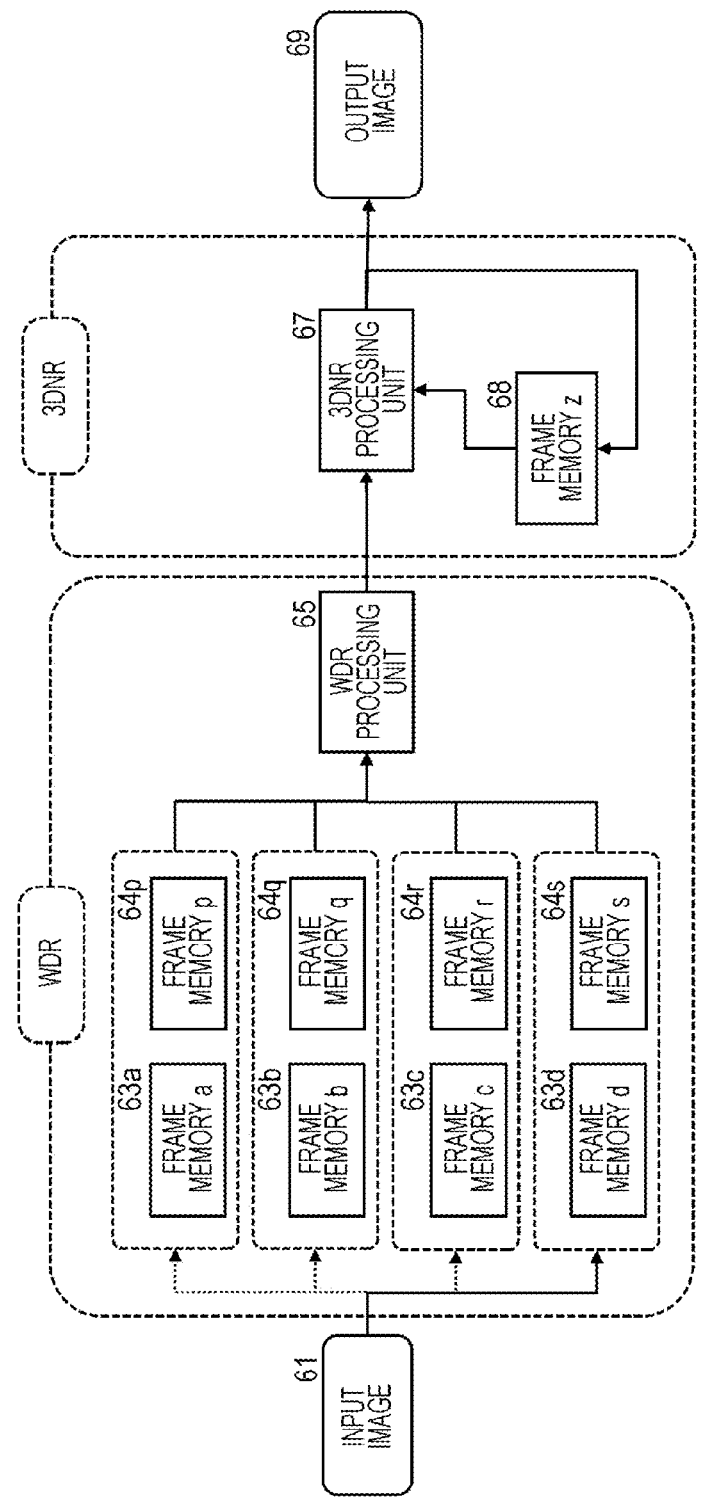
FIG. 4 is a diagram for describing an exemplary configuration of an image processing device in which a WDR processing unit performing WDR image generation functions as a preceding processing unit, and a 3DNR processing unit performing noise reduction functions as a subsequent processing unit.
Figure 5:
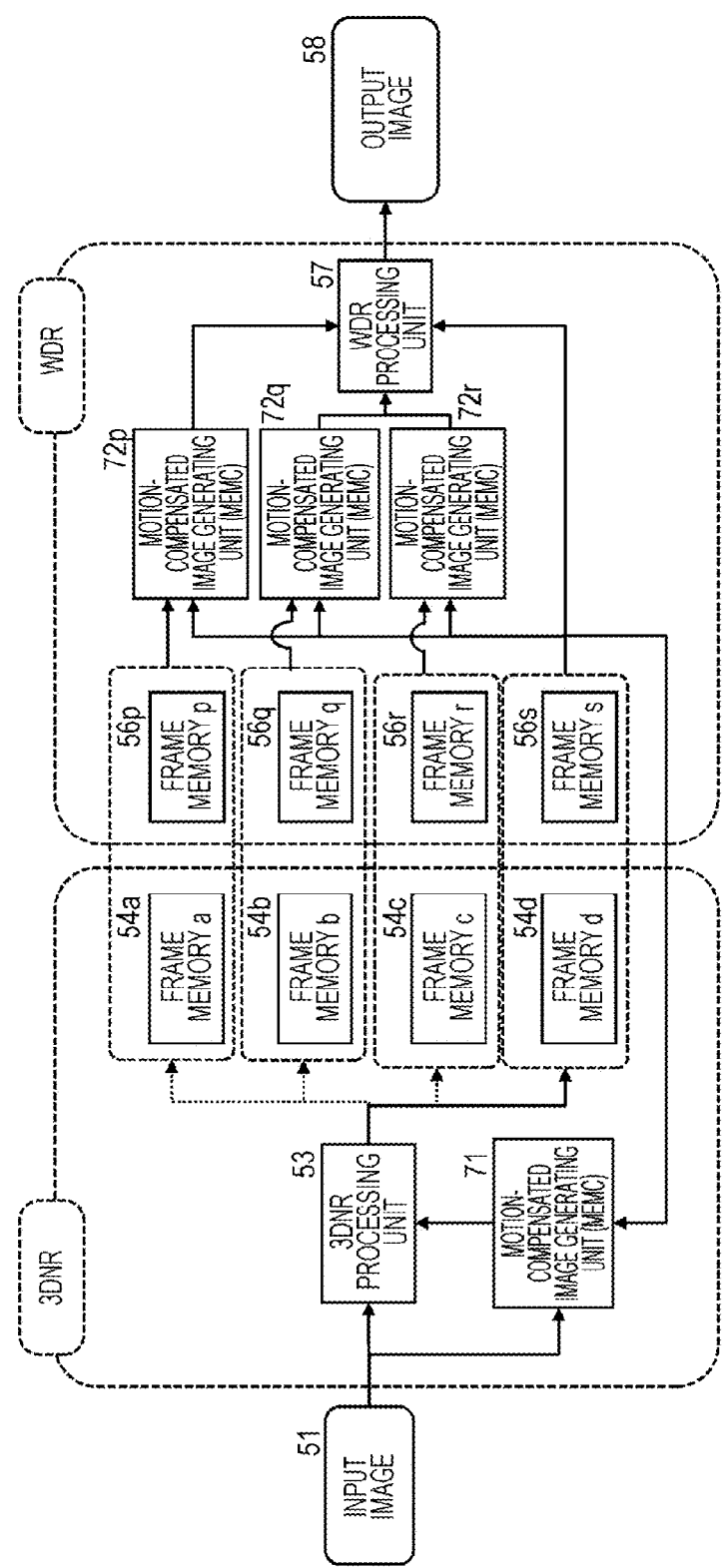
FIG. 5 is a diagram for describing an exemplary configuration in which a motion-compensated image generating unit is added to a configuration illustrated in FIG. 3.
Figure 6:
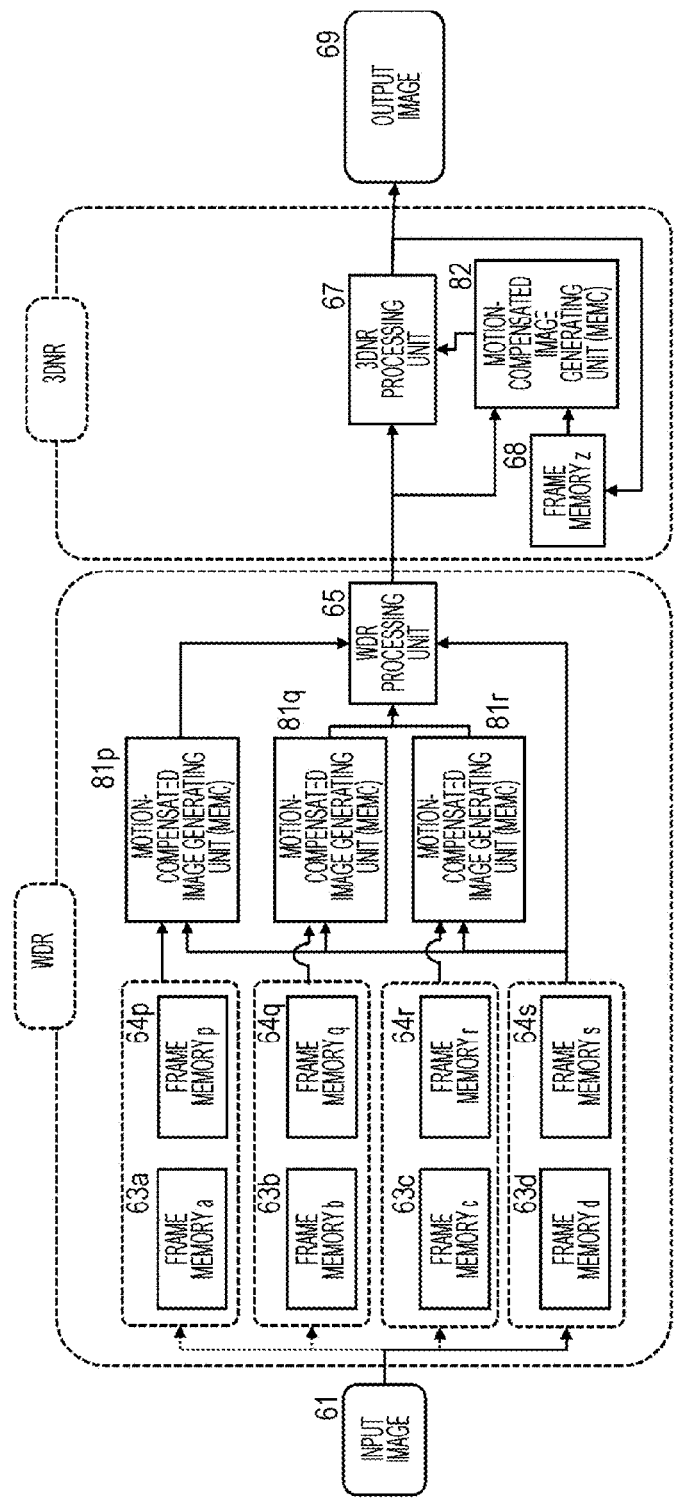
FIG. 6 is a diagram for describing an exemplary configuration in which a motion-compensated image generating unit is added to a configuration illustrated in FIG. 4.

The continuous-photographed images (WDR set) serving as the input image 111 are a plurality of continuous-photographed images of different exposure conditions. Specifically, for example, a set of photographed images of a plurality of different exposure conditions such as two types, three types, or four types of exposure conditions described above with reference to FIG. 2(a) is regarded as a WDR set, and WDR sets are sequentially input.

Figure 8:
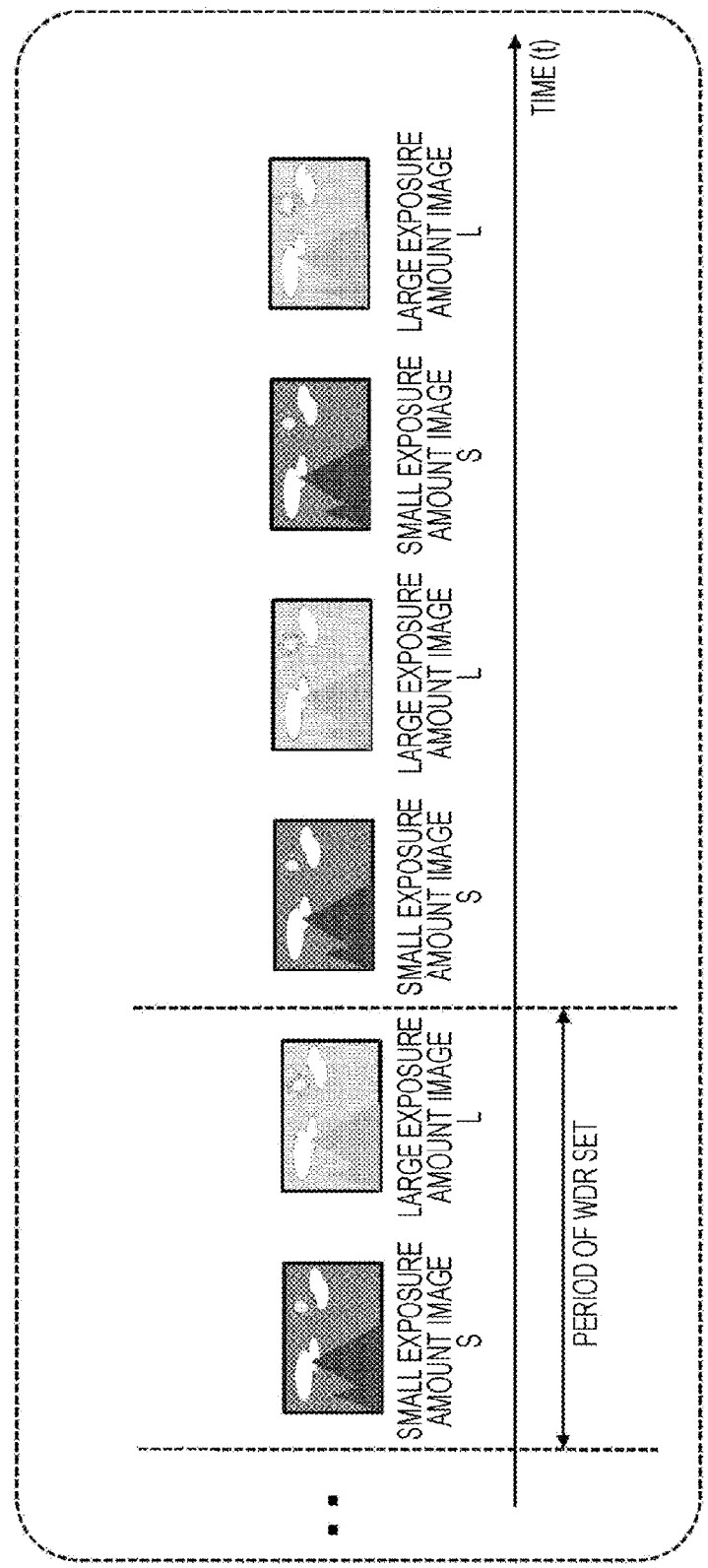
FIG. 8 is a diagram for describing an exemplary sequence of input images.
Figure 9:
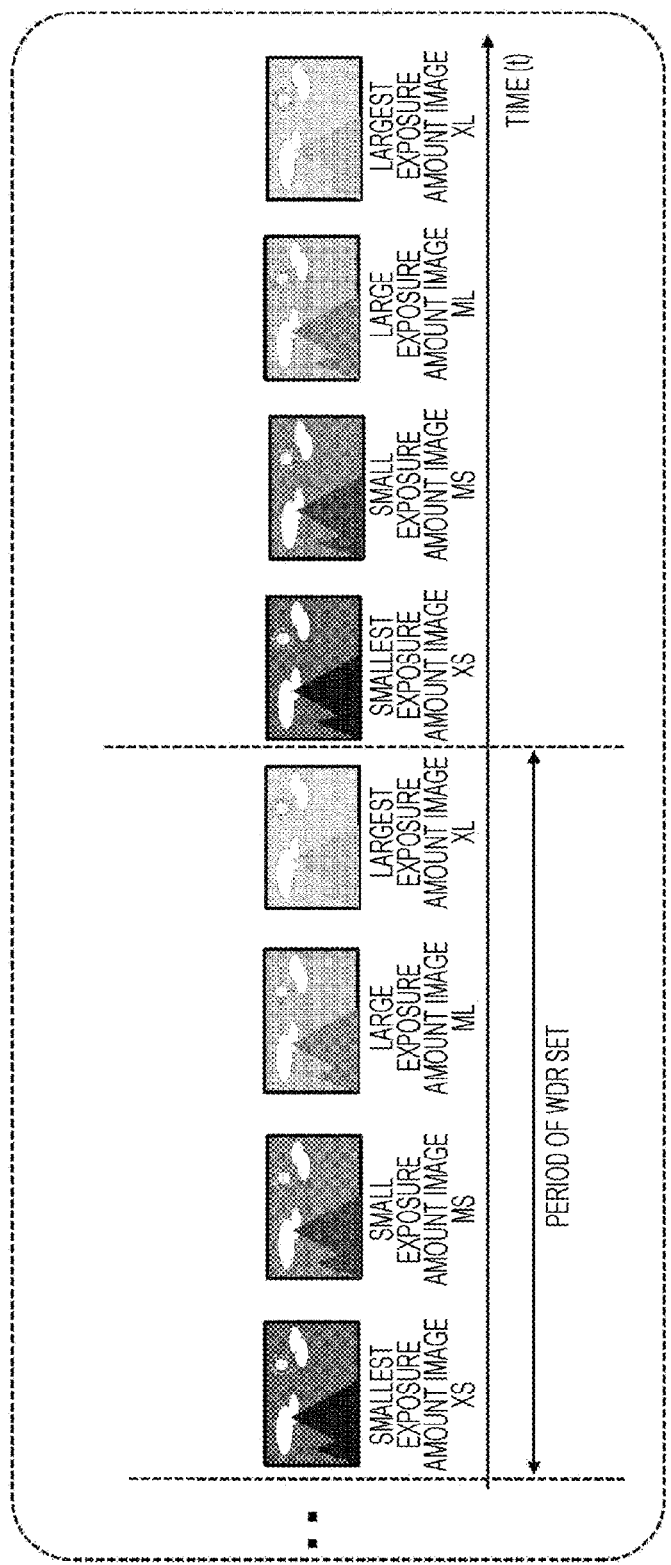
FIG. 9 is a diagram for describing an exemplary sequence of input images.

FIG. 8 illustrates an exemplary WDR set including images of two types of exposure conditions, and FIG. 9 illustrates an exemplary WDR set including images of four types of exposure conditions.

FIG. 8 illustrates an exemplary input image sequence configured by a repetition of images photographed under two types of different exposure conditions, that is, a repetition of a small exposure amount image S and a large exposure amount image L. In other words, continuous-photographed images of two different exposure amounts, that is, (1) the small exposure amount image S and (2) the large exposure amount image L are a WDR set of one period.

The exposure amount has the following relation:

S<L

As a method of changing an exposure amount, there is, for example, a method of inserting a diaphragm (F value) or a neutral density filter in addition to a method of changing an exposure period of time. Of this, when an exposure amount is changed by changing a diaphragm, a depth of field is also changed with a change in an exposure amount. This causes a spatial blurring amount between images to change, and thus an image quality deteriorates at the time of the WDR synthesis process. An image photographed in a state in which a diaphragm is narrowed becomes a dark image since an exposure amount is small, and comes into focus significantly before or after a focal plane. An image photographed in a state in which a diaphragm is opened becomes a bright image large since an exposure amount is large, and a subject deviated backward or forward from focal plane significantly blurs since a depth of field is decreased. Thus, when the WDR synthesis process is performed, a frequency nature in an image significantly changes on a boundary plane between a dark image including a high frequency wave and a bright image having only a low frequency wave, resulting in deterioration of an image quality. On the other hand, the method using the neutral density filter has a problem in that a large-scale system is necessary to implement a filter. Thus, the method of changing only an exposure period of time is desirable as the method of changing an exposure amount.

The image processing unit 100 illustrated in FIG. 7 sequentially receives, for example, the images of the different exposure conditions S and L as the input image 111 as described above, sequentially performs the image synthesis process in units of WDR sets each of which includes one small exposure amount image S and one large exposure amount image L, and generates an output image.

As described above, the image processing unit 100 illustrated in FIG. 7 generates an image by synthesizing the images photographed under the different exposure conditions, for example, as illustrated in FIG. 8 and performing the noise reduction process and the WDR process, and outputs the generated image.

FIG. 9 illustrates an example in which the N number of types of exposure amounts is 4, similarly to FIG. 8. In other words, the example illustrated in FIG. 9 is an example in which continuous-photographed images of four different exposure conditions, that is, (1) the smallest exposure amount image XS,
(2) the small exposure amount image MS,
(3) the large exposure amount image ML, and
(4) the largest exposure amount image XL
are regarded as a WDR set.

The exposure amount has the following relation:
XS<MS<ML<XL

The image processing unit 100 illustrated in FIG. 7 sequentially receives, for example, the images of the four different exposure conditions as the input image 111, sequentially synthesizes the four images, that is, the smallest exposure amount image XS, the small exposure amount image MS, the large exposure amount image ML, and the largest exposure amount image XL, generates a synthetic image obtained by synthesizing four images finally as an output image, and outputs the output image.

As described above, the image processing unit 100 illustrated in FIG. 7 synthesizes, for example, the images of the four different exposure conditions to generate the noise-reduced WDR image, and outputs the generated WDR image.

In FIGS. 8 and 9, an order from a small exposure amount image to a large exposure amount image signal is described as an image input order, but this order may have a reverse setting, that is, a setting in which a large exposure amount image is first input, and a small exposure amount image is subsequently input. Further, an arbitrary order may be used.

The image synthesis processing unit 101 of the image processing unit 100 illustrated in FIG. 7 outputs the synthetic image as an output image 115 when the synthesis process of applying all images of different exposure conditions configuring a WDR set of one unit is completed.

The image processing unit 100 rewrites a processing result of the image synthesis processing unit 101 in the frame memory each time the new input image 111 is input in addition to the output image 115. The synthetic image is referred to as an "intermediate synthetic image".

The image synthesis processing unit 101 illustrated in FIG. 7 performs the synthesis process of a plurality of images included in a WDR set of one unit using the input images 111 of the different exposure condition that are sequentially input and an intermediate synthetic image 113 generated by the synthesis process of the previous input image. The intermediate synthetic image 113 illustrated in FIG. 7 is the intermediate synthetic image 113 obtained by performing motion compensation of aligning an image position on the input image 111.

The image synthesis processing unit 101 further receives photographing information 112.

The photographing information 112 is attribute information corresponding to an input image indicating, for example, a photographing condition corresponding to the input image 111, and includes, for example, setting information of an exposure condition and the like.

The intermediate synthetic image generated by the image synthesis processing unit 101 is stored in the image writing frame memory A 102. An intermediate synthetic image of an immediately previous timing stored in the image reading frame memory B 103 is read by the motion-compensated image generating unit 104. The frame memory A 102 and the frame memory B 103 configure a double buffer structure, and perform reading and writing alternately.

The motion-compensated image generating unit 104 performs the motion estimation (ME) process of images serving as a synthesis process, and further performs the motion compensation (MC) of performing an image alignment according to an estimated motion.

As the image alignment process performed by the motion-compensated image generating unit 104, there are a process of aligning the image read from the image reading frame memory B 103 with the input image 111 using the image of the input image 111 as a reference and a setting of setting the image read from the frame memory B 103 as a reference image and performing an alignment by moving the input image 111, but both of the settings can be used.

The motion-compensated intermediate synthetic image 113 generated by the motion-compensated image generating unit 104 is input to the image synthesis processing unit 101. The image synthesis processing unit 101 performs the synthesis process of synthesizing the aligned images.

Through the alignment between images performed by the motion-compensated image generating unit 104, motions of all images are corrected, and thus an image deviation based on the occurrence of camera shape or the like can be corrected. However, for example, when a moving subject is included as a part of an image, although a motion-compensated image is applied, there are cases in which a different subject is present at a corresponding pixel position of images serving as a synthesis target, and an improper pixel value is set to an image that has been subjected to the synthesis process. The image synthesis processing unit 101 of the image processing unit 100 according to the present disclosure implements an image synthesis process of reducing influence of a moving subject.

[2. Configuration and Processing of Image Synthesis Processing Unit]

Figure 10:
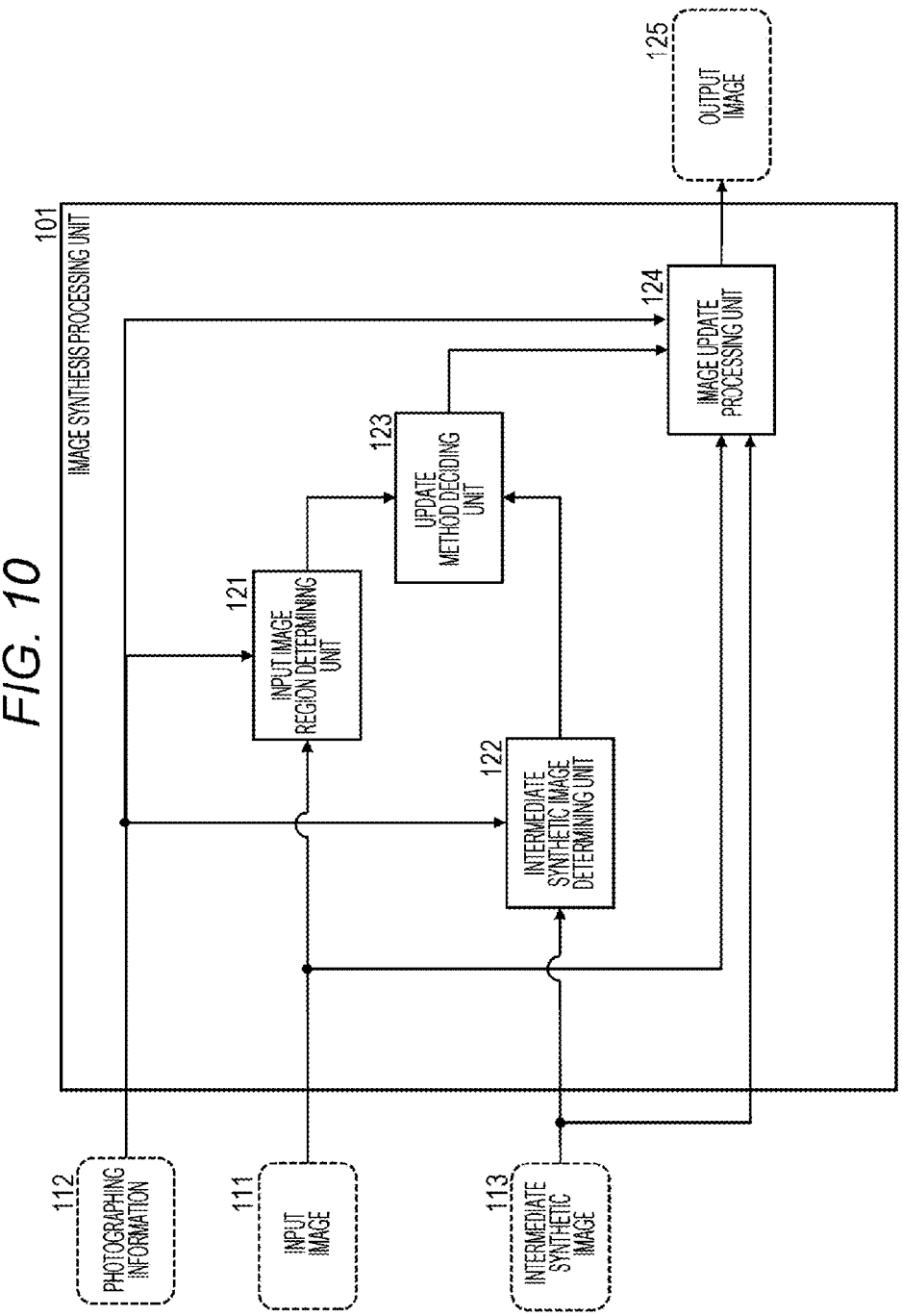
FIG. 10 is a diagram for describing an exemplary detailed configuration of an image synthesis processing unit.

FIG. 10 illustrates an exemplary configuration of the image synthesis processing unit 101.

The image synthesis processing unit 101 includes an input image region determining unit 121, an intermediate synthetic image region determining unit 122, an update method deciding unit 123, and an image update processing unit 124 as illustrated in FIG. 10.

[2-1. Processing of Input Image Region Determining Unit]

The input image region determining unit 121 receives the input image 111, and performs a process of classifying each pixel into any one of the following pixels based on a pixel value of a configuration pixel of the input image 111:

(a) a saturation pixel having a saturation pixel value;
(b) an effective pixel having an effective pixel value; and
(c) a noise pixel including a large noise component.

The pixel classification process will be described with reference to FIGS. 11 and 12.

Figure 11:
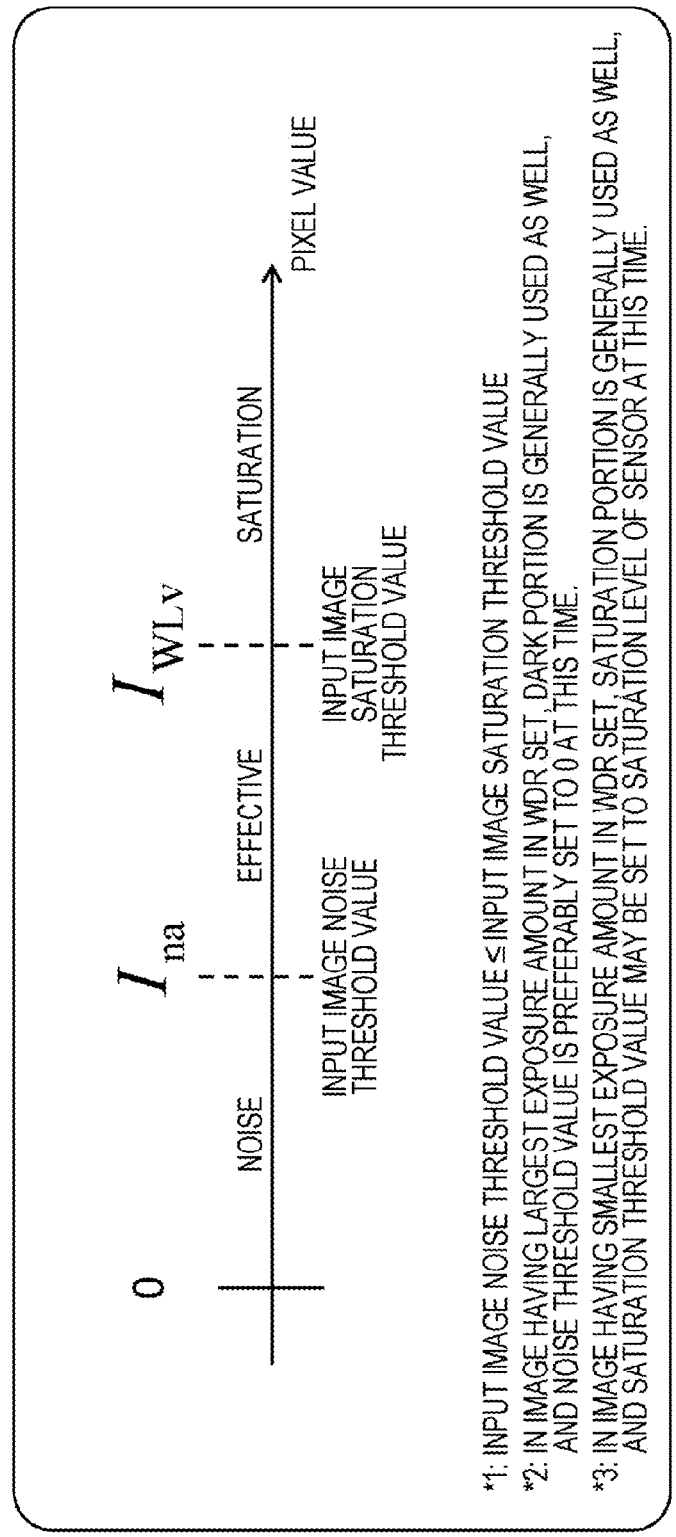
FIG. 11 is a diagram for describing an exemplary pixel classification process of an input image performed by an image processing device according to the present disclosure.

FIG. 11 is a diagram illustrating a pixel value of the input image 111 and a classification of a noise pixel, an effective pixel, and a saturation pixel.

A pixel having a pixel value equal to or larger than 0 and less than $I_{na}$ is classified into a noise pixel.

A pixel having a pixel value equal to or larger than $I_{na}$ and less than $I_{WLv}$ is classified into an effective pixel.

A pixel having a pixel value equal to or larger than $I_{WLv}$ is classified into a saturation pixel.

$I_{na}$ is a threshold value corresponding to a boundary pixel value between a noise pixel and an effective pixel and referred to as an "input image noise threshold value".

$I_{WLv}$ is a threshold value corresponding to a boundary pixel value between an effective pixel and a saturation pixel and referred to as an "input image saturation threshold value".

Further, n is a parameter indicating each index of 0 to 3 of 0- to 3-exposure images. Each threshold value has a value that differs according to each exposure image.

The input image noise threshold value is a value indicating a boundary as to whether a pixel value is a pixel value of an effective pixel or a pixel value having a large noise component. A pixel is determined to be a noise pixel when a pixel value level of an imaging element (an image sensor) is equal to or less than a certain value (=the input image noise threshold value).

The input image saturation threshold value is a value indicating a boundary as to whether a pixel value is a pixel value of an effective pixel or a saturation pixel value, and specifically, a saturation level of an imaging element (an image sensor) or a value close to a saturation level. A value specific to each color such as RGB or a value common to all colors may be used as this threshold value. When a value specific to each color is used, for example, a value obtained by multiplying a saturation level of an imaging element by a reciprocal of a white balance gain corresponding to each color may be applied.

The threshold values are calculated based on the photographing information 112 through the input image region determining unit 121. Alternatively, fixed values may be stored in a memory accessible by the image synthesis processing unit 101 as the threshold values in advance, and the fixed values may be used.

An exemplary threshold value calculation process in which the input image region determining unit 121 performs the calculation based on the photographing information 112 will be described with reference to FIG. 12.

An example illustrated in FIG. 12 is an example in which the input image 111 is configured with a WDR set including continuous-photographed images of four different exposure conditions as illustrated in FIG. 12(a).

Here,
a smallest exposure amount image is referred to as a 0-exposure image,
a small exposure amount image is referred to as a 1-exposure image,
a large exposure amount image is referred to as a 2-exposure image, and
a largest exposure amount image is referred to as a 3-exposure image.

The exposure amounts of the images have the following relation:
0-exposure image<1-exposure image<2-exposure image<3-exposure image In a graph illustrated in FIG. 12(b), a horizontal axis denotes subject brightness, and a vertical axis denotes a pixel value of an input image.

$I_0$ is a straight line indicating a pixel value of the 0-exposure image,
$I_1$ is a straight line indicating a pixel value of the 1-exposure image,
$I_2$ is a straight line indicating a pixel value of the 2-exposure image, and
$I_3$ is a straight line indicating a pixel value of the 3-exposure image.

The 0-exposure image serving as the smallest exposure amount image outputs an effective pixel value without reaching a saturation pixel value corresponding to the saturation threshold value $I_{WLv}$ even when subject brightness is in a high brightness region (subject brightness=L3 to L4). For example, in a "0-exposure image selection range" indicated in the high brightness region of the subject brightness of L3 to L4 illustrated in FIG. 12(b), all pixel values $I_1$ to $I_3$ of the 1- to 3-exposure images are saturated, but the pixel value $I_0$ of the 0-exposure image serving as the smallest exposure amount image indicates a pixel value less than the saturation pixel value.

In other words, in the "0-exposure image selection range" illustrated in FIG. 12(b), the pixel value "$I_0$" of the 0-exposure image is a pixel value of only one image having an effective pixel value.

In the "0-exposure image selection range" of the subject brightness of L3 to L4 in the graph illustrated in FIG. 12(b), a process of preferentially selecting the pixel value of the "0-exposure image" serving as the smallest exposure amount image as a pixel value set to an output image from the four WDR sets is performed.

In other words, the effective pixel region of the 0-exposure image serving as the smallest exposure amount image is the "0-exposure image selection range" of the subject brightness of L3 to L4 in the graph illustrated in FIG. 12(b), and the noise threshold value $I_{na}=I_{0a}$ of the 0-exposure image becomes the pixel value $I_0$ of the 0-exposure image at the subject brightness of L3.

Further, the saturation threshold value $I_{WLv}$ corresponds to the value of the saturation pixel value.

As described above, the effective pixel region of the 0-exposure image serving as the smallest exposure amount image becomes a region equal to or larger than the noise threshold value $I_{na}=I_{0a}$ of the 0-exposure image and less than the saturation threshold value $I_{WLv}$.

Similarly, a "1-exposure image selection range" of subject brightness of L2 to L3 illustrated in FIG. 12(b) is a region having a highest pixel value among images in which an exposure condition of a small exposure amount next to the 0-exposure image is set, and the pixel value "$I_1$" of the 1-exposure image is an effective pixel value.

In the "1-exposure image selection range" of the subject brightness of L2 to L3 in the graph illustrated in FIG. 12(b), a process of selecting the pixel value of the "1-exposure image" as a pixel value set to an output image from the four WDR sets is performed.

The noise threshold value $I_{na}=I_{1a}$ of the 1-exposure image becomes the pixel value $I_1$ of the 1-exposure image at the subject brightness of L2. The saturation threshold value $I_{WLv}$ corresponds to the value of the saturation pixel value.

As described above, the effective pixel region of the 1-exposure image serving as the small exposure amount image becomes a region equal to or larger than the noise threshold value $I_{na}=I_{1a}$ of the 1-exposure image and less than the saturation threshold value $I_{WLv}$.

Similarly, a "2-exposure image selection range" of subject brightness of L1 to L2 illustrated in FIG. 12(b) is a region having a highest pixel value among images in which a second largest exposure amount is set, and the pixel value $I_2$ of the 2-exposure image is an effective pixel value.

In the "2-exposure image selection range" of the subject brightness of L1 to L2 in the graph illustrated in FIG. 12(b), a process of selecting the pixel value of the "2-exposure image" as a pixel value set to an output image from the four WDR sets is performed.

The noise threshold value $I_{na}=I_{2a}$ of the 2-exposure image becomes the pixel value $I_2$ of the 2-exposure image at the subject brightness of L1. The saturation threshold value $I_{WLv}$ corresponds to the value of the saturation pixel value.

As described above, the effective pixel region of the 2-exposure image serving as the large exposure amount image becomes a region equal to or larger than the noise threshold value $I_{na}=I_{2a}$ of the 2-exposure image and less than the saturation threshold value $I_{WLv}$.

Similarly, a "3-exposure image selection range" of subject brightness of 0 to L1 illustrated in FIG. 12(b) is a region having a highest pixel value among images in which the largest exposure amount is set, that is, the exposure condition of the largest exposure amount is set, and the pixel value "I₃" of the 3-exposure image is an effective pixel value.

In the "3-exposure image selection range" of the subject brightness of 0 to L1 in the graph illustrated in FIG. 12(b), a process of selecting the pixel value of the "3-exposure image" as a pixel value set to an output image from the four WDR sets is performed.

The noise threshold value $I_{na}=I_{3a}$ of the 3-exposure image becomes the pixel value $I_3$ of the 3-exposure image at the subject brightness of 0. The saturation threshold value $I_{WLv}$ corresponds to the value of the saturation pixel value.

As described above, the effective pixel region of the 3-exposure image serving as the largest exposure amount image becomes a region equal to or larger than the noise threshold value $I_{na}=I_{3a}$ of the 3-exposure image and less than the saturation threshold value $I_{WLv}$.

The saturation threshold value $I_{WLv}$ is set as a pixel value common to all images of different exposure conditions, that is, as the saturation pixel value.

On the other hand, the noise threshold value $I_{na}$ is $I_{na}=0$ only for the image in which the largest exposure amount is set, that is, only for the 3-exposure image in the example described above with reference to FIG. 12, and the illustrated pixel values of $I_{na}$ for the other images.

Further, the noise threshold value $I_{na}$ is calculated according to the following calculation formula (Formula 1) as illustrated in FIG. 12(b).

[Math. 1]

$$I_{0a}=I_{WLv} \cdot R_1^{-1} \cdot R_0$$

$$I_{1a}=I_{WLv} \cdot R_2^{-1} \cdot R_1$$

$$I_{2a}=I_{WLv} \cdot R_3^{-1} \cdot R_2 \qquad \text{(Formula 1)}$$

In (Formula 1),
$I_{na}$ is a noise threshold value of an n-exposure image,
$I_{WLv}$ is a saturation threshold value, and
$R_n$ is a value indicating the magnitude of an exposure amount calculated based on photographing information of the n-exposure image as indicated in the following (Formula 2).

[Math. 2]

$$R_n = \left( \frac{ISO_n \cdot T_n}{F_n^2} \right) \qquad \text{(Formula 2)}$$

In (Formula 2),
$ISO_n$ is ISO sensitivity of the n-exposure image,
$T_n$ is an exposure period of time of the n-exposure image, and
$F_n$ is an F value of the n-exposure image.

These are information included in the photographing information 112 illustrated in FIGS. 7 and 10.

Pixel values of two images of different exposure conditions, that is, a pixel value $I_n$ of an n-exposure image and a pixel value $I_m$ of an m-exposure image can be indicated as the following relational expression (Formula 3) by applying $R_n$ expressed in (Formula 2).

[Math. 3]

$$I_n \cdot \left( \frac{ISO_n \cdot T_n}{F_n^2} \right)^{-1} = I_m \cdot \left( \frac{ISO_m \cdot T_m}{F_m^2} \right)^{-1} \qquad \text{(Formula 3)}$$

A correspondence relation between the n-exposure image and the m-exposure image can be expressed as the following relational expression (Formula 4) from the relational expression of (Formula 3):

$$I_n \cdot R_n^{-1} = I_m \cdot R_m^{-1} \qquad \text{(Formula 4)}$$

A correspondence relation between an n-exposure image and an (n+1)-exposure image can be expressed as the following relational expression (Formula 5) from (Formula 4):

$$I_n \cdot R_n^{-1} = I_{n+1} \cdot R_{n+1}^{-1} \qquad \text{(Formula 5)}$$

When (Formula 5) is transformed, the pixel value $I_n$ of the n-exposure image can be expressed as the following (Formula 6):

$$I_n = I_{n+1} \cdot R_{n+1}^{-1} \cdot R_n \qquad \text{(Formula 6)}$$

Here, in a boundary between the n-exposure image and the (n+1)-exposure image illustrated in FIG. 12(b), for example, in each boundary of the subject brightness of L1, L2, and L3 illustrated in FIG. 12, The pixel value $I_{n+1}$ of the (n+1)-exposure image for the pixel value $I_n$ of the n-exposure image is $$I_{n+1} = I_{WLv}$$

In other words, in each of the boundaries L1, L2, and L3, all pixel values of the images of a large exposure amount are the saturation threshold value $I_{WLv}$.

Thus, (Formula 6) can be expressed as the following (Formula 7) in each of the boundaries L1, L2, and L3:

$$I_n = I_{WLv} \cdot R_{n+1}^{-1} \cdot R_n \qquad \text{(Formula 7)}$$

(Formula 7) is a formula corresponding to (Formula 1) described above to be used to calculate the noise threshold value of each n-exposure image.

As described above, the noise threshold value of each n-exposure image can be calculated according to (Formula 1) described above.

The input image region determining unit 121 of the image synthesis processing unit 101 illustrated in FIG. 10 performs a process of calculating the noise threshold value $I_{na}$ and the saturation threshold value $I_{WLvn}$ corresponding to each n-exposure image using the photographing information 112 input to the input image region determining unit 121 and classifying the pixel values of the respective images into three pixels, that is, the noise pixel, the effective pixel, and the saturation pixel based on the threshold value thereof as illustrated in FIG. 11 as described above.

Pixel classification information (saturation/effective/noise) corresponding to the input image 111 generated by the input image region determining unit 121 is input to the update method deciding unit 123 illustrated in FIG. 10.

[2-2. Processing of Intermediate Synthetic Image Region Determining Unit]

Next, processing of the intermediate synthetic image region determining unit 122 of the image synthesis processing unit 101 illustrated in FIG. 10 will be described with reference to FIGS. 13 and 14.

Figure 13:
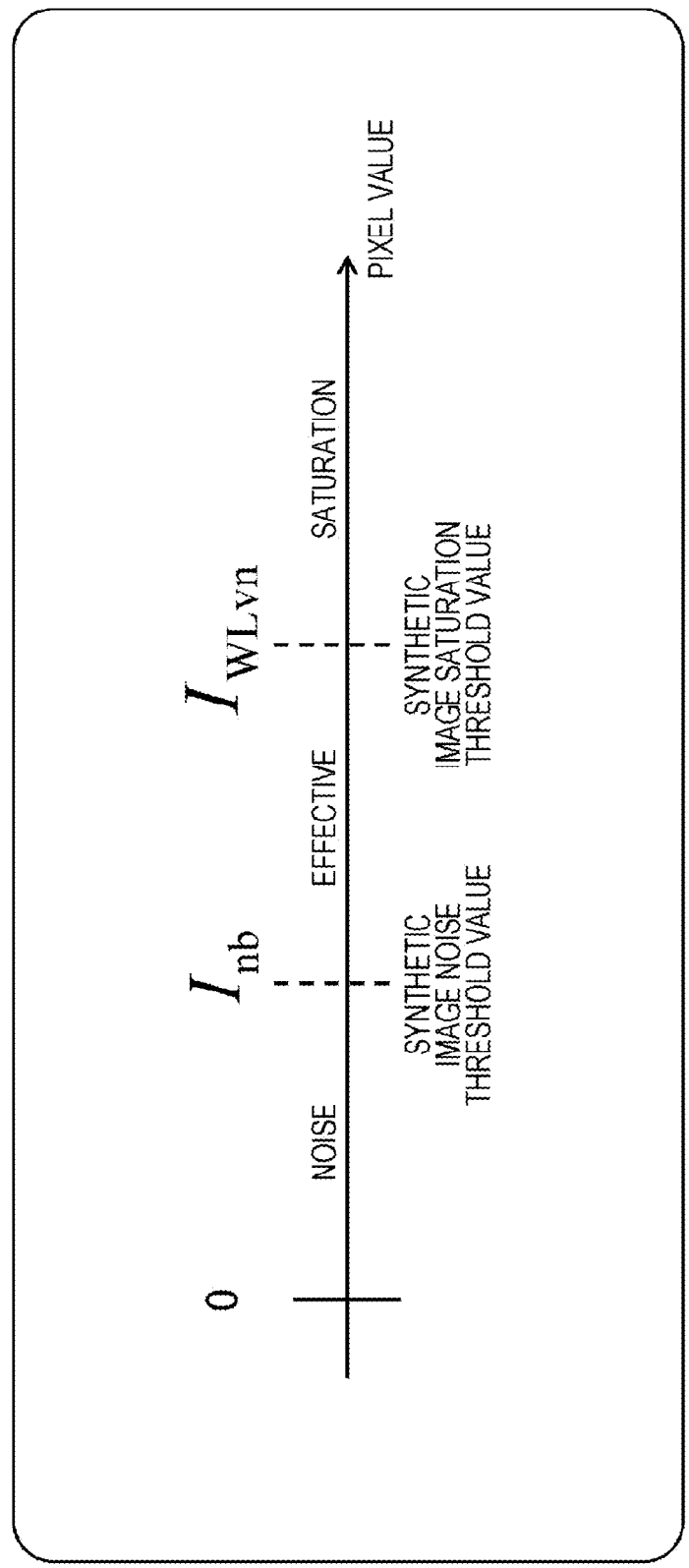
FIG. 13 is a diagram for describing an exemplary pixel classification process of an intermediate synthetic image performed by an image processing device according to the present disclosure.

FIG. 13 is a diagram illustrating a pixel value of the intermediate synthetic image 113 and a classification of a noise pixel, an effective pixel, and a saturation pixel.

A pixel having a pixel value equal to or larger than 0 and less than $I_{nb}$ is classified into a noise pixel.

A pixel having a pixel value equal to or larger than $I_{nb}$ and less than $I_{WLvn}$ is classified into an effective pixel.

A pixel having a pixel value equal to or larger than $I_{WLvn}$ is classified into a saturation pixel.

$I_{nb}$ is a threshold value (a synthetic image noise threshold value) corresponding to a boundary pixel value between a noise pixel and an effective pixel.

$I_{WLvn}$ is a threshold value (a synthetic image saturation threshold value) corresponding to a boundary pixel value between an effective pixel and a saturation pixel.

The threshold values are calculated by the intermediate synthetic image region determining unit 122. Alternatively, fixed values may be stored in a memory accessible by the image synthesis processing unit 101 as the threshold values in advance, and the fixed values may be used.

[n] in the noise threshold value $I_{nb}$ and the saturation threshold value $I_{WLvn}$ are parameters 0 to 3 indicating a type of an input image, that is, which of the 0- to 3-exposure images an input image is.

The noise threshold value $I_{nb}$ and the saturation threshold value $I_{WLvn}$ illustrated in FIG. 13 have values that differ according to the exposure conditions of the intermediate synthetic image 113 and the input image that is subjected to the synthesis process.

Specifically, the synthetic image saturation threshold value $I_{WLvn}$ is an upper limit value in which the pixel values of the intermediate synthetic image 113 can be updated based on the pixel values of the intermediate synthetic image 113 and the input image 111 serving as the synthesis target, that is, the n-exposure image.

Further, the synthetic image noise threshold value $I_{nb}$ is a lower limit value in which the pixel values of the intermediate synthetic image 113 can be updated based on the pixel values of the intermediate synthetic image 113 and the input image 111 serving as the synthesis target, that is, the n-exposure image.

An exemplary threshold value calculation process of calculating the noise threshold value $I_{nb}$ and the saturation threshold value $I_{WLvn}$ through the intermediate synthetic image region determining unit 122 will be described with reference to FIG. 14.

Figure 14:
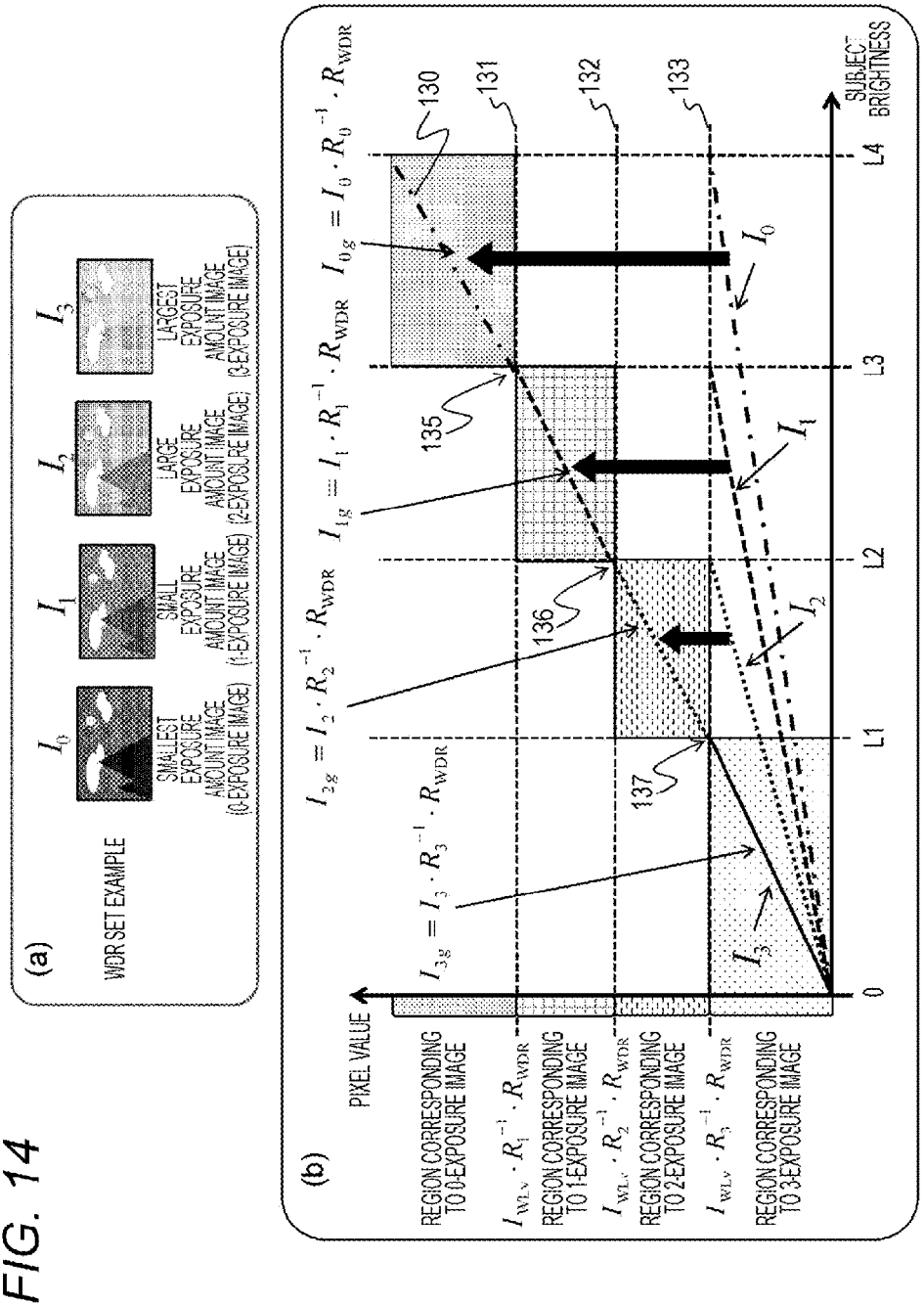
FIG. 14 is a diagram for describing a threshold value applied to a pixel classification process of an intermediate synthetic image performed by an image processing device according to the present disclosure.

An example illustrated in FIG. 14 is an example in which the input image 111 receives a WDR set including continuous-photographed images of four different exposure conditions, similarly to the example described above with reference to FIG. 12.

Here, a smallest exposure amount image is referred to as a 0-exposure image, a small exposure amount image is referred to as a 1-exposure image, a large exposure amount image is referred to as a 2-exposure image, and a largest exposure amount image is referred to as a 3-exposure image.

The exposure amounts of the images have the following relation:

0-exposure image<1-exposure image<2-exposure image<3-exposure image

In a graph illustrated in FIG. 14(b), a horizontal axis denotes subject brightness, and a vertical axis denotes a pixel value.

A line 130 of a straight line including $I_{0g}$ to $I_{3g}$ illustrated in FIG. 14(b) indicates pixel values set to an intermediate synthetic image.

The pixel values $I_{0g}$ to $I_{3g}$ are pixel values obtained by performing a gain adjustment on the pixel values $I_0$ to $I_3$ of the 0- to 3-exposure images serving as photographed images of different exposure conditions according to an exposure ratio or the like.

Four straight lines illustrated in a lower portion of the graph indicate original pixel values $I_0$ to $I_3$ of the 0- to 3-exposure images serving as photographed images of different exposure conditions which are not subjected to the gain adjustment.

The gain adjustment is performed on each of the 3-exposure image, the 2-exposure image, the 1-exposure image, and the 0-exposure image. The gain adjustment corresponds to a process of adjusting the original pixel values ($I_0$ to $I_3$) of the four images, that is, the 0- to 3-exposure images to the pixel values ($I_{0g}$ to $I_{3g}$) assumed to be set to the same exposure condition as the intermediate synthetic image.

In other words, the line 130 illustrated in FIG. 14 is a line indicating virtual pixel values when an intermediate synthetic image obtained by WDR synthesis is assumed not to have a saturation pixel value.

A portion of the subject brightness of 0 to L1 serving as a component of the line 130 indicates a pixel value when the pixel value $I_3$ of the exposure 3 is set to the same exposure condition as the intermediate synthetic image and configured with the virtual pixel value $I_{3g}$ that has been subjected to the gain adjustment.

A portion of the subject brightness of L1 to L2 indicates a pixel value when the pixel value $I_2$ of the 2-exposure image is set to the same exposure condition as the intermediate synthetic image and configured with the virtual pixel value $I_{2g}$ that has been subjected to the gain adjustment.

A portion of the subject brightness of L2 to L3 indicates a pixel value when the pixel value $I_1$ of the 1-exposure image is set to the same exposure condition as the intermediate synthetic image and configured with the virtual pixel value $I_{1g}$ that has been subjected to the gain adjustment.

A portion of the subject brightness of L3 to L4 indicates a pixel value when the pixel value $I_0$ of the 0-exposure image is set to the same exposure condition as the intermediate synthetic image and configured with the virtual pixel value $I_{0g}$ that has been subjected to the gain adjustment.

As described above, the line 130 illustrated in FIG. 14 is a line configured with the pixel values $I_{ng}$ that have been subjected to the gain adjustment and serve as virtual pixel values when the intermediate synthetic image obtained by WDR synthesis is assumed not to have the saturation pixel value.

As indicated in (Formula 4) described above, a correspondence relation between an n-exposure image and an m-exposure image has the following relation:

$$I_n \cdot R_n^{-1} = I_m \cdot R_m^{-1} \quad \text{(Formula 4)}$$

The pixel value $I_{ng}$ that has been subjected to the gain adjustment can be derived based on (Formula 4) as follows.

When m in (Formula 4) is replaced with an index of the intermediate synthetic image, (Formula 4) can be expressed as the following (Formula 8):

$$I_n \cdot R_n^{-1} = I_{WDR} \cdot R_{WDR} \quad \text{(Formula 8)}$$

For example, when the index n of (Formula 8) is replaced with an index 0 of the 0-exposure image serving as the smallest exposure image can be expressed as the following (Formula 9).

$$I_0 \cdot R_0^{-1} = I_{WDR} \cdot R_{WDR}^{-1} \quad \text{(Formula 9)}$$

In (Formula 9), $I_0$ indicates the pixel value of the 0-exposure image that is not subjected to the gain adjustment. On the other hand, $I_{WDR}$ indicates the pixel value of the intermediate synthetic image.

The pixel value of the intermediate synthetic image corresponding to the pixel value on the line 130 in FIG. 14.

The pixel value $I_{0g}$ on the line 130 in the subject brightness of L3 to L4 illustrated in FIG. 14 is a pixel value corresponding to the pixel value $I_{WDR}$ of (Formula 9.

In other words, even when $I_{WDDR}$ of (Formula 9) is replaced with $I_{0g}$, (Formula 9) is held, and a relational expression of the following (Formula 9b) is held.

$$I_0 \cdot R_0^{-1} = I_{0g} \cdot R_{WDR}^{-1} \quad \text{(Formula 9b)}$$

According to (Formula 9b), the pixel value $I_{0g}$ on the line 130 in the subject brightness of L3 to L4 illustrated in FIG. 14 can be expressed by the following (Formula 10a).

$$I_{0g} = I_0 \cdot R_0^{-1} \cdot R_{WDR} \quad \text{(Formula 10a)}$$

Similarly, the pixel value $I_{1g}$ on the line 130 in the subject brightness of L2 to L3 illustrated in FIG. 14 can be expressed by the following (Formula 10b).

$$I_{1g} = I_1 \cdot R_1^{-1} \cdot R_{WDR} \quad \text{(Formula 10b)}$$

Similarly, the pixel value $I_{2g}$ on the line 130 in the subject brightness of L1 to L2 illustrated in FIG. 14 can be expressed by the following (Formula 10c).

$$I_{2g} = I_2 \cdot R_2^{-1} \cdot R_{WDR} \quad \text{(Formula 10c)}$$

Similarly, the pixel value $I_{3g}$ on the line 130 in the subject brightness of 0 to L1 illustrated in FIG. 14 can be expressed by the following (Formula 10d).

$$I_{3g} = I_3 \cdot R_3^{-1} \cdot R_{WDR} \quad \text{(Formula 10d)}$$

Next, the synthetic image noise threshold value $I_{nb}$ and the synthetic image saturation threshold value $I_{WLv}$ described above with reference to FIG. 13 will be described.

The noise threshold value $I_{nb}$ and the saturation threshold value $I_{WLv}$ of the intermediate synthetic image correspond to pixel values of boundary portions of effective regions of the 0- to 3-exposure images.

In other words, a boundary 131 illustrated in FIG. 14 is a noise threshold value $I_{0b}$ of the 0-exposure image, and corresponds to a saturation threshold value $I_{WLv1}$ of the 1-exposure image.

A boundary 132 illustrated in FIG. 14 is noise threshold value $I_{1b}$ of the 1-exposure image, and corresponds to a saturation threshold value $I_{WLv2}$ of the 2-exposure image.

A boundary 133 illustrated in FIG. 14 is a noise threshold value $I_{2b}$ of the 2-exposure image, and corresponds to a saturation threshold value $I_{WLv3}$ of the 3-exposure image.

As described above, [n] in the noise threshold value $I_{nb}$ and the saturation threshold value $I_{WLvn}$ are parameters 0 to 3 indicating a type of an input image, that is, which of the 0- to 3-exposure images an input image is.

The noise threshold value $I_{nb}$ and the saturation threshold value $I_{WLvn}$ illustrated in FIG. 13 have values that differ according to the exposure conditions of the intermediate synthetic image 113 and the input image that is subjected to the synthesis process.

Specifically, the synthetic image saturation threshold value $I_{WLvn}$ is an upper limit value in which the pixel values of the intermediate synthetic image 113 can be updated based on the pixel values of the intermediate synthetic image 113 and the input image 111 serving as the synthesis target, that is, the n-exposure image.

Further, the synthetic image noise threshold value $I_{nb}$ is a lower limit value in which the pixel values of the intermediate synthetic image 113 can be updated based on the pixel values of the intermediate synthetic image 113 and the input image 111 serving as the synthesis target, that is, the n-exposure image.

The pixel value of the boundary 131 illustrated in FIG. 14 corresponds to a pixel value of a line position 135 on the line 130 illustrated in FIG. 14.

The pixel value of the line position 135 corresponds to the pixel value $I_{1g}$ obtained by performing the gain adjustment on the saturation pixel value $I_{WLv}$ of the pixel value $I_1$ of the 1-exposure image.

Thus, the pixel value of the line position 135 on the line 130 illustrated in FIG. 14(b) can be calculated by replacing the pixel value $I_1$ in (Formula 10b) with the saturation threshold value $I_{WLv}$. This calculation formula is the following (Formula 11a):

$$\text{pixel value of boundary } 131 = I_{WLv} \cdot R_1^{-1} \cdot R_{WDR} \quad \text{(Formula 11a)}$$

In other words, noise threshold value $I_{0b}$ of 0-exposure image = $I_{WLv} \cdot R_1^{-1} \cdot R_{WDR}$, and saturation threshold value $I_{WLv1}$ of 1-exposure image = $I_{WLv} \cdot R_1^{-1} \cdot R_{WDR}$.

Similarly, a pixel value of a line position 136 on the line 130 illustrated in FIG. 14(b) serving as the pixel value of the boundary 132 illustrated in FIG. 14 is obtained by the following (Formula 11b):

$$\text{pixel value of boundary } 132 = I_{WLv} \cdot R_2^{-1} \cdot R_{WDR} \quad \text{(Formula 11b)}$$

In other words, noise threshold value $I_{1b}$ of 1-exposure image = $I_{WLv} \cdot R_2^{-1} \cdot R_{WDR}$, and saturation threshold value $I_{WLv2}$ of 2-exposure image = $I_{WLv} \cdot R_2^{-1} \cdot R_{WDR}$.

Similarly, a pixel value of a line position 137 on the line 130 illustrated in FIG. 14(b) serving as the pixel value of the boundary 133 illustrated in FIG. 14 is obtained by the following (Formula 11c):

$$\text{pixel value of the boundary } 133 = I_{WLv} \quad \text{(Formula 11c)}$$

In other words, noise threshold value $I_{2b}$ of 2-exposure image = $I_{WLv} \cdot R_3^{-1} \cdot R_{WDR}$ saturation threshold value $I_{WLv3}$ of 3-exposure image = $I_{WLv} \cdot R_3^{-1} \cdot R_{WDR}$.

The intermediate synthetic image region determining unit 122 of the image synthesis processing unit 101 illustrated in FIG. 10 performs a process of calculating the noise threshold value $I_{nb}$ and the saturation threshold value $I_{WLvn}$ corresponding to the intermediate synthetic image 113 input to the intermediate synthetic image region determining unit 122 and classifying the pixel values of the respective images into three pixels, that is, the noise pixel, the effective pixel, and the saturation pixel based on the threshold value thereof as illustrated in FIG. 13 as described above.

The pixel classification information (saturation/effective/noise) corresponding to the intermediate synthetic image 113 generated by the intermediate synthetic image region determining unit 122 is input to the update method deciding unit 123 illustrated in FIG. 10.

[2-3. Processing of Update Method Deciding Unit]

Next, processing of the update method deciding unit 123 of the image synthesis processing unit 101 illustrated in FIG. 10 will be described with reference to FIG. 15.

The update method deciding unit 123 receives the following information:

(1) the pixel classification information (saturation/effective/noise) corresponding to the input image 111 generated by the input image region determining unit 121; and (2) the pixel classification information (saturation/effective/noise) corresponding to the intermediate synthetic image 113 generated by the intermediate synthetic image region determining unit 122, and decides an update method of updating the pixels of the intermediate synthetic image 113 according to a combination of corresponding pixels of the input image 111 and the intermediate synthetic image 113.

Specifically, an update form decision process is performed according to a setting illustrated in FIG. 15.

In other words, the process is performed in the following forms.

(1) When at least one of the corresponding pixels of the input image and the intermediate synthetic image is the effective pixel, the 3DNR process by the pixel value synthesis of the input image and the intermediate synthetic image is performed to update the pixel value of the intermediate synthetic image.

(2) When both of the corresponding pixels of the input image and the intermediate synthetic image are the saturation pixel or the noise pixel, the synthesis using the input image is not performed, and the pixel value of the intermediate synthetic image is output without change.

(3) When the corresponding pixels of the input image and the intermediate synthetic image is a combination in which one is the saturation pixel, and the other is the noise pixel, either of the following processes (3a) and (3b) is performed:

(3a) the 3DNR process by the pixel value synthesis of the input image and the intermediate synthetic image; and (3b) the process of outputting the pixel value of the intermediate synthetic image without change without performing the synthesis using the input image.

Further, as a specific processing example (3) when the corresponding pixels of the input image and the intermediate synthetic image is a combination in which one is the saturation pixel, and the other is the noise pixel among the above processes, preferably, for example, any of the following setting illustrated in FIGS. 16(a) to 16(c) is selected and executed according to a desire for an output image.

Processes according to settings illustrated in FIGS. 16(a) to 16(c) will be sequentially described.

(Process According to Setting Illustrated in FIG. 16(a))

A process according to a setting illustrated in FIG. 16(a) is a setting in which the 3DNR synthesis process is performed in both cases of [input image=saturation pixel, intermediate synthetic image=noise pixel] and [input image=noise pixel, intermediate synthetic image=saturation pixel].

When it is desired to use an image that is as new as possible in terms of time as an output image, a 3DNR process by a pixel value synthesis of an input image and a motion-compensated intermediate synthetic image in which an intermediate synthetic image is aligned with an image position of the input image using the input image as a reference image is performed as illustrated in FIG. 16(a).

Further, when the pixel of the input image is the saturation pixel, the pixel value of the input image after the exposure correction is compared with a predetermined fixed value, and when the pixel value of the input image is larger than the fixed value (a clip value: $I_{clipn}$), a clip process of outputting a fixed value that is decided for each exposure condition of the input image may be performed instead of the 3DNR process.

When a pixel value of the intermediate synthetic image before the clip process is Ibn, and a pixel value after the clip process is Icn, and the clip value is $I_{clipn}$, the pixel value Icn after the clip process has the following setting:

Ic=Ibn for a pixel in which Ibn<$I_{clipn}$ is held, and

Icn=$I_{clipn}$ for a pixel in which Ibn<$I_{clipn}$ is not held.

When the clip process is performed, pixel value conversion is performed according to the above setting.

Further, as the fixed value (the clip value: $I_{clipn}$) of each exposure condition of the input image in the clip process, a value common to RGB or a value that differs according to each of RGB may be used. As a specific fixed value, the input image saturation threshold value described above with reference to FIGS. 11 to 14, an intermediate synthetic image saturation threshold value, a value of the integral number multiple of the threshold value, or the like may be used.

(Processing According to Setting Illustrated in FIG. 16(b))

A process according to a setting illustrated in FIG. 16(b) is a setting in which the 3DNR process is performed in the case of [input image=saturation pixel, intermediate synthetic image=noise pixel], and the intermediate synthetic image output is performed in the case of [input image=noise pixel, intermediate synthetic image=saturation pixel].

When it is desired to acquire an image having a small noise although the texture of an output image is lost, the setting illustrated in FIG. 16(b) is used.

In other words, in the case of [input image=saturation pixel, intermediate synthetic image=noise pixel], the 3DNR process of performing the pixel value synthesis of the corresponding pixels of the input image and the intermediate synthetic image is performed. Further, in the case of [input image=noise pixel, intermediate synthetic image=saturation pixel], the pixel value of the input image is not applied, and the intermediate synthetic image is output without change.

This process is a process of reflecting a pixel determined to be saturated and setting a pixel value of an output image, and the texture may be lost, but an image having a small noise can be generated.

In this process (b), similarly to the process (a), when the pixel of the input image is the saturation pixel, the process may be simplified by the same clip process as the process (a).

(Process According to Setting Illustrated in FIG. 16(c))

A process according to a setting illustrated in FIG. 16(c) is a setting in which the intermediate synthetic image output is performed in the case of [input image=saturation pixel, intermediate synthetic image=noise pixel], and the 3DNR process is performed in the case of [input image=noise pixel, intermediate synthetic image=saturation pixel].

When it is desired to acquire an image having the texture of an image although an output image has a large noise, a setting illustrated in FIG. 16(c) is used.

In other words, in the case of [input image=saturation pixel, intermediate synthetic image=noise pixel], the pixel value of the input image is not applied, and the intermediate synthetic image is output without change. Further, in the case of [input image=noise pixel, intermediate synthetic image=saturation pixel], the 3DNR process of performing the pixel value synthesis of the corresponding pixels of the input image and the intermediate synthetic image is performed.

This process is a process of reflecting a pixel determined to have a noise and setting a pixel value of an output image, and a noise may be increased, but an image having the texture of an image can be generated.

The image processing unit may be configured to perform any of the settings illustrated in FIGS. 16(a) to 16(c) or may be configured to be able to switch the settings of FIGS. 16(a) to 16(c). In other words, when the corresponding pixels of the input image and the intermediate synthetic image are a combination in which one is the saturation pixel, and the other is the noise pixel, a process to be executed may be switched according to the user's desire for a type of an output image that is desired to be output. Specifically, for example, the image processing unit is configured to have a processing mode selecting function capable of selectively performing the processes illustrated in FIGS. 16(a) to 16(c), and performs a mode setting according to the user's input.

The image processing device according to the present disclosure is configured to classify pixel forms of an input image and an intermediate synthetic image into three forms, that is, the "saturation pixel", the "effective pixel", and the "noise pixel" and perform a different process according to a combination thereof as described above with reference to FIG. 15 and FIGS. 16(a) to 16(c).

In other words, the following processes are performed as described above.

(1) When at least one of the corresponding pixels of the input image and the intermediate synthetic image is the effective pixel, the 3DNR process by the pixel value synthesis of the input image and the intermediate synthetic image is performed to update the pixel value of the intermediate synthetic image.

(2) When both of the corresponding pixels of the input image and the intermediate synthetic image are the saturation pixel or the noise pixel, the synthesis using the input image is not performed, and the pixel value of the intermediate synthetic image is output without change.

(3) When the corresponding pixels of the input image and the intermediate synthetic image is a combination in which one is the saturation pixel, and the other is the noise pixel, either of the following processes (3a) and (3b) is performed:

(3a) the 3DNR process by the pixel value synthesis of the input image and the intermediate synthetic image; and (3b) the process of outputting the pixel value of the intermediate synthetic image without change without performing the synthesis using the input image.

An example of effects obtained as such processes are performed will be described with reference to FIG. 17.

FIG. 17 is a diagram for describing an exemplary synthesis process of applying input images set to different exposure conditions. The following images are illustrated in FIG. 17:

(1) images and data based on input images:

(1a) an imaging element output image;

(1b) an exposure-corrected input image obtained by performing exposure correction on an imaging element output image; and (1c) input image effective pixel region information indicating an effective pixel region of an imaging element output image, (2) an intermediate synthetic image (an image updated at an immediately previous timing):

(2A) a processing example of a related art (an example of a synthetic image update process of selecting only an effective region of an input image and updating a synthetic image); and (2B) a processing example of the present disclosure (an example of a synthetic image update process of updating a synthetic image by a process according to a setting illustrated in FIG. 16(a)).

FIG. 17 illustrates these images.

A time axis on an uppermost portion illustrates the passage of time from the left to the right.

The imaging element output image illustrated in (1a) is an output of an imaging element at times t0 to t3:

a small exposure amount image (exposure 0) at the time t0: an image 1a (t0);

an intermediate exposure amount image (exposure 1) at the time t1: an image 1a (t1); and a large exposure amount image (exposure 2) at the time t2: an image 1a (t2).

The exposure amount has the following relation:

Exposure 0<exposure 1<exposure 2

As described above, the images 1a (t0) to 1a (t3), that is, photographed images of three different exposure conditions are input from the imaging element. The images 1a (t0) to 1a (t3) correspond to the input image 111 illustrated in FIGS. 7 and 10.

In this example, images of three types of different exposure conditions are assumed to be continuously photographed and sequentially input. In other words, one WDR set includes images in which three different exposure conditions are set, and the image processing unit sequentially receives the WDR set.

This input image includes a moving subject. A moving subject 141 is included as illustrated in FIG. 17. The moving subject 141 shown the imaging element output image 1a (t0) to 1a (t2) is a rectangular object having a three-layer configuration in which the subject brightness is high brightness, intermediate brightness, and low brightness from the top, and is a moving subject indicating a motion of clockwise rotation according to the passage of time.

Exposure-corrected input images 1b (t0) to 1b (t2) of (1b) are images obtained by performing the gain adjustment on the pixel values of the imaging element output images 1a (t0) to 1a (t2). In other words, the exposure-corrected input image of (1b) is an image obtained by correcting the pixel value when an image of each exposure condition is assumed to be subjected to the same exposure as the intermediate synthetic image (here, the exposure condition of the 2-exposure image is used as an exposure condition of the intermediate synthetic image) as described above with reference to FIG. 14. The exposure-corrected input image of (1b) corresponds to the image that has been subjected to the pixel value setting process corresponding to the line 130 illustrated in FIG. 14.

Input image effective pixel region information 1c (t0) to 1c (t2) of (1c) is information indicating effective pixel regions of the input image, that is, the imaging element output images 1a (t0) to 1a (t2) of (1a). In other words, the information is region information in which the noise pixel and the saturation pixel are excluded, and only the effective pixel region is selected. A white region shown in the input image effective pixel region information 1c (t0) to 1c (t2) is the effective pixel region, and a black region corresponds to the saturation pixel or the noise pixel.

The intermediate synthetic image of (2) indicates intermediate synthetic images at times t0, t1, t2, and the like. The intermediate synthetic image of (2) corresponds to the intermediate synthetic image 113 illustrated in FIGS. 7 and 10.

Further, a hatched region in the image indicates a non-updated region in which the update process is not performed in the corresponding WDR set. In the example illustrated in FIG. 17, the non-updated region is a region in which a pixel value of an intermediate synthetic image 2A (t0) or a pixel value of an intermediate synthetic image 2B (t0) at a time t0 is maintained without change.

(2A) the processing example of the related art on the upper portion corresponds to an intermediate synthetic image update process according to the related art. This process is a process in which only an effective region of an input image is selected, a pixel value synthesis of an intermediate synthetic image is performed on the effective region of the input image to update the pixel value of the intermediate synthetic image, and for the noise region and the saturation region of the input image, the pixel value of the intermediate synthetic image is output without change without updating the intermediate synthetic image.

On the other hand, (2B) the processing example of the present disclosure on the lower portion corresponds to the intermediate synthetic image update process according to the present disclosure. Specifically, it is a processing example according to the setting of FIG. 16(a), and the intermediate synthetic image is updated in the following processing forms.

(1) When at least one of the corresponding pixels of the input image and the intermediate synthetic image is the effective pixel, the 3DNR process by the pixel value synthesis of the input image and the intermediate synthetic image is performed to update the pixel value of the intermediate synthetic image.

(2) When both of the corresponding pixels of the input image and the intermediate synthetic image are the saturation pixel or the noise pixel, the synthesis using the input image is not performed, and the pixel value of the intermediate synthetic image is output without change.

(3) When the corresponding pixels of the input image and the intermediate synthetic image are a combination in which one is the saturation pixel, and the other is the noise pixel, the 3DNR process by the pixel value synthesis of the input image and the intermediate synthetic image is performed to update the pixel value of the intermediate synthetic image.

The intermediate synthetic images illustrated in the processing example of the present disclosure of in FIG. 17 (2B) are intermediate synthetic images generated by the process of deciding according to the pixel form (saturation/effective/noise) of the input image value intermediate synthetic image as described above.

A difference between the intermediate synthetic images of (2A) and (2B) illustrated in FIG. 17 (2) will be described.

Intermediate synthetic images at a time t0, that is, an intermediate synthetic image 2A (t0) of the process of the related art and an intermediate synthetic image 2B (t0) of the process of the present disclosure are assumed to be synthetic images generated based on a previous input image and assumed to be the same image.

An intermediate synthetic image 2A (t1) at a time t1 in (2A) the processing example of the related art is an image generated by the synthesis process of the following two images:

the exposure-corrected input image 1b (t0) at the time t0 illustrated in (1b); and the intermediate synthetic image 2A (t0) at the time to illustrated in (2A).

In (2A) the processing example of the related art, the synthesis process using only the effective pixel region of the input image is performed, and for the other pixel portions, the pixel values of the intermediate synthetic image 2A (t0) at the time t0 are output without change.

As a result, the intermediate synthetic image 2A (t1) at the time t1 illustrated in (2A) the processing example of the related art becomes an image configured with the following pixel values:

for the effective pixel region of the input image selected according to the effective pixel region information 1c (t0), the synthetic pixel value of the exposure-corrected input image 1b (t0) of the imaging element output image 1a (t0) and the intermediate synthetic image 2A (t0); and for the regions (the noise region or the saturation region) other than the effective pixel region of the input image, the pixel value of the intermediate synthetic image 2A (t0).

As a result, the intermediate synthetic image 2A (t1) at the time t1 illustrated in (2A) the processing example of the related art is an image in which only the sun, the cloud, and the high brightness portion of the moving subject 141 are the updated region to which the pixel value of the exposure-corrected input image 1b (t0) is applied, and the remaining region is the non-updated region.

On the other hand, the intermediate synthetic image 2B (t1) at the time t1 in (2B) the processing example of the present disclosure is an image generated by the synthesis process of the following two images:

the exposure-corrected input image 1b (t0) at the time t0 illustrated in (1b); and the intermediate synthetic image 2B (t0) at the time t0 illustrated in (2B).

In (2B) the processing example of the present disclosure, the process according to the combination of the pixel form (saturation/effective/noise) of the input image and the intermediate synthetic image is performed according to the setting illustrated in FIG. 16(a).

As a result, the intermediate synthetic image 2B (t1) at the time t1 illustrated in (2B) the processing example of the present disclosure becomes an image configured with the following pixel values:

when the corresponding pixels of the input image and the intermediate synthetic image are a combination of [saturation pixel-saturation pixel] or [noise pixel-noise pixel], the pixel value of the intermediate synthetic image 2B (t0); and when the corresponding pixels of the input image and the intermediate synthetic image is not a combination of [saturation pixel-saturation pixel] or [noise pixel-noise pixel], the synthetic pixel values of the exposure-corrected input image 1b (t0) of the imaging element output image 1a (t0) and the intermediate synthetic image 2B (t0).

The image is configured with such pixel values.

Here, the imaging element output image 1a (t0) at the time t0 is the small exposure amount image and does not include the saturation pixel.

On the other hand, as described above with reference to FIG. 11, the noise pixel is a region having a pixel value equal to or smaller than an lower limit pixel value of an effective pixel, and all black regions other than the white regions illustrated in the input image effective pixel region information 1c (t0) of FIG. 17 are the noise region.

On the other hand, in the intermediate synthetic image 2B (t0) at the time t0, the synthetic image noise threshold value $I_{nb}$ and the synthetic image saturation threshold value $I_{WLvn}$ are acquired according to the process described above with reference to FIGS. 13 and 14. As described above, the synthetic image noise threshold value $I_{nb}$ and the synthetic image saturation threshold value $I_{WLvn}$ illustrated in FIG. 13 have a value differing according to the exposure conditions of the intermediate synthetic image 113 and the input image 111 that is subjected to the synthesis process.

The synthetic image saturation threshold value $I_{WLvn}$ of the intermediate synthetic image 2B (t0) at the time t0 is decided according to the exposure condition of the imaging element output image 1a (t0) at the time t0 serving as the synthesis target.

The 0-exposure image in the example illustrated in FIG. 14 is assumed to be the 0-exposure image illustrated in FIG. 17. The 2-exposure image is assumed to be the largest exposure amount image in the example of FIG. 17. In this case, as described above with reference to FIG. 14, the synthetic image noise threshold value $I_{nb}=I_{0b}$ of the intermediate synthetic image 2B (t0) is calculated as follows:

$$I_{0b}=I_{WLv} \cdot R_1^{-1} \cdot R_{WDR}=I_{WLv} \cdot R_1^{-1} \cdot R_2$$

The synthetic image noise threshold value $I_{0b}$ of the intermediate synthetic image 2B (t0) calculated by the above formula is a value corresponding to the noise threshold value of the imaging element output image 1a (t0) at the time t0, and consequently, in the intermediate synthetic image 2B (t0) at the time t0, the regions other than the sun, the cloud, and the high brightness portion of the moving subject 141 are the noise region.

Thus, according to the setting illustrated in FIG. 16(a), for the cloud, the sun, and the high brightness portion of the moving subject 141 corresponding to the effective region of the imaging element output image 1a (t0), the synthetic pixel value of the exposure-corrected input image 1b (t0) of the imaging element output image 1a (t0) and the intermediate synthetic image 2B (t0) is output.

For the remaining portion, since the corresponding pixels of the imaging element output image 1a (t0) and the intermediate synthetic image 2B (t0) are a combination of [noise pixel-noise pixel], the pixel value of the intermediate synthetic image 2B (t0) is output without change.

Here, as illustrated in FIG. 17, the moving subject 141 of the imaging element output image 1a (t0) at the time t0 is at a position different from a position of the moving subject of the intermediate synthetic image 2B (t0) at the time t0 generated at an immediately previous timing.

In the technique of the related art, a non-updated region remains in the effective region of the intermediate synthetic image due to deviation according to movement of the moving subject 141. In the present technique, since all the effective regions of the intermediate synthetic image are updated, a region having brightness enough to serve as the effective region of the input image in the image can be guaranteed to be updated at least once. In the process at the time t0, the update of the high brightness region in the screen is guaranteed.

Processing on the moving subject regions of the imaging element output image 1a (t0) and the intermediate synthetic image 2B (t0) will be described with reference to FIG. 18.

Figure 18:
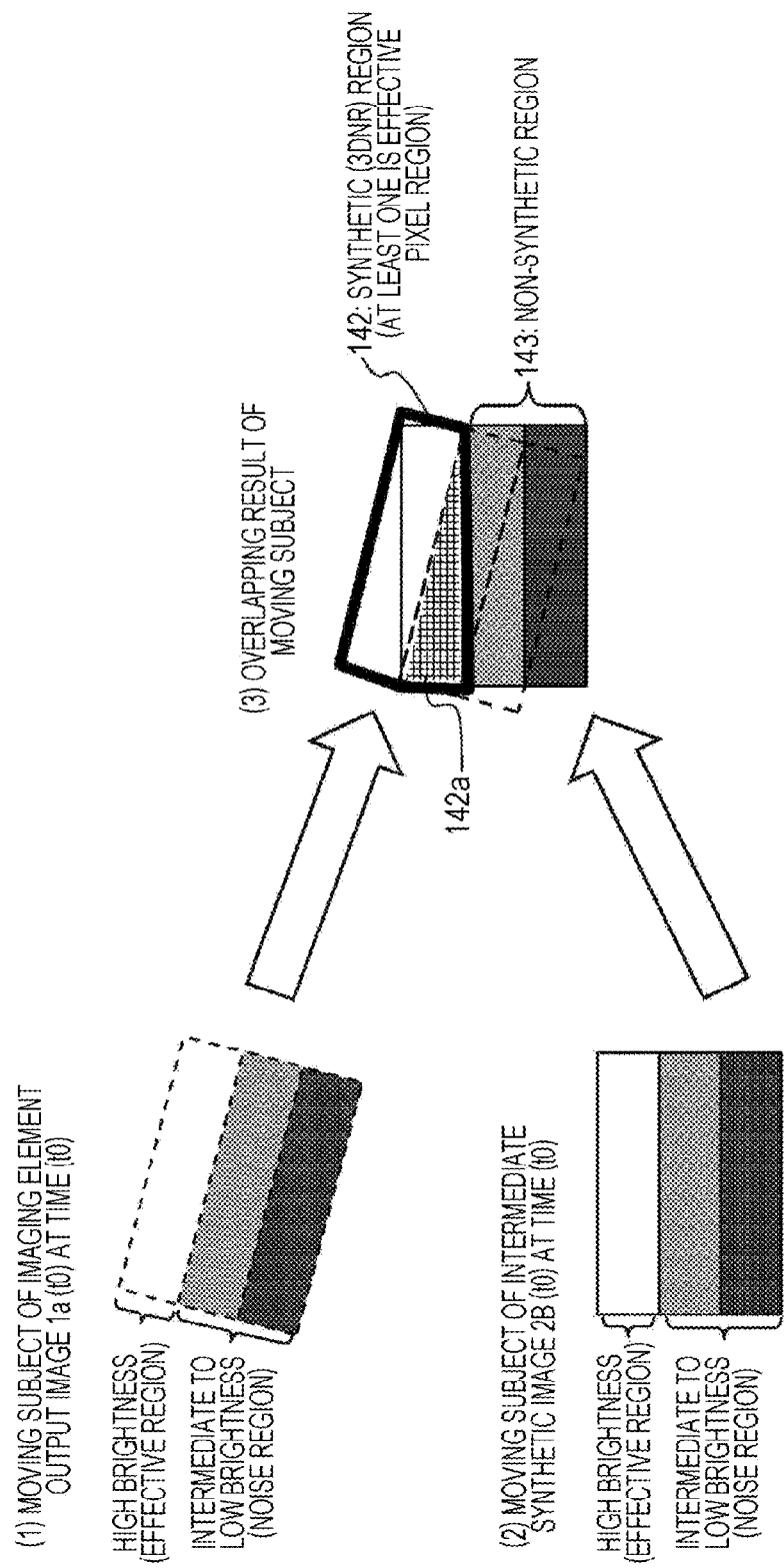
FIG. 18 is a diagram for describing a specific example of an image update process in a moving subject region performed by an image processing device according to an embodiment of the present disclosure.

FIG. 18 is an enlarged view illustrating regions of the moving subjects 141 of the imaging element output image 1a (t0) and the intermediate synthetic image 2B (t0) and an overlapping image thereof.

FIG. 18 illustrates the following diagrams:

(1) the moving subject of the imaging element output image 1a (t0);

(2) the moving subject of the intermediate synthetic image 2B (t0); and (3) an overlapping result of the moving subject region.

The moving subject has a layer configuration of high brightness, intermediate brightness, and low brightness from the top.

Here, only the high brightness region is the effective region of the imaging element output image 1a (t0).

(2) the moving subject of the intermediate synthetic image 2B (t0) is generated based on an image before (1) the imaging element output image 1a (t0) is input, and thus the positions of the moving subjects of the two images are different from each other.

FIG. 18 (3) is a diagram in which (1) the moving subject of the imaging element output image 1a (t0) and (2) the moving subject of the intermediate synthetic image 2B (t0) are indicated by a dotted line and a solid line, respectively, and caused to overlap each other.

A region surrounded by a thick line illustrated in FIG. 18 (3) is a synthetic region 142, that is, a synthetic (3DNR) region of two images, that is, the exposure-corrected input image 1b (t0) and the intermediate synthetic image 2B (t0). The remaining region is a non-synthetic region 143, that is, a region in which the intermediate synthetic image is output without change.

The synthetic region 142 illustrated in FIG. 18 (3) is the effective region (the high brightness region) of at least one of the imaging element output image 1a (t0) and the intermediate synthetic image 2B (t0), and the 3DNR process is performed according to the processing setting illustrated in FIG. 16(a).

In the synthetic region 142 illustrated in FIG. 18 (3), a region 142a is a region not serving as the synthesis processing target in the process of the related art of FIG. 17 (2A), and is a non-synthetic region in which the intermediate synthetic image is output without change. However, as the process of the present disclosure is performed, the region 142a is added as the synthesis processing target.

As described above, by performing the process of the present disclosure, it is possible to increase a synthetic region in a moving subject, that is, a region in which a pixel value of a new input image is reflected.

Further, the two intermediate synthetic images at a next timing, that is, the time t2 are compared. In other words, the following two images are compared:

the intermediate synthetic image 2A (t2) in (2A) the process of the related art; and the intermediate synthetic image 2B (t2) in (2B) the process of the present disclosure.

The intermediate synthetic image 2A (t2) in (2A) the process of the related art is an image generated by the synthesis process of the following two images:

the exposure-corrected input image 1b (t1) at the time t1 illustrated in (1b); and the intermediate synthetic image 2A (t1) at the time t1 illustrated in (2A).

In (2A) the processing example of the related art, the synthesis process using only the effective pixel region of the input image is performed, and for the other pixel portion, the pixel value of the intermediate synthetic image 2A (t1) at the time t1 is output without change.

As a result, the intermediate synthetic image 2A (t2) at the time t2 illustrated in (2A) the processing example of the related art is an image configured with the following pixel values:

for the effective pixel region of the input image selected according to the effective pixel region information 1c (t1), the synthetic pixel value of the exposure-corrected input image 1b (t1) of the imaging element output image 1a (t1) and the intermediate synthetic image 2A (t1); and for the region (the noise region or the saturation region) other than the effective pixel region of the input image, the pixel value of the intermediate synthetic image 2A (t1).

The image is configured with such pixel values.

As a result, the intermediate synthetic image 2A (t2) at the time t2 illustrated in (2A) the processing example of the related art is an image in which only the background and the intermediate brightness portion of the moving subject 141 are the update region to which the pixel value of the exposure-corrected input image 1b (t1) is applied, and the remaining region is output as the non-updated region.

On the other hand, the intermediate synthetic image 2B (t2) at the time t2 in (2B) the processing example of the present disclosure is an image generated by the synthesis process of the following two images:

the exposure-corrected input image 1b (t1) at the time t1 illustrated in (1b); and the intermediate synthetic image 2B (t1) at the time t1 illustrated in (2B).

In (2B) the processing example of the present disclosure, the process according to a combination of the pixel forms (saturation/effective/noise) of the input image and the intermediate synthetic image is performed according to the setting illustrated in FIG. 16(*a*).

As a result, the intermediate synthetic image 2B (t2) at the time t2 illustrated in (2B) the processing example of the present disclosure is an image configured with the following pixel values:

when the corresponding pixels of the input image and the intermediate synthetic image is a combination of [saturation pixel-saturation pixel] or [noise pixel-noise pixel], the pixel value of the intermediate synthetic image 2B (t1); and when the corresponding pixels of the input image and the intermediate synthetic image is neither a combination of [saturation pixel-saturation pixel] or [noise pixel-noise pixel], the synthetic pixel value of the exposure-corrected input image 1b (t1) of the imaging element output image 1a (t1) and the intermediate synthetic image 2B (t1).

The image is configured with such pixel values.

Here, the imaging element output image 1a (t1) at the time t1 is the intermediate exposure amount image, and the cloud, the sun, and the high brightness portion of the moving subject 141 are the saturation pixel region.

Further, the mountain and the low brightness portion of the moving subject 141 are the noise pixel region.

On the other hand, in the intermediate synthetic image 2B (t1) at the time t1, the synthetic image noise threshold value $I_{nb}$ and the synthetic image saturation threshold value $I_{WLvn}$ are acquired according to the process described above with reference to FIGS. 13 and 14. As described above, the synthetic image noise threshold value $I_{nb}$ and the synthetic image saturation threshold value $I_{WLvn}$ illustrated in FIG. 13 have a value differing according to the exposure conditions of the intermediate synthetic image 113 and the input image 111 that is subjected to the synthesis process.

The synthetic image noise threshold value $I_{nb}$ and the synthetic image saturation threshold value $I_{WLvn}$ of the intermediate synthetic image 2B (t1) at the time t1 are decided according to the exposure condition of the imaging element output image 1a (t1) at the time t1 serving as the synthesis target.

The 1-exposure image in the example illustrated in FIG. 14 is assumed to be the 1-exposure image illustrated in FIG. 17. The 2-exposure image is assumed to be the largest exposure amount image. Here, since the exposure condition of the intermediate synthetic image is assumed to be the same condition as the exposure condition of the 2-exposure image, in this case, the synthetic image noise threshold value $I_{nb}$ and the synthetic image saturation threshold value $I_{WLvn}=I_{WLv1}$ of the intermediate synthetic image 2B (t1) are calculated as follows as described above with reference to FIG. 14:

$$I_{nb}=I_{1b}=I_{WLv}; \text{ and}$$

$$I_{WLvn}=I_{WLv1}=I_{WLv}\cdot R_1^{-1}\cdot R_{WDR}=I_{WLv}\cdot R_1^{-1}\cdot R_2.$$

The synthetic image noise threshold value $I_{1b}$ and the synthetic image saturation threshold value $I_{WLv1}$ of the intermediate synthetic image 2B (t1) calculated by the above formulas have values corresponding to the noise threshold value and the saturation threshold value of the imaging element output image 1a (t1) at the time t1. Consequently, in the intermediate synthetic image 2B (t1) at the time t1, the cloud, the sun, and the high brightness portion of the moving subject 141 are the saturation pixel region. Further, the mountain and the low brightness portion of the moving subject 141 are the noise pixel region.

Thus, according to the setting illustrated in FIG. 16(*a*), for the overlapping region of the cloud, the sun, and the high brightness portion of the moving subject 141 and the overlapping region of the mountain and the low brightness portion of the moving subject 141 of the imaging element output image 1a (t1) and the intermediate synthetic image 2B (t1), the pixel value of the intermediate synthetic image 2B (t1) is output without change.

For the remaining portion, the synthetic pixel value of the exposure-corrected input image 1b (t1) of the imaging element output image 1a (t1) and the intermediate synthetic image 2B (t1) is output.

Here, in the process at the time t1, similarly to the process at the time t0, the moving subject 141 of the imaging element output image 1a (t1) at the time t1 is at a position different from the position of the moving subject of the intermediate synthetic image 2B (t1) at the time t1 generated at an immediately previous timing as illustrated in FIG. 17.

Due to the deviation according to movement of the moving subject 141, the region in which the imaging element output image 1a (t1) and the intermediate synthetic image 2B (t1) have a combination of [noise pixel-noise pixel] or [saturation pixel-saturation pixel] is narrowed, and thus the region in which the pixel value of the intermediate synthetic image 2B (t1) is output without change is reduced.

Processing on the moving subject regions of the imaging element output image 1a (t1) and the intermediate synthetic image 2B (t1) will be described with reference to FIG. 19.

Figure 19:
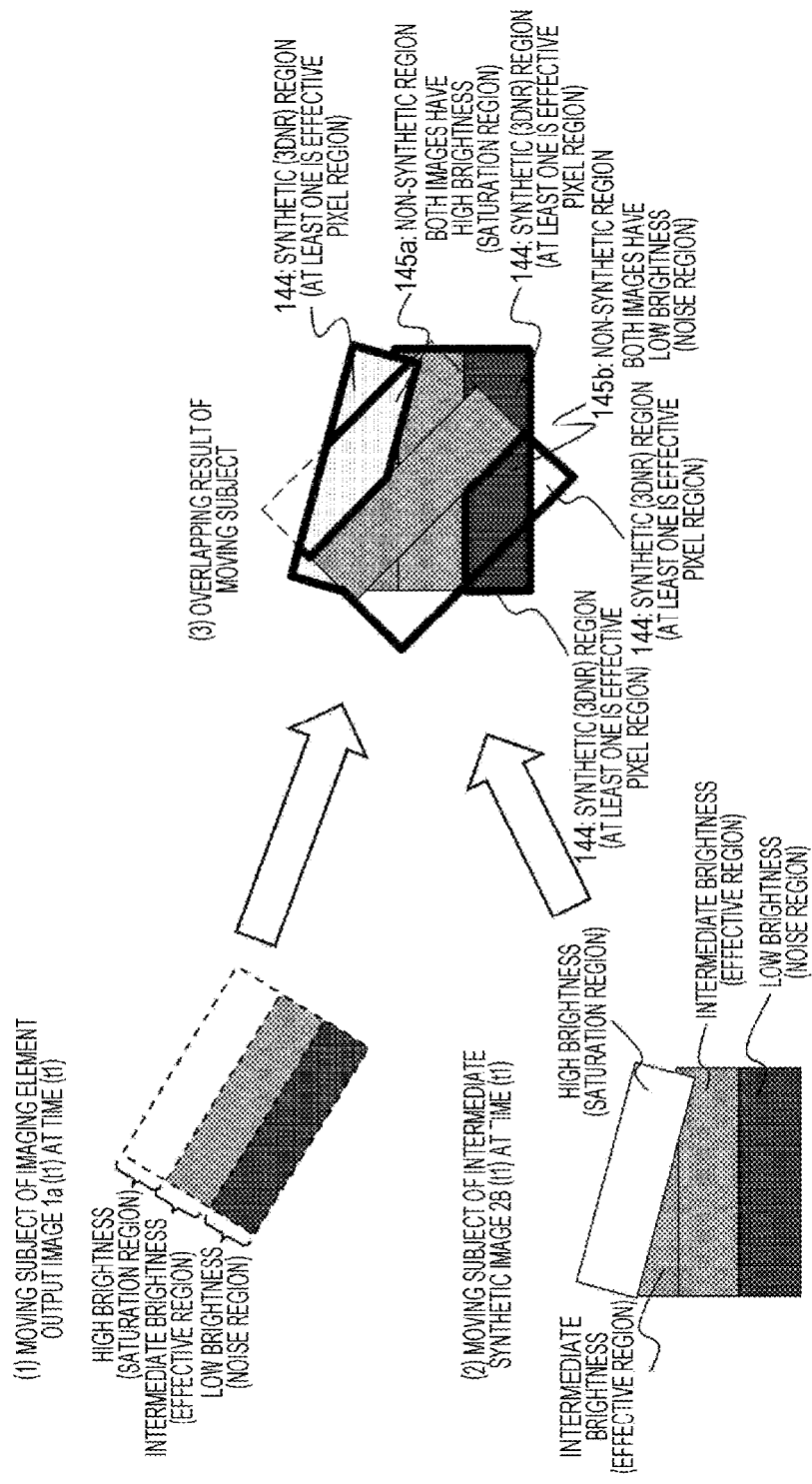
FIG. 19 is a diagram for describing a specific example of an image update process in a moving subject region performed by an image processing device according to an embodiment of the present disclosure.

FIG. 19 is an enlarged view illustrating regions of the moving subjects 141 of the imaging element output image 1a (t1) and the intermediate synthetic image 2B (t1) and an overlapping image thereof.

FIG. 19 illustrates the following diagrams:

(1) the moving subject of the imaging element output image 1a (t1);

(2) the moving subject of the intermediate synthetic image 2B (t1); and (3) an overlapping result of the moving subject region.

The moving subject has a layer configuration of high brightness, intermediate brightness, and low brightness from the top.

Here, only the high brightness region is the effective region of the imaging element output image 1a (t1).

(2) the moving subject of the intermediate synthetic image 2B (t1) is generated based on an image before (1) the imaging element output image 1a (t1) is input, and thus the positions of the moving subjects of the two images are different from each other.

FIG. 19 (3) is a diagram in which (1) the moving subject of the imaging element output image 1a (t1) and (2) the moving subject of the intermediate synthetic image 2B (t1) are indicated by a dotted line and a solid line, respectively, and caused to overlap each other.

A region surrounded by a thick line illustrated in FIG. 19 (3) is a synthetic region 144, that is, a synthetic (3DNR) region of two images, that is, the exposure-corrected input image 1b (t1) and the intermediate synthetic image 2B (t1). The remaining region is a non-synthetic region 145, that is, a region in which the intermediate synthetic image is output without change.

The non-synthetic region includes a non-synthetic region 145a in which both of the two images are the saturation region and a non-synthetic region 145b in which both of the two images are the noise region.

The synthetic region 144 illustrated in FIG. 19 (3) is the effective region (the intermediate brightness region) of at least one of the imaging element output image 1a (t1) and the intermediate synthetic image 2B (t1), and the 3DNR process is performed according to the processing setting illustrated in FIG. 16(a).

The synthetic region 144 illustrated in FIG. 19 (3) includes a number of regions not serving as the synthesis processing target in the process of the related art of FIG. 17 (2A). As the process of the present disclosure is performed, a number of regions are added as the synthesis processing target. Specifically, as all the effective regions of the intermediate synthetic image are also updated through the process of the present disclosure, a region having brightness enough to serve as the effective region of the input image in the image can be guaranteed to be updated at least once. In the process at the time t1, the update of the intermediate brightness region in the screen is guaranteed. Together with the process at the time t0, the intermediate and high brightness regions in the screen can be guaranteed to be updated once based on the WDR set image.

As described above, by performing the process of the present disclosure, it is possible to increase a synthetic region in a moving subject, that is, a region in which a pixel value of a new input image is reflected.

The intermediate synthetic image at a next timing, that is, a time t3 has the following setting:

the intermediate synthetic image 2A (t3) in (2A) the process of the related art is an image generated by the synthesis process of the following two images:

the exposure-corrected input image 1b (t2) at the time t2 illustrated in (1b); and the intermediate synthetic image 2A (t2) at the time t2 illustrated in (2A).

In (2A) the processing example of the related art, the synthesis process using only the effective pixel region of the input image is performed, and for the remaining pixel portion, the pixel value of the intermediate synthetic image 2A (t2) at the time t2 is output without change.

As a result, the intermediate synthetic image 2A (t3) at the time t3 illustrated in (2A) the processing example of the related art becomes an image configured with the following pixel values:

for the effective pixel region of the input image selected according to the effective pixel region information 1c (t2), the synthetic pixel value of the exposure-corrected input image 1b (t2) of the imaging element output image 1a (t2) and the intermediate synthetic image 2A (t2); and for the region (the noise region or the saturation region) other than the effective pixel region of the input image, the pixel value of the intermediate synthetic image 2A (t2).

The image is configured with such pixel values.

As a result, the intermediate synthetic image 2A (t3) at the time t3 illustrated in (2A) the processing example of the related art becomes an image in which only the mountain and the low brightness portion of the moving subject 141 are the updated region to which the pixel value of the exposure-corrected input image 1b (t2) is applied, and the remaining region is output as the non-updated region.

On the other hand, the intermediate synthetic image 2B (t3) at the time t3 in (2B) the processing example of the present disclosure is an image generated by the synthesis process of the following two images:

the exposure-corrected input image 1b (t2) at the time t2 illustrated in (1b); and the intermediate synthetic image 2B (t2) at the time t2 illustrated in (2B).

In (2B) the processing example of the present disclosure, the process according to a combination of the pixel forms (saturation/effective/noise) of the input image and the intermediate synthetic image is performed according to the setting illustrated in FIG. 16(a).

As a result, the intermediate synthetic image 2B (t3) at the time t3 illustrated in (2B) the processing example of the present disclosure becomes an image configured with the following pixel values:

when the corresponding pixels of the input image and the intermediate synthetic image is a combination of [saturation pixel-saturation pixel] or [noise pixel-noise pixel], the pixel value of the intermediate synthetic image 2B (t2), when the corresponding pixels of the input image and the intermediate synthetic image is neither a combination of [saturation pixel-saturation pixel] or [noise pixel-noise pixel], the synthetic pixel value of the exposure-corrected input image 1b (t2) of the imaging element output image 1a (t2) and the intermediate synthetic image 2B (t2).

The image is configured with such pixel values.

Here, the imaging element output image 1a (t2) at the time t2 is the large exposure amount image, and the entire region other than the mountain and the low brightness portion of the moving subject 141 is the saturation pixel region.

On the other hand, in the intermediate synthetic image 2B (t2) at the time t2, the synthetic image noise threshold value $I_{nb}$ and the synthetic image saturation threshold value $I_{WLvn}$ are acquired according to the process described above with reference to FIGS. 13 and 14. The synthetic image noise threshold value $I_{2b}$ and the synthetic image saturation threshold value $I_{WLv2}$ of the intermediate synthetic image 2B (t2) to be calculated have values corresponding to the noise threshold value and the saturation threshold value of the imaging element output image 1a (t2) at the time t2. Consequently, in the intermediate synthetic image 2B (t2) at the time t2, the entire region other than the mountain and the low brightness portion of the moving subject 141 is the saturation pixel region.

Thus, according to the setting illustrated in FIG. 16(a), for the region other than the mountains of the imaging element output image 1a (t2) and the intermediate synthetic image 2B (t2) and the low brightness portion of the moving subject 141, the pixel value of the intermediate synthetic image 2B (t1) is output without change.

For the mountain and the low brightness portion of the moving subject 141, the synthetic pixel value of the exposure-corrected input image 1b (t2) of the imaging element output image 1a (t2) and the intermediate synthetic image 2A (t2) is output.

Here, in the process at the time t2, similarly to the processes at the time t0 and t1, as illustrated in FIG. 17, the moving subject 141 of the imaging element output image 1a (t2) at the time t2 is at a position different from a position of the moving subject of the intermediate synthetic image 2B (t2) at the time t2 generated at an immediately previous timing.

Due to the deviation according to movement of the moving subject 141, the region in which the imaging element output image 1a (t2) and the intermediate synthetic image 2B (t2) have a combination of [noise pixel-noise pixel] or [saturation pixel-saturation pixel] is narrowed, and thus the region in which the pixel value of the intermediate synthetic image 2B (t2) is output without change is reduced.

Specifically, as all the effective regions of the intermediate synthetic image are also updated through the process of the present disclosure, a region having brightness enough to serve as the effective region of the input image in the image can be guaranteed to be updated at least once. In the process at the time t2, the update of the low brightness region in the screen is guaranteed. Together with the processes at the times t0 and t1, all the low, intermediate, and high brightness regions in the screen can be guaranteed to be updated once based on the WDR set image.

Figure 20:
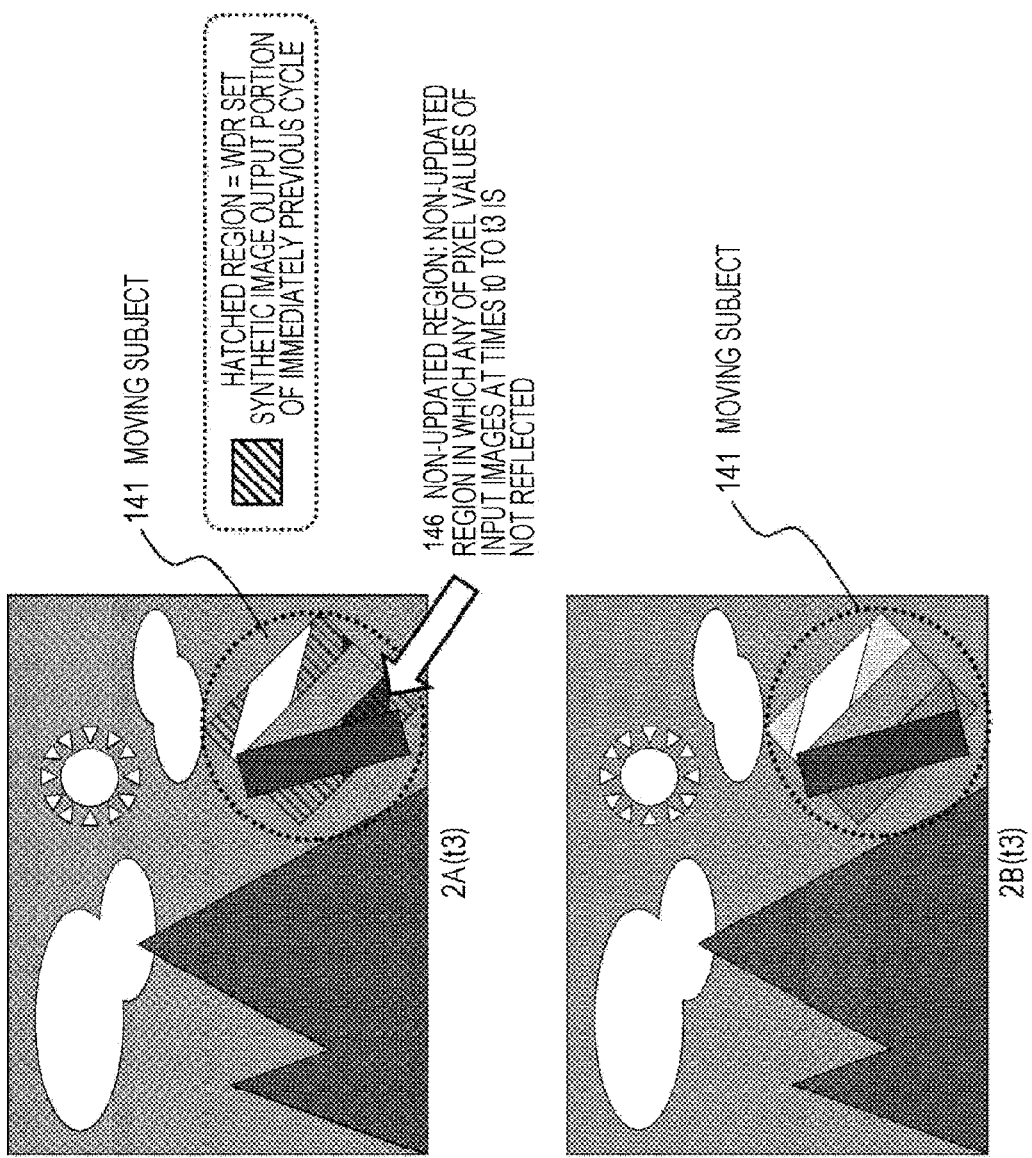
FIG. 20 is a diagram for describing a specific example of an image update process in a moving subject region performed by an image processing device according to an embodiment of the present disclosure.

The intermediate synthetic images the time t3 in (2A) the process of the related art and (2B) the process of the present disclosure illustrated in FIG. 17 are enlarged and illustrated in FIG. 20.

FIG. 20 illustrates the following images together:

the intermediate synthetic image 2A (t3) at the time t3 in (2A) the process of the related art; and the intermediate synthetic image 2B (t3) at the time t3 in (2B) the process of the present disclosure.

The intermediate synthetic image 2A (t3) at the time t3 in (2A) the process of the related art is a result obtained by selecting only the effective regions of the imaging element output images 1a (t0) to 1a (t2) serving as the input images of the three different exposure conditions (1a) illustrated in FIG. 17 as the synthesis target and performing the synthesis process of synthesizing the selected effective regions with the intermediate synthetic images 2A (t0) to 2A (t2).

In the process of the related art, a number of non-updated regions 146 that are not subjected to the update using the pixel values of some or all input images remain.

The non-updated region 146 corresponds to a pixel value of a synthetic image based on an immediately previous WDR set. Further, when this region is a region that is not updated even in an immediately previous WDR set and remains as a non-updated region, this region corresponds to an image of a more previous WDR set, and a phenomenon in which an update is not performed for a long time occurs.

On the other hand, when the process of the present disclosure, that is, for example, the process according to the setting of FIG. 16(*a*) is performed, it is possible to prevent the non-updated region in all the WDR sets. It is because as described above with reference to FIGS. 18 and 19, in the process of the present disclosure, an associated image is decided for each brightness region, and an update can be guaranteed to be performed necessarily once.

As a result, in the process to which the process of the present disclosure is applied, it is possible to generate and output an image in which a degree of reflection of the pixel value of the input image is increased.

[2-4. Configuration and Processing of Image Update Processing Unit]

Next, the details of a configuration and processing of the image update processing unit 124 of the image synthesis processing unit 101 illustrated in FIG. 10 will be described.

The image update processing unit 124 includes the input image 111 and the intermediate synthetic image 113 as illustrated in FIG. 10. Further, the update method deciding unit 123 receives pixel unit update information indicating an update method of a pixel unit decided by the above process. The pixel unit update information is update information of a pixel unit decided based on the combination of the pixel form (saturation/effective/noise) of the input image and the intermediate synthetic image described above with reference to FIG. 15 and FIGS. 16(*a*) to 16(*c*).

The image update processing unit 124 performs the synthesis process of the input image 111 and the intermediate synthetic image 113 according to the pixel unit update information input from the update method deciding unit 123. Specifically, for example, the image update processing unit 124 selectively performs an output of the pixel value of the intermediate synthetic image 113 without performing the synthesis process (3DNR) or the synthesis of the corresponding pixels of input image 111 and the intermediate synthetic image 113, for example, according to any of the settings of FIGS. 16(*a*) to 16(*c*).

Further, the exposure correction (gain adjustment) of adjusting the exposure ratio of each image is performed before the synthesis process.

Figure 21:
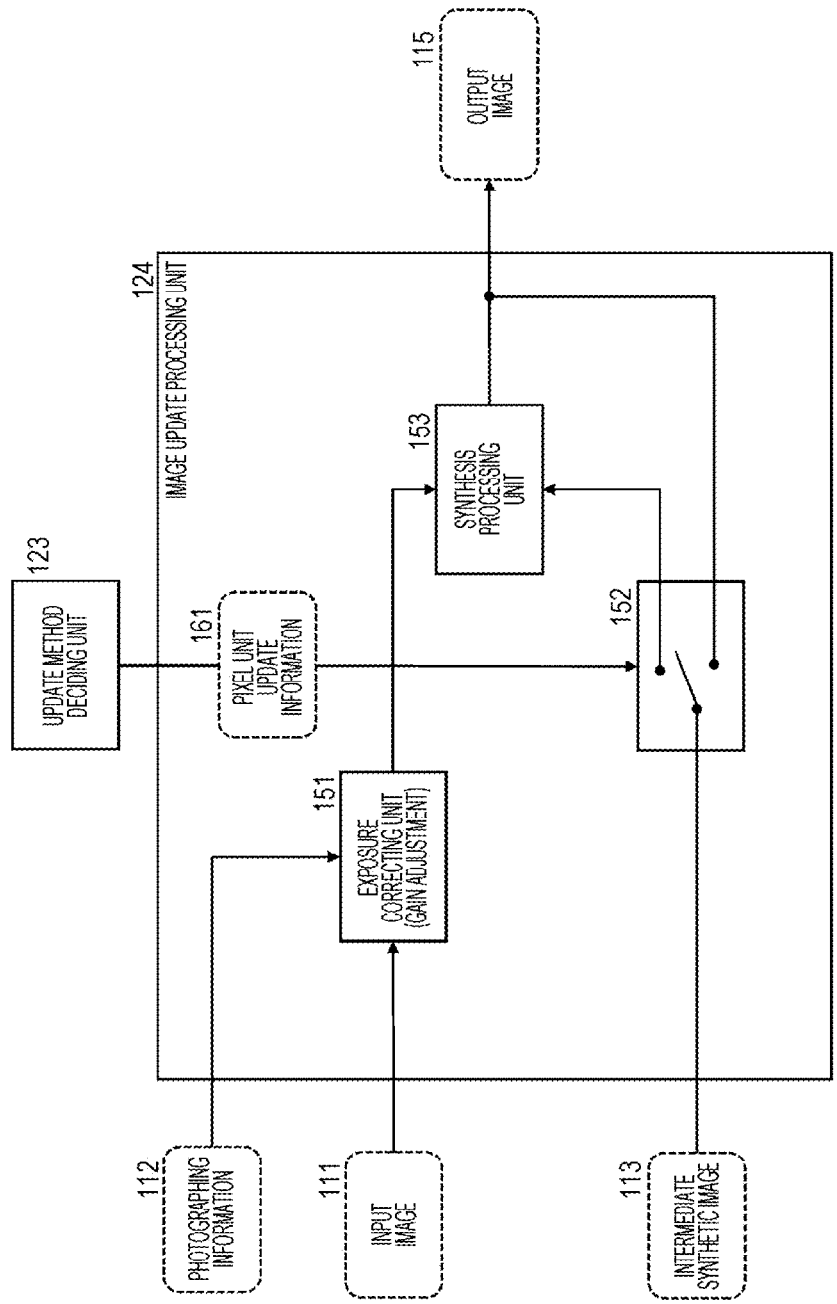
FIG. 21 is a diagram for describing a configuration and processing of an image update processing unit of an image processing device according to an embodiment of the present disclosure.

FIG. 21 illustrates an embodiment of the image update processing unit 124.

The image update processing unit 124 illustrated in FIG. 21 includes an exposure correcting unit 151, an output switching unit 152, and a synthesis processing unit 153.

The exposure correcting unit 151 performs the gain adjustment of changing the pixel value of the input image 111 to the pixel value when assumed to be identical to the intermediate synthetic image. In other words, the gain adjustment process for setting to the pixel value according to the line 130 described above with reference to FIG. 14 is performed. Through this process, the exposure-corrected input image illustrated in FIG. 17 (1b) is generated.

The exposure-corrected input image generated by the exposure correcting unit 151 is input to the synthesis processing unit 153.

The output switching unit 152 receives pixel unit update information 161 from the update method deciding unit 123, and outputs the pixel value of the intermediate synthetic image to the synthesis processing unit 153 or outputs the pixel value of the intermediate synthetic image as the pixel value of the output image 115 according to the pixel unit update information 161.

The pixel unit update information 161 input from the update method deciding unit 123 is information according to any of the settings of FIGS. 16(*a*) to 16(*c*) described above. In other words, the pixel unit update information 161 is information decided according to a combination of the pixel forms (saturation/effective/noise) of the corresponding pixels of input image 111 and the intermediate synthetic image 113.

When the pixel unit update information indicates the 3DNR process, the pixel value of the intermediate synthetic image is assumed to be set to be output to the synthesis processing unit 153. On the other hand, when the pixel unit update information indicates the intermediate synthetic image output, the pixel value of the intermediate synthetic image is not output to the synthesis processing unit 153 but output as the configuration pixel of the output image 115.

In other words, only in the case of the 3DNR setting among the settings of FIGS. 16(a) to 16(c) described above, the synthesis processing unit 153 performs the synthesis process of the corresponding pixels of the exposure-corrected input image obtained by performing the exposure correction on the input image 111 and the intermediate synthetic image 113, and outputs the synthesis result as the configuration pixel of the output image 115.

As a result, the output image 115 becomes an image configured with the following pixels according to a combination of the pixel forms (saturation/effective/noise) of the corresponding pixels of input image 111 and the intermediate synthetic image 113:

(1) when at least one of the corresponding pixels of the input image and the intermediate synthetic image is the effective pixel, a synthetic pixel obtained by performing the 3DNR process by the pixel value synthesis of the input image and the intermediate synthetic image;

(2) when both of the corresponding pixels of the input image and the intermediate synthetic image are the saturation pixel or the noise pixel, a pixel in which the pixel of the intermediate synthetic image not using the pixel of the input image is output without change; and (3) when the corresponding pixels of the input image and the intermediate synthetic image is a combination in which one is the saturation pixel, and the other is the noise pixel, any of the following pixels of (3a) and (3b):

(3a) a synthetic pixel obtained by the 3DNR process by the pixel value synthesis of the input image and the intermediate synthetic image; and (3b) a pixel in which the synthesis using the input image is not performed, and the pixel value of the intermediate synthetic image is output without change.

The output image 115 becomes an image configured with the pixels of (1) to (3).

Through this process, the synthetic image illustrated in FIG. 17 (2B) described above is generated and output.

Figure 22:
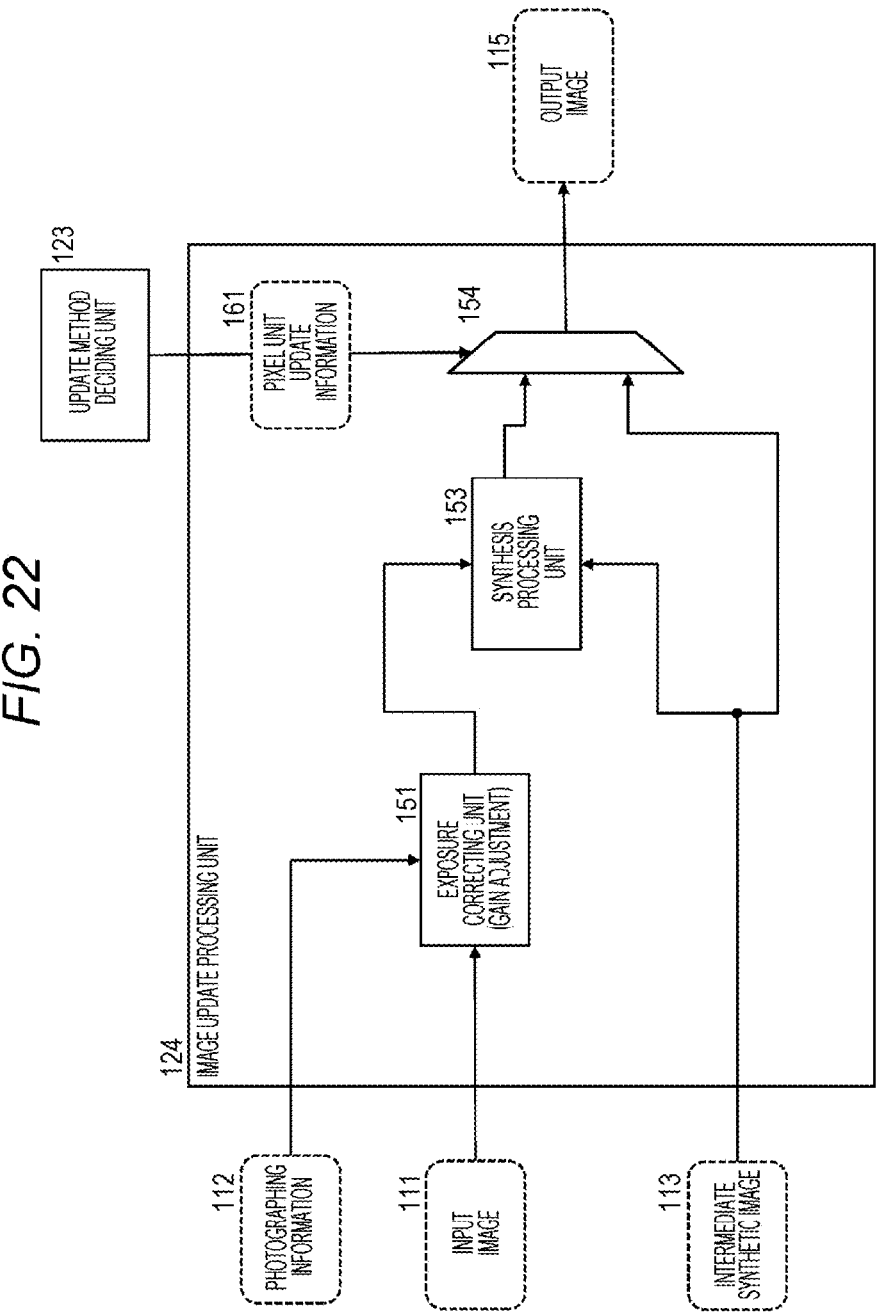
FIG. 22 is a diagram for describing a configuration and processing of an image update processing unit of an image processing device according to an embodiment of the present disclosure.

FIG. 22 is a block diagram illustrating a second embodiment of the image update processing unit 124.

A difference of the image update processing unit 124 illustrated in FIG. 22 lies in that the output switching unit 152 of the image update processing unit illustrated in FIG. 21 is removed, and a selector 154 is provided.

The selector 154 receives the pixel unit update information 161 from the update method deciding unit 123, selects the synthesis result generated by the synthesis processing unit 153, that is, the synthetic pixel value serving as the synthesis process (3DNR) result of the corresponding pixels of the exposure-corrected input image and the intermediate synthetic image or the pixel value of the intermediate synthetic image 113 according to the pixel unit update information 161, and outputs the selected pixel value as the pixel value of the output image 115.

In other words, in the configuration illustrated in FIG. 22, for all pixels, the synthesis processing unit 153 selects the synthetic pixel value serving as the synthesis process (3DNR) result of the corresponding pixels of the exposure-corrected input image and the intermediate synthetic image, and outputs the selected synthetic pixel value to the selector 154.

The selector 154 selects the synthetic pixel value serving as the synthesis process (3DNR) generated by the synthesis processing unit 153 or the pixel value of the intermediate synthetic image 113 according to the pixel unit update information 161 input from the update method deciding unit 123, and outputs the selected pixel value as the pixel value of the output image 115.

In this configuration, the output image 115 becomes an image configured with the following pixels according to a combination of the pixel forms (saturation/effective/noise) of the corresponding pixels of input image 111 and the intermediate synthetic image 113, similarly to the configuration illustrated in FIG. 21:

(1) when at least one of the corresponding pixels of the input image and the intermediate synthetic image is the effective pixel, the synthetic pixel obtained by performing the 3DNR process by the pixel value synthesis of the input image and the intermediate synthetic image;

(2) when both of the corresponding pixels of the input image and the intermediate synthetic image are the saturation pixel or the noise pixel, the pixel in which the pixel of the intermediate synthetic image not using the pixel of the input image is output without change; and (3) when the corresponding pixels of the input image and the intermediate synthetic image is a combination in which one is the saturation pixel, and the other is the noise pixel, any of the following pixels of (3a) and (3b):

(3a) the synthetic pixel obtained by the 3DNR process by the pixel value synthesis of the input image and the intermediate synthetic image; and (3b) the pixel in which the synthesis using the input image is not performed, and the pixel value of the intermediate synthetic image is output without change.

The output image 115 becomes an image configured with the pixels of (1) to (3).

[3. Example of Performing Pixel-Unit Addition Process of 3DNR Synthesis Pixel and Pixel of Intermediate Synthetic Image]

In the above-described embodiment, the output image is configured with any of the following pixels:

(1) the synthetic pixel obtained by the 3DNR process of the pixel of the exposure-corrected input image and the pixel of the intermediate synthetic image; and (2) the configuration pixel of the intermediate synthetic image.

Next, an example of performing the pixel-unit addition process of (1) the 3DNR synthesis pixel and (2) the pixel of the intermediate synthetic image and setting the pixel value of the output image will be described.

Figure 23:
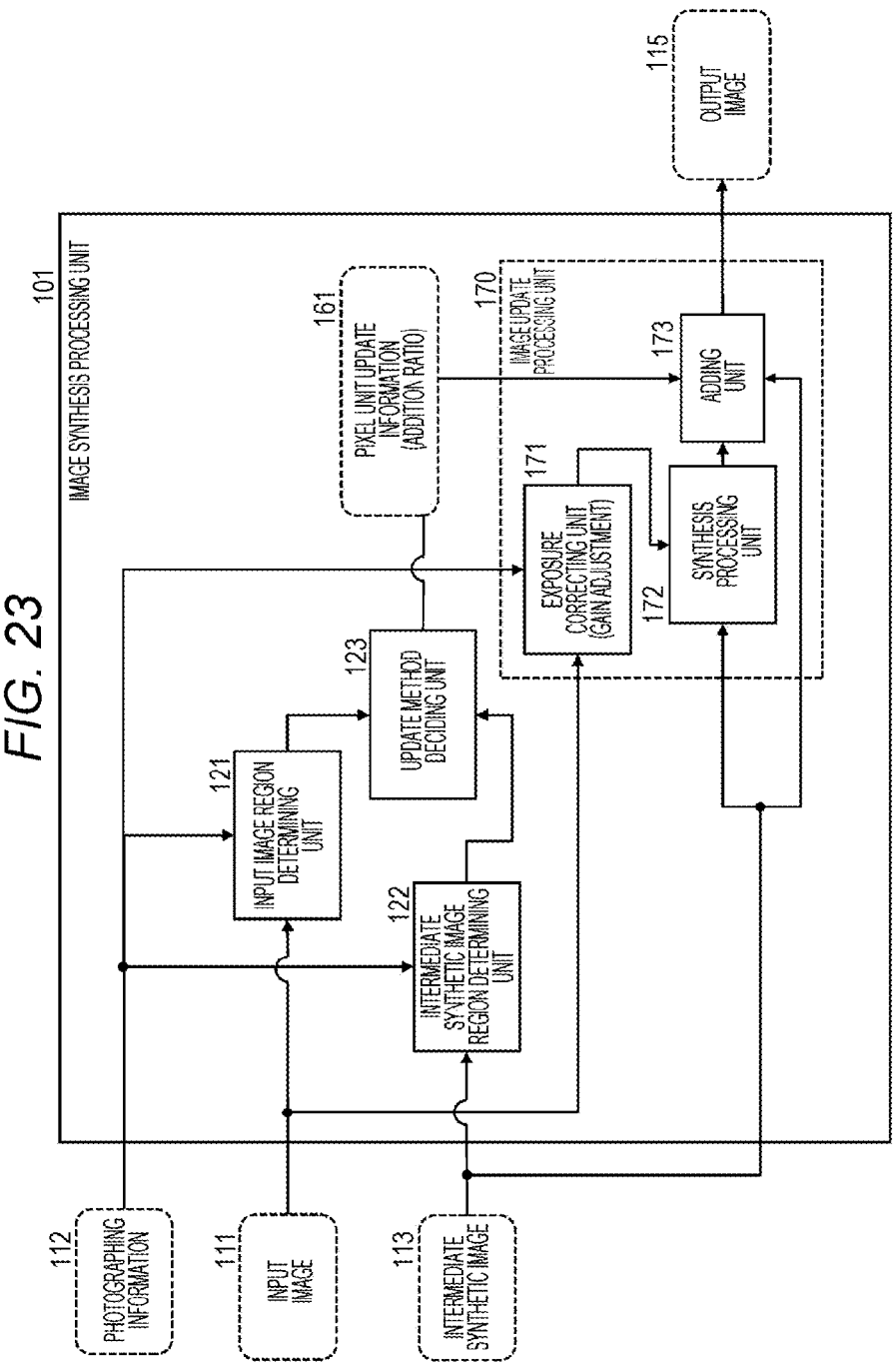
FIG. 23 is a diagram for describing a configuration and processing of an image synthesis processing unit of an image processing device according to an embodiment of the present disclosure.

FIG. 23 illustrates a configuration of the image synthesis processing unit 101 that performs processing of the present embodiment.

The image synthesis processing unit 101 illustrated in FIG. 23 is configured as the image synthesis processing unit 101 of the pixel processing unit 100 of FIG. 7 described above.

Similarly to the image synthesis processing unit 101 described above with reference to FIG. 10, the input image 111 serving as an output from the imaging element, the photographing information 112 such as the exposure condition information corresponding to the input image 111, and the intermediate synthetic image 113 generated based on the previous input image are input.

Similarly to the input image region determining unit 121 of FIG. 10 described above, the input image region determining unit 121 performs the process of classifying the pixels of the input image into the three pixels, that is, the noise pixel, the effective pixel, and the saturation pixel according to the process described above with reference to FIGS. 11 and 12.

In the present embodiment, the input image region determining unit 121 further calculates a degree of saturation and a degree of noise of each pixel unit of the input image 111, and outputs the calculated degree of saturation and the degree of noise to the update method deciding unit 123.

The details of a configuration and processing of the input image determining unit 121 will be described with reference to FIG. 24 and subsequent figures.

Figure 24:
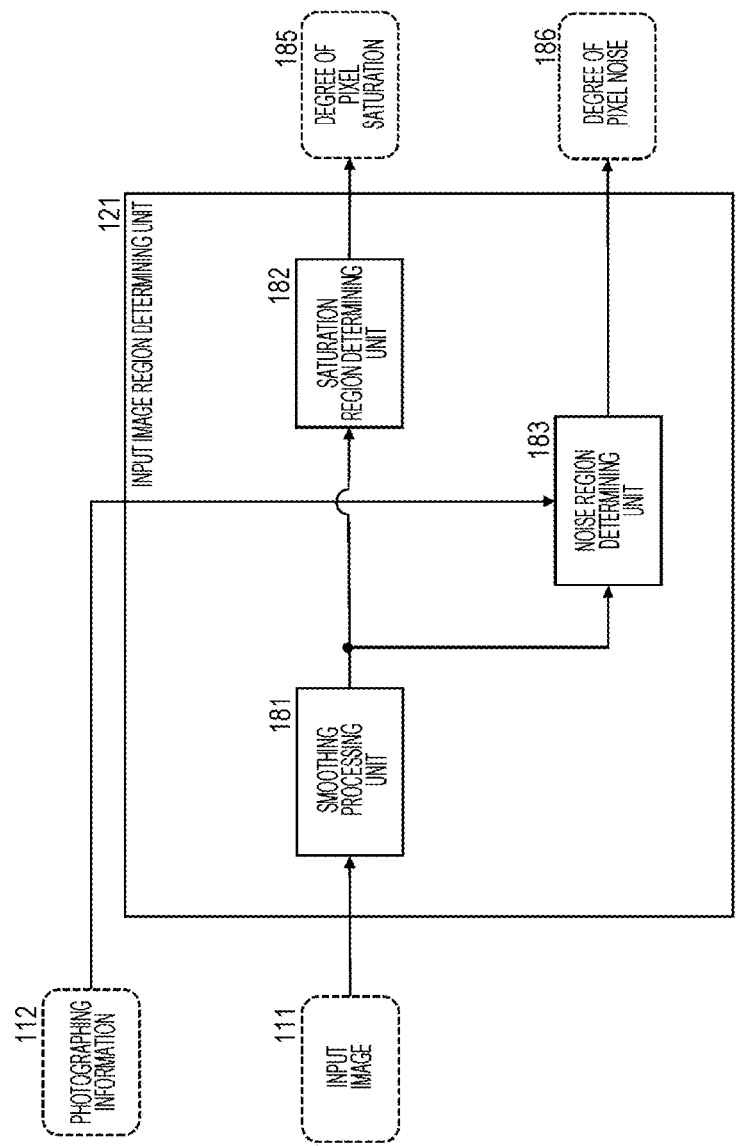
FIG. 24 is a diagram for describing a configuration and processing of an input image region determining unit of an image processing device according to an embodiment of the present disclosure.

The input image region determining unit 121 includes a smoothing processing unit 181, a saturation region determining unit 182, and a noise region determining unit 183 as illustrated in FIG. 24.

First, the input image 111 is input to the smoothing processing unit 181. For example, the smoothing processing unit 181 performs the smoothing process of the input image 111 using a smoothing filter such as an FIR filter or a median filter. For example, the smoothing process may be performed as a process of calculating an average value of a region unit or an intermediate value between a maximum value and a minimum value. The smoothing process may be performed in units of channels of RGB of the input image 111 or may be configured to calculate a value obtained by further weight-averaging a smoothed value of each channel as a smoothing value common to the channels.

The smoothed input image is output to the saturation region determining unit 182 and the noise region determining unit 183.

The saturation region determining unit 182 generates a degree of pixel saturation 185 of each pixel unit configuring the smoothed input image using the smoothed input image, and outputs the degree of pixel saturation 185 to the update method deciding unit 123.

Further, the noise region determining unit 183 generates a degree of pixel noise 186 of each pixel unit configuring the smoothed input image using the smoothed input image, and outputs the degree of pixel noise 186 to the update method deciding unit 123.

Processing performed by the saturation region determining unit 182 and the noise region determining unit 183 will be described with reference to FIGS. 25(a) and 25(b).

Figure 25:
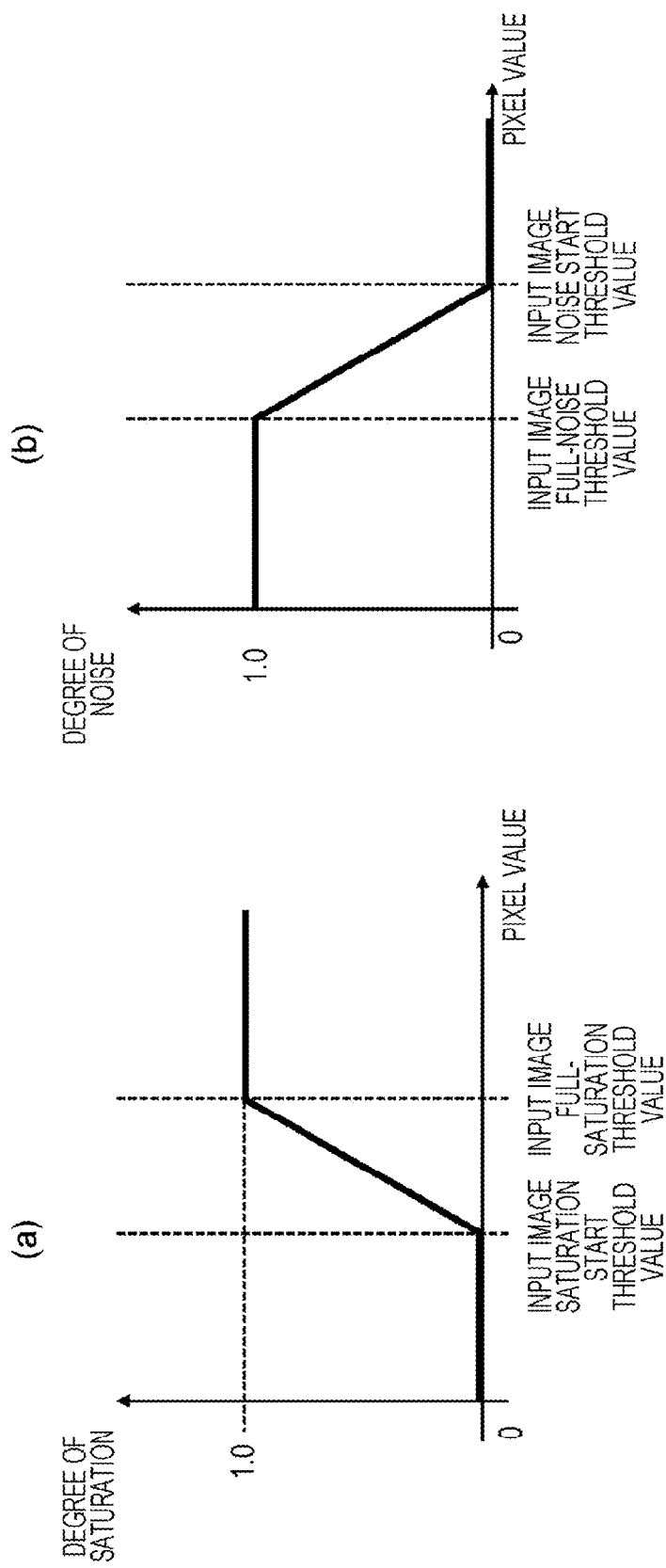
FIGS. 25(a) and 25(b) are diagrams for describing a process of calculating a degree of saturation and a degree of noise which is performed by an input image region determining unit of an image processing device according to an embodiment of the present disclosure.

The saturation region determining unit 182 calculates a degree of saturation corresponding to each pixel of the input image 111 that has been subjected to the smoothing process according to a graph illustrated in FIG. 25(a).

The graph illustrated in FIG. 25(a) is a graph illustrating a correspondence relation between the pixel value and the degree of saturation.

The degree of saturation is calculated according to the following setting:
(1) when the pixel value is within the following range:
0≤pixel value<input image saturation start threshold value,
the degree of saturation=0.0;
(2) when the pixel value is within the following range:
input image full-saturation threshold value≤pixel value,
the degree of saturation=1.0; and
(3) when the pixel value is within the following range:
the input image saturation start threshold value pixel value<the input image full-saturation threshold value;
the degree of saturation=(pixel value−input image saturation start threshold value)/(input image full-saturation threshold value-input image saturation start threshold value).

The method of expressing the degree of saturation is not limited to the above formulas and is preferably implemented by a curved line drawing a smooth curve that monotonically increases from the input image saturation start threshold value to the input image full-saturation threshold value according to the pixel value.

As the input image full-saturation threshold value, the input image saturation threshold value $I_{WL\nu}$ described above with reference to FIG. 11 is applicable. As the input image saturation start threshold value, a value that is several percentage (%) smaller than the input image full-saturation threshold value is used. The respective threshold values are calculated in advance and stored in a memory accessible by the saturation region determining unit 182.

As described above, the saturation region determining unit 182 calculates the degree of saturation corresponding to each pixel of the input image 111 that has been subjected to the smoothing process according to the graph illustrated in FIG. 25(a), and outputs the calculated degree of pixel saturation 185 to the update method deciding unit 123.

On the other hand, the noise region determining unit 183 calculates the degree of noise corresponding to each pixel of the input image 111 that has been subjected to the smoothing process according to a graph illustrated in FIG. 25(b).

The graph illustrated in FIG. 25(b) is a graph illustrating a correspondence relation between the pixel value and the degree of noise.

The degree of noise is calculated according to the following setting:
(1) when the pixel value is within the following range:
0≤pixel value<input image full-noise threshold value,
the degree of noise=1.0;
(2) when the pixel value is within the following range:
input image noise start threshold value≤pixel value,
the degree of noise=0.0; and
(3) when the pixel value is within the following range:
input image full-noise threshold value≤pixel value<input image noise start threshold value,
the degree of noise=(input image noise start threshold value−pixel value)/(input image noise start threshold value−input image full-noise threshold value)

The method of expressing the degree of noise is not limited to the above formulas and is preferably implemented by a curved line drawing a smooth curve that monotonically increases from the input image full-noise threshold value to the input image noise start threshold value according to the pixel value.

As the input image noise start threshold value, the input image noise threshold value described above with reference to FIG. 11 is applicable. As the input image full-noise threshold value, a value that is several percentage (%) smaller than the input image noise start threshold value is used. The respective threshold values are calculated in advance and stored in a memory accessible by the noise region determining unit 183.

As described above, the noise region determining unit 183 calculates the degree of noise corresponding to each pixel of the input image 111 that has been subjected to the smoothing process according to the graph illustrated in FIG. 25(b), and outputs the calculated degree of pixel noise 186 to the update method deciding unit 123.

Next, the details of a configuration and processing of the intermediate synthetic image determining unit 122 will be described with reference to FIG. 26.

Figure 26:
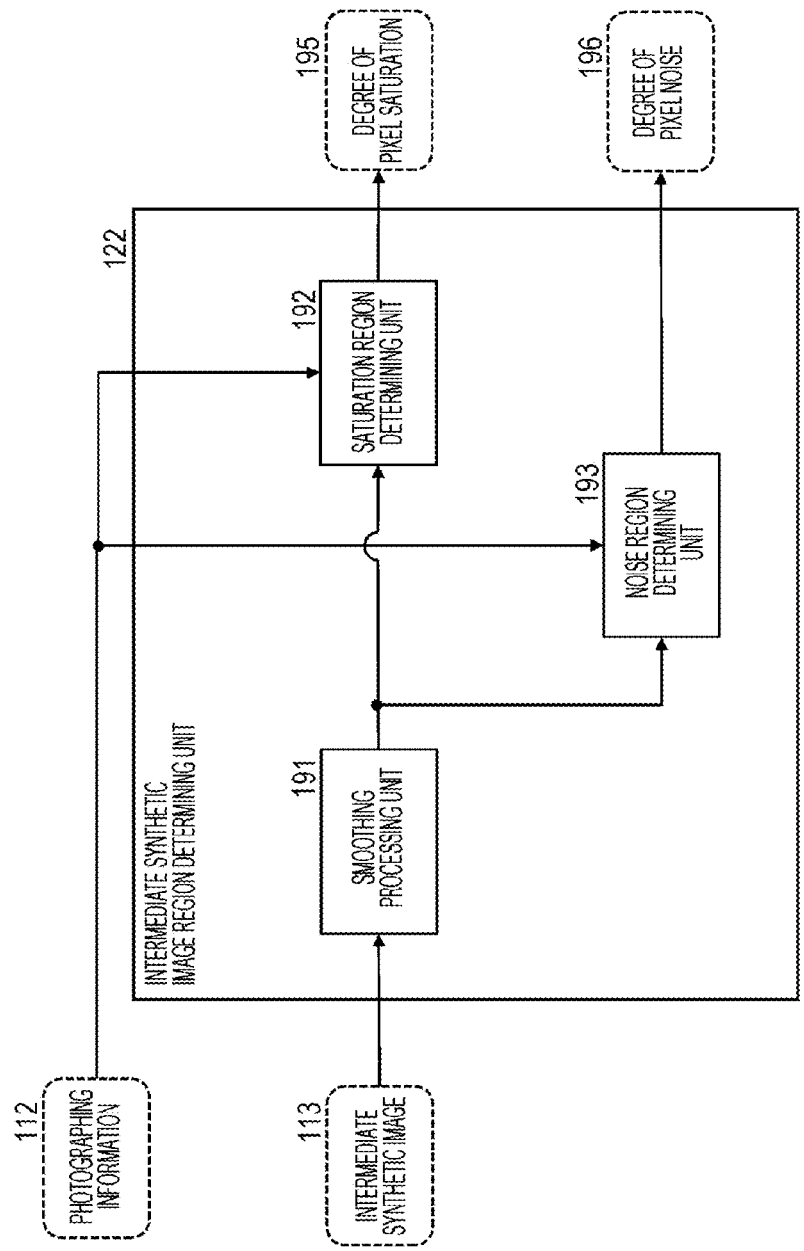
FIG. 26 is a diagram for describing a configuration and processing of an intermediate synthetic image region determining unit of an image processing device according to an embodiment of the present disclosure.

The intermediate synthetic image region determining unit 122 includes a smoothing processing unit 191, a saturation region determining unit 192, and a noise region determining unit 193 as illustrated in FIG. 26.

First, the intermediate synthetic image 113 is input to the smoothing processing unit 191. For example, the smoothing processing unit 191 performs the smoothing process of the intermediate synthetic image 113 using the smoothing filter such as the FIR filter and the median filter. For example, the smoothing process may be performed as a process of calculating an average value of a region unit or an intermediate value between a maximum value and a minimum value. The smoothing process may be performed in units of channels of RGB of the intermediate synthetic image 113 or may be configured to calculate a value obtained by further weight-averaging a smoothed value of each channel as a smoothing value common to the channels.

The smoothed intermediate synthetic image is output to the saturation region determining unit 192 and the noise region determining unit 193.

The saturation region determining unit 192 generates a degree of pixel saturation 195 of each pixel unit configuring the smoothed intermediate synthetic image using the smoothed intermediate synthetic image, and outputs the degree of pixel saturation 195 to the update method deciding unit 123.

Further, the noise region determining unit 193 generates a degree of pixel noise 196 of each pixel unit configuring the smoothed intermediate synthetic image using the smoothed intermediate synthetic image, and outputs the degree of pixel noise 196 to the update method deciding unit 123.

Processing performed by the saturation region determining unit 192 and the noise region determining unit 193 will be described with reference to FIGS. 27(*a*) and 27(*b*).

Figure 27:
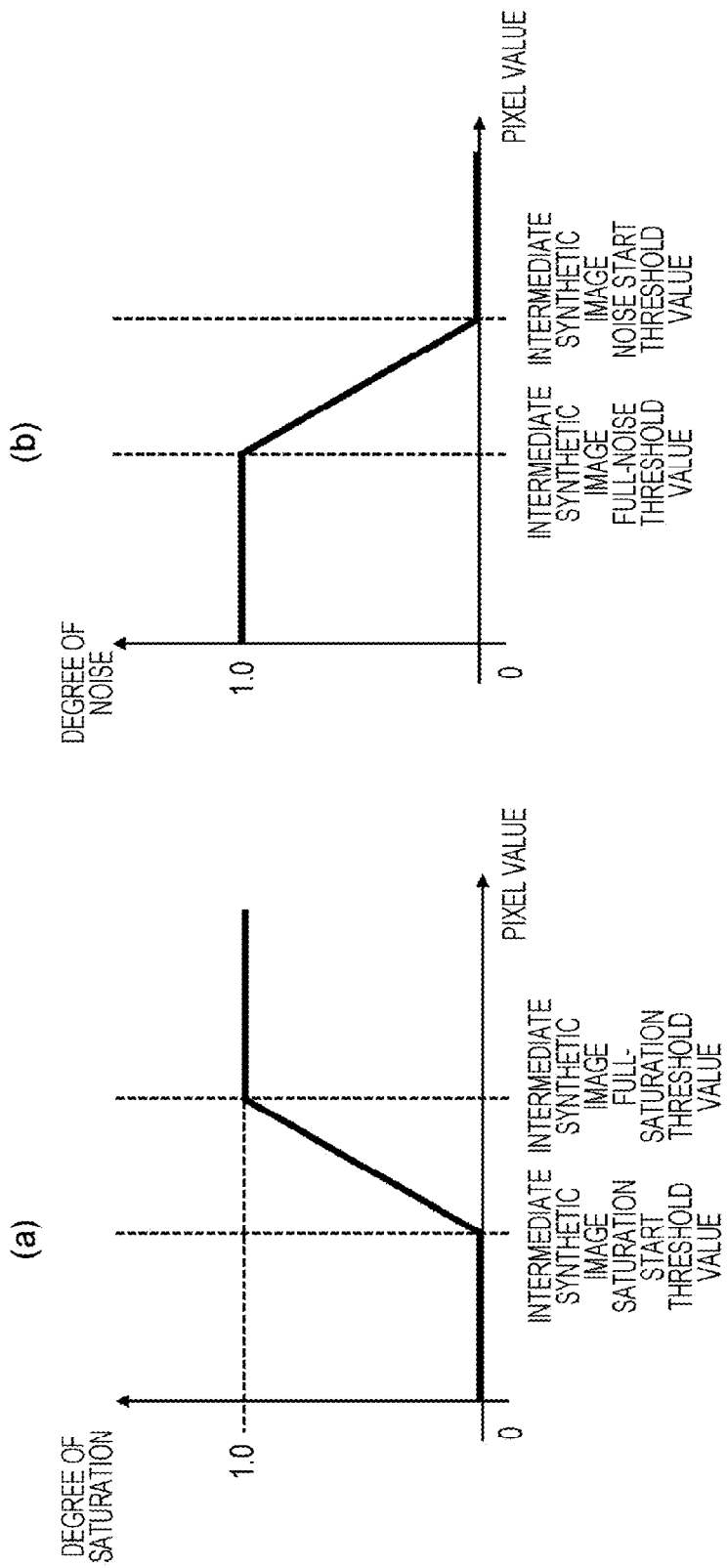
FIGS. 27(a) and 27(b) are diagrams for describing a process of calculating a degree of saturation and a degree of noise which is performed by an intermediate synthetic image region determining unit of an image processing device according to an embodiment of the present disclosure.

The saturation region determining unit 192 calculates a degree of saturation corresponding to each pixel of the intermediate synthetic image 113 that has been subjected to the smoothing process according to a graph illustrated in FIG. 27(*a*).

The graph illustrated in FIG. 27(*a*) is a graph illustrating a correspondence relation between the pixel value and the degree of saturation.

The degree of saturation is calculated according to the following setting:
(1) when the pixel value is within the following range:
0≤pixel value<intermediate synthetic image saturation start threshold value,
the degree of saturation=0.0;
(2) when the pixel value is within the following range:
intermediate synthetic image full-saturation threshold value≤pixel value,
the degree of saturation=1.0; and
(3) when the pixel value is within the following range:
intermediate synthetic image saturation start threshold value≤pixel value<intermediate synthetic image full-saturation threshold value,
the degree of saturation=(pixel value−intermediate synthetic image saturation start threshold value)/(intermediate synthetic image full-saturation threshold value−intermediate synthetic image saturation start threshold value).

The method of expressing the degree of saturation is not limited to the above formulas and is preferably implemented by a curved line drawing a smooth curve that monotonically increases from the intermediate synthetic image saturation start threshold value to the intermediate image full-saturation threshold value according to the pixel value.

As the intermediate synthetic image full-saturation threshold value, the intermediate synthetic image saturation threshold value $I_{WLvn}$ described above with reference to FIG. 13 is applicable. As the intermediate synthetic image saturation start threshold value, a value that is several percentage (%) smaller than the intermediate synthetic image full-saturation threshold value is used. The respective threshold values are calculated in advance and stored in a memory accessible by the saturation region determining unit 192.

As described above, the saturation region determining unit 192 calculates the degree of saturation corresponding to each pixel of the intermediate synthetic image 113 that has been subjected to the smoothing process according to the graph illustrated in FIG. 27(*a*), and outputs the calculated degree of pixel saturation 195 to the update method deciding unit 123.

On the other hand, the noise region determining unit 193 calculates the degree of noise corresponding to each pixel of the intermediate synthetic image 113 that has been subjected to the smoothing process according to a graph illustrated in FIG. 27(*b*).

The graph illustrated in FIG. 27(*b*) is a graph illustrating a correspondence relation between the pixel value and the degree of noise.

The degree of noise is calculated according to the following setting:
(1) when the pixel value is within the following range:
0≤pixel value<intermediate synthetic image full-noise threshold value,
the degree of noise=1.0;
(2) when the pixel value is within the following range:
intermediate synthetic image noise start threshold value≤pixel value,
the degree of noise=0.0; and
(3) when the pixel value is within the following range:
intermediate synthetic image full-noise threshold value≤pixel value<intermediate synthetic image noise start threshold value,
the degree of noise=(intermediate synthetic image noise start threshold value−pixel value)/(intermediate synthetic image noise start threshold value−intermediate synthetic image full-noise threshold value).

The method of expressing the degree of noise is not limited to the above formulas and is preferably implemented by a curved line drawing a smooth curve that monotonically increases from the intermediate synthetic image full-noise threshold value to the intermediate image noise start threshold value according to the pixel value.

As the intermediate synthetic image noise start threshold value, the intermediate synthetic image noise threshold value described above with reference to FIG. 13 is applicable. As the intermediate synthetic image full-noise threshold value, a value that is several percentage (%) smaller than the intermediate synthetic image noise start threshold value is used. The respective threshold values are calculated in advance and stored in a memory accessible by the noise region determining unit 193.

As described above, the noise region determining unit 193 calculates the degree of noise corresponding to each pixel of the intermediate synthetic image 113 that has been subjected to the smoothing process according to the graph illustrated in FIG. 27(*b*), and outputs the calculated degree of pixel noise 196 to the update method deciding unit 123.

Next, processing of the update method deciding unit 123 of the image synthesis processing unit 101 illustrated in FIG. 23 will be described with reference to FIG. 28.

The update method deciding unit 123 receives the following information (a) and (b) from the input image region determining unit 121 and the intermediate synthetic image region determining unit 122:

(a) degree of saturation information and degree of noise information corresponding to each configuration pixel of the input image from the input image region determining unit 121; and (b) degree of saturation information and degree of noise information corresponding to each configuration pixel of the intermediate synthetic image from the intermediate synthetic image region determining unit 122.

The update method deciding unit 123 decides the update method of the intermediate synthetic image 113 using the input image 111 based on the input information.

Specifically, a process of deciding an addition ratio β of the 3DNR synthesis processing result of the input image 111 and the intermediate synthetic image 113 and the pixel value of the corresponding pixel of the intermediate synthetic image 113 is performed.

The output image is a result of adding the 3DNR synthesis processing result of the input image 111 and the intermediate synthetic image 113 to the pixel value of the corresponding pixel of the intermediate synthetic image 113 according to the addition ratio β. In other words, output image pixel value=(intermediate synthetic image pixel value)·β+(3DNR synthetic image pixel value)(1−β)

a pixel value calculated according to this formula is set as the pixel value of the output image.

The update method deciding unit 123 calculates the addition ratio β using the following respective information. In other words, (a) degree of saturation information and degree of noise information corresponding to each configuration pixel of the input image input from the input image region determining unit 121; and (b) degree of saturation information and degree of noise information corresponding to each configuration pixel of the intermediate synthetic image input from the intermediate synthetic image region determining unit 122, an addition ratio β 161 is calculated using the above information and output to an adding unit 173 of an image update processing unit 170 as illustrated in FIG. 23.

In the image update processing unit 170, an exposure correcting unit 171 performs an exposure ratio correction process of causing the exposure condition of the input image 111 to be identical to the exposure condition of the intermediate synthetic image 113.

An exposure ratio-corrected input image is supplied to a synthesis processing unit 172 and subjected to the synthesis process (the 3DNR process) of the exposure ratio-corrected input image and the intermediate synthetic image in the synthesis processing unit 172. A synthesis process (3DNR) result image is output to the adding unit 173.

The adding unit 173 adds the 3DNR synthetic image input from the synthesis processing unit 172 to the intermediate synthetic image 113 according to the addition ratio β corresponding to each pixel. In other words, output image pixel value=(intermediate synthetic image pixel value)·β+(3DNR synthetic image pixel value)(1−β)

A pixel value calculated according to this formula is set as the pixel value of the output image 115, and the output image 115 is generated.

An exemplary calculation process of the addition ratio β performed by the update method deciding unit 123 will be described with reference to FIG. 28.

A table illustrated in FIG. 28 (1) is the same table described above with reference to FIG. 15 and FIGS. 16(a) to 16(c), that is, a table in which a process is classified according to each combination of the pixel form (saturation/effective/noise) of the input image and the pixel form (saturation/effective/noise) of the intermediate synthetic image.

In other words, the table illustrated in FIG. 28 (1) is a table indicating that the following processes are performed according to each combination of the pixel form (saturation/effective/noise) of the input image and the pixel form (saturation/effective/noise) of the intermediate synthetic image:

(1) when at least one of the corresponding pixels of the input image and the intermediate synthetic image is the effective pixel, the 3DNR process by the pixel value synthesis of the input image and the intermediate synthetic image is performed to update the pixel value of the intermediate synthetic image;

(2) when both of the corresponding pixels of the input image and the intermediate synthetic image are the saturation pixel or the noise pixel, the synthesis using the input image is not performed, and the pixel value of the intermediate synthetic image is output without change; and (3) when the corresponding pixels of the input image and the intermediate synthetic image is a combination in which one is the saturation pixel, and the other is the noise pixel, any of the following processes (3a) and (3b) is performed:

(3a) the 3DNR process by the pixel value synthesis of the input image and the intermediate synthetic image is performed; and (3b) the synthesis using the input image is not performed, and the pixel value of the intermediate synthetic image is output without change.

Further, processes A and B in the table illustrated in FIG. 28 (1) are any of the processes (3a) and (3b).

Here, when the output image is assumed to be generated according to the addition ratio β, an output image average pixel value can be expressed by the following formula as illustrated in FIG. 28 (2):

output image average pixel value=(intermediate synthetic image average pixel value)·β+(3DNR synthetic image average pixel value)(1−β).

Further, when the above formula is developed according to the table illustrated in FIG. 28 (1), it can be expressed as follows:

[Math. 4]

$$\text{Output Image} =$$

$$\text{Intermediate Synthetic} \cdot \beta + 3DNR \cdot (1-\beta) = \text{Intermediate Synthetic} \cdot$$

$$\left( \alpha_{\text{Input}_{\text{Saturation}}} \cdot \alpha_{\text{Intermediate}_{\text{Saturation}}} + \alpha_{\text{Input}_{\text{Noise}}} \cdot \alpha_{\text{Intermediate}_{\text{Noise}}} \right) +$$

$$3DNR \cdot \left( 1 - \left( \alpha_{\text{Input}_{\text{Saturation}}} \cdot \alpha_{\text{Intermediate}_{\text{Saturation}}} + \right. \right.$$

$$\alpha_{\text{Input}_{\text{Noise}}} \cdot \alpha_{\text{Intermediate}_{\text{Noise}}} + \alpha_{\text{Input}_{\text{Saturation}}} +$$

$$\left. \left. \alpha_{\text{Intermediate}_{\text{Noise}}} + \alpha_{\text{Input}_{\text{Noise}}} \cdot \alpha_{\text{Intermediate}_{\text{Saturation}}} \right) \right) +$$

$$\text{Process } A \cdot \alpha_{Saturation}^{Input} \cdot \alpha_{Noise}^{Intermediate} +$$

$$\text{Process } \beta \cdot \alpha_{Noise}^{Input} \cdot \alpha_{Saturation}^{Intermediate}$$

Here, $\alpha_{Saturation}^{Input}$: degree of saturation of input image $\alpha_{Noise}^{Input}$: degree of noise of input image $\alpha_{Saturation}^{Intermediate}$: degree of saturation of intermediate synthetic image $\alpha_{Noise}^{Intermediate}$: degree of noise of intermediate synthetic image Here, when the processes A and B illustrated in FIG. 28 (1) are assumed to be the 3DNR process, that is, the 3DNR process as in the setting illustrated in FIG. 16(a), the above formula can be expressed as follows as stated in FIG. 28 (3). The update method deciding unit 123 can calculate and decide the addition ratio β according to the following formula:

[Math. 5]

Output Image =

Intermediate Synthetic $\cdot \beta + 3DNR \cdot (1 - \beta) =$ Intermediate Synthetic $\cdot$ $$\left( \alpha_{Saturation}^{Input} \cdot \alpha_{Saturation}^{Intermediate} + \alpha_{Noise}^{Input} \cdot \alpha_{Noise}^{Intermediate} \right) +$$

$$3DNR \cdot \left( 1 - \left( \alpha_{Saturation}^{Input} \cdot \alpha_{Saturation}^{Intermediate} + \right. \right.$$

$$\alpha_{Noise}^{Input} \cdot \alpha_{Noise}^{Intermediate} + \alpha_{Saturation}^{Input} +$$

$$\left. \left. \alpha_{Noise}^{Intermediate} + \alpha_{Noise}^{Input} \cdot \alpha_{Saturation}^{Intermediate} \right) \right) +$$

$$3DNR \cdot \alpha_{Saturation}^{Input} \cdot \alpha_{Noise}^{Intermediate} +$$

$$3DNR \cdot \alpha_{Noise}^{Input} \cdot \alpha_{Saturation}^{Intermediate} =$$

Intermediate Synthetic $\cdot \left( \alpha_{Saturation}^{Input} \cdot \alpha_{Saturation}^{Intermediate} + \right.$ $$\left. \alpha_{Noise}^{Input} \cdot \alpha_{Noise}^{Intermediate} \right) + 3DNR \cdot \left( 1 - \right.$$

$$\left. \left( a_{Saturation}^{Input} \cdot \alpha_{Saturation}^{Intermediate} + \alpha_{Noise}^{Input} \cdot \alpha_{Noise}^{Intermediate} \right) \right)$$

$$\beta = \alpha_{Saturation}^{Input} \cdot \alpha_{Saturation}^{Intermediate} + \alpha_{Noise}^{Input} \cdot \alpha_{Noise}^{Intermediate}$$

Here, $\alpha_{Saturation}^{Input}$: degree of saturation of input image $\alpha_{Noise}^{Input}$: degree of noise of input image $\alpha_{Saturation}^{Intermediate}$: degree of saturation of intermediate synthetic image $\alpha_{Noise}^{Intermediate}$: degree of noise of intermediate synthetic image As described above, the update method deciding unit 123 calculates the addition ratio β 161 using the following information:

(a) the degree of saturation information and the degree of noise information corresponding to each configuration pixel of the input image input from the input image region determining unit 121; and (b) the degree of saturation information and the degree of noise information corresponding to each configuration pixel of the intermediate synthetic image input from the intermediate synthetic image region determining unit 122, and outputs the addition ratio β 161 to the adding unit 173 of the image update processing unit 170 as illustrated in FIG. 23.

As described above, the image update processing unit 170 performs the following processes to generate the output image 115, and outputs the output image 115.

First, the exposure correcting unit 171 performs the exposure ratio correction process of causing the exposure condition of the input image 111 to be identical to the exposure condition of the intermediate synthetic image 113. The exposure ratio-corrected input image is supplied to the synthesis processing unit 172, and the synthesis processing unit 172 performs the synthesis process (the 3DNR process) of the exposure ratio-corrected input image and the intermediate synthetic image. The synthesis process (3DNR) result image is output to the adding unit 173.

The adding unit 173 adds the 3DNR synthetic image input from the synthesis processing unit 172 to the intermediate synthetic image 113 according to the addition ratio β corresponding to each pixel. In other words, output image pixel value=(intermediate synthetic image pixel value)·β+(3DNR synthetic image pixel value)(1−β)

a pixel value calculated according to the above formula is set as the pixel value of the output image 115, and the output image 115 is generated.

The image update processing unit 170 performs such a process to generate the output image 115, and outputs the output image 115.

[4. Example of Generating Corrective Image of Same Photographing Condition as Input Image Based on Intermediate Synthetic Image and Performing Processing]

Next, an embodiment in which a corrective image of the same photographing condition as the input image is generated from the intermediate synthetic image, and processing is performed will be described.

Figure 29:
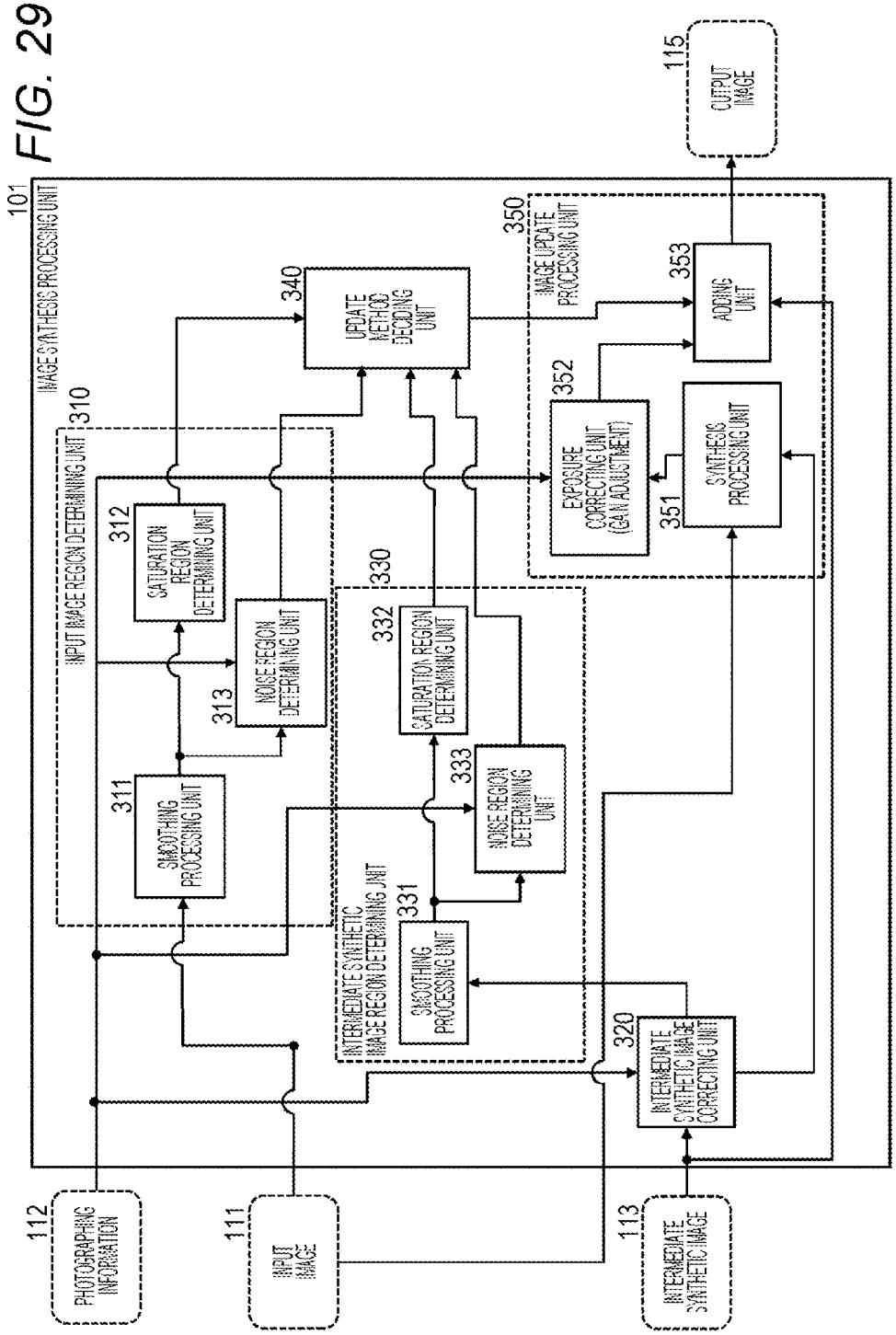
FIG. 29 is a diagram for describing a configuration and processing of an image synthesis processing unit of an image processing device according to an embodiment of the present disclosure.

FIG. 29 illustrates an exemplary configuration of the image synthesis processing unit 101 according to the present embodiment. An overall configuration of the image processing unit according to the present embodiment is similar to the configuration of the image processing unit 100 of FIG. 7 described above.

The configuration of the image synthesis processing unit 101 illustrated in FIG. 29 is a detailed configuration of the image synthesis processing unit 101 in the image processing unit 100 illustrated in FIG. 7.

Similarly to the image synthesis processing unit 101 described above with reference to FIG. 10, the image synthesis processing unit 101 illustrated in FIG. 29 receives the input image 111 serving as an output from the imaging element, the photographing information 112 such as the exposure condition information corresponding to the input image 111, and the intermediate synthetic image 113 generated based on the previous input image.

An input image region determining unit 310 has the same configuration as the input image region determining unit 121 of FIG. 24 described above, includes a smoothing processing unit 311, a saturation region determining unit 312, and noise region determining unit 313, calculates the degree of saturation and the degree of noise of each pixel unit of the input image 111, and outputs the calculated degree of saturation and the degree of noise to an update method deciding unit 340.

An intermediate synthetic image region determining unit 330 has the same configuration as the intermediate synthetic image region determining unit 122 of FIG. 26 described above, includes a smoothing processing unit 331, a saturation region determining unit 332, and noise region determining unit 333, calculates a degree of saturation and a degree of noise of each pixel unit of a corrected intermediate synthetic image generated by an intermediate synthetic image correcting unit 320 based on the intermediate synthetic image 113, and outputs the calculated degree of saturation and the degree of noise to the update method deciding unit 340.

The intermediate synthetic image correcting unit 320 receives the intermediate synthetic image 113 and the photographing information 112 including the exposure period of time information corresponding to the input image and the like, generates the corrected intermediate synthetic image obtained by setting the intermediate synthetic image 113 to the same exposure condition as that of the input image 111.

The photographing information 112 includes the F value, the ISO sensitivity, and the like in addition to the exposure period of time serving as the photographing condition of the input image 111, and when the correction process is performed, the corrective image assumed to be photographed under the same photographing condition as the input image 111 is generated in view of the condition.

Further, when the pixel value of the intermediate synthetic image 113 is corrected, it is desirable to perform the clip process so that the pixel value is set to a predetermined pixel value range.

The pixel value ($I_{exp}$) of the corrected intermediate synthetic image generated in the intermediate synthetic image correcting unit 320 is calculated, for example, according to the following formula:

[Math. 6]

$$I_{exp} = \begin{cases} I_{WDR} \cdot \left(\frac{ISO_{in} \cdot T_{in}}{F_{in}^2}\right) \cdot \left(\frac{ISO_{WDR} \cdot T_{WDR}}{F_{WDR}^2}\right)^{-1} & \text{if} \left(I_{WDR} \cdot \left(\frac{ISO_{in} \cdot T_{in}}{F_{in}^2}\right) \cdot \left(\frac{ISO_{WDR} \cdot T_{WDR}}{F_{WDR}^2}\right)^{-1} < I_{WDRclip}\right) \\ I_{WDRclip} & \text{else} \end{cases}$$

Here,
$I_{esp}$: Estimated input pixel value
$I_{WDR}$: Intermediate synthetic pixel value
$I_{WDRclip}$: Clip value
$ISO_{in}$: ISO sensitivity of input image
$T_{in}$: Exposure period of time of input image
$F_{in}$: F value of input image
$ISO_{WDR}$: ISO sensitivity of intermediate synthetic image
$T_{WDR}$: Exposure period of time of intermediate synthetic image
$F_{WDR}$: F value of intermediate synthetic image The corrected intermediate synthetic image configured with the pixel having the corrected pixel value ($I_{exp}$) calculated, for example, according to the above formula is input to the intermediate synthetic image region determining unit 330 and a synthesis processing unit 351 of an image update processing unit 350.

The intermediate synthetic image region determining unit 330 performs the smoothing process of the corrected intermediate synthetic image, calculates the degree of saturation and the degree of noise corresponding to each pixel based on the smoothed image, and outputs the degree of saturation and the degree of noise to the update method deciding unit 340.

At this time, since the corrected pixel value ($I_{exp}$) input to the intermediate synthetic image region determining unit 330 is corrected to the image of the same exposure condition as that of the input image 111, the same one as that for the input image region determining unit 310 is preferably used as the threshold value used in the determination of saturation and noise.

The update method deciding unit 340 receives the following information (a) and (b) from the input image region determining unit 310 and the intermediate synthetic image region determining unit 330:

(a) the degree of saturation information and the degree of noise information corresponding to each configuration pixel of the input image from the input image region determining unit 310; and (b) the degree of saturation information and the degree of noise information corresponding to each configuration pixel of the corrected intermediate synthetic image from the intermediate synthetic image region determining unit 330.

The update method deciding unit 340 decides the update method of the intermediate synthetic image 113 using the input image 111 based on the input information.

Specifically, similarly to the above embodiment, the process of deciding the addition ratio β of the 3DNR synthesis processing result of the input image 111 and the intermediate synthetic image 113 and the pixel value of the corresponding pixel of the intermediate synthetic image 113 is performed.

The calculation process of the addition ratio β performed by the update method deciding unit 340 is the same process as the process described above with reference to FIG. 28.

The output image is a result of adding the 3DNR synthesis processing result of the input image 111 and the intermediate synthetic image 113 to the pixel value of the corresponding pixel of the intermediate synthetic image 113 according to the addition ratio β decided by the update method deciding unit 340. In other words, output image pixel value=(intermediate synthetic image pixel value)·β+(3DNR synthetic image pixel value)(1−β)

a pixel value calculated according to this formula is set as the pixel value of the output image.

The update method deciding unit 123 calculates the addition ratio β using the following respective information. In other words, (a) degree of saturation information and degree of noise information corresponding to each configuration pixel of the input image input from the input image region determining unit 121; and (b) degree of saturation information and degree of noise information corresponding to each configuration pixel of the corrected intermediate synthetic image input from the intermediate synthetic image region determining unit 122, an addition ratio β is calculated using the above information and output to an adding unit 353 of the image update processing unit 350.

A configuration and processing of the image update processing unit 350 will be described with reference to FIG. 30.

Figure 30:
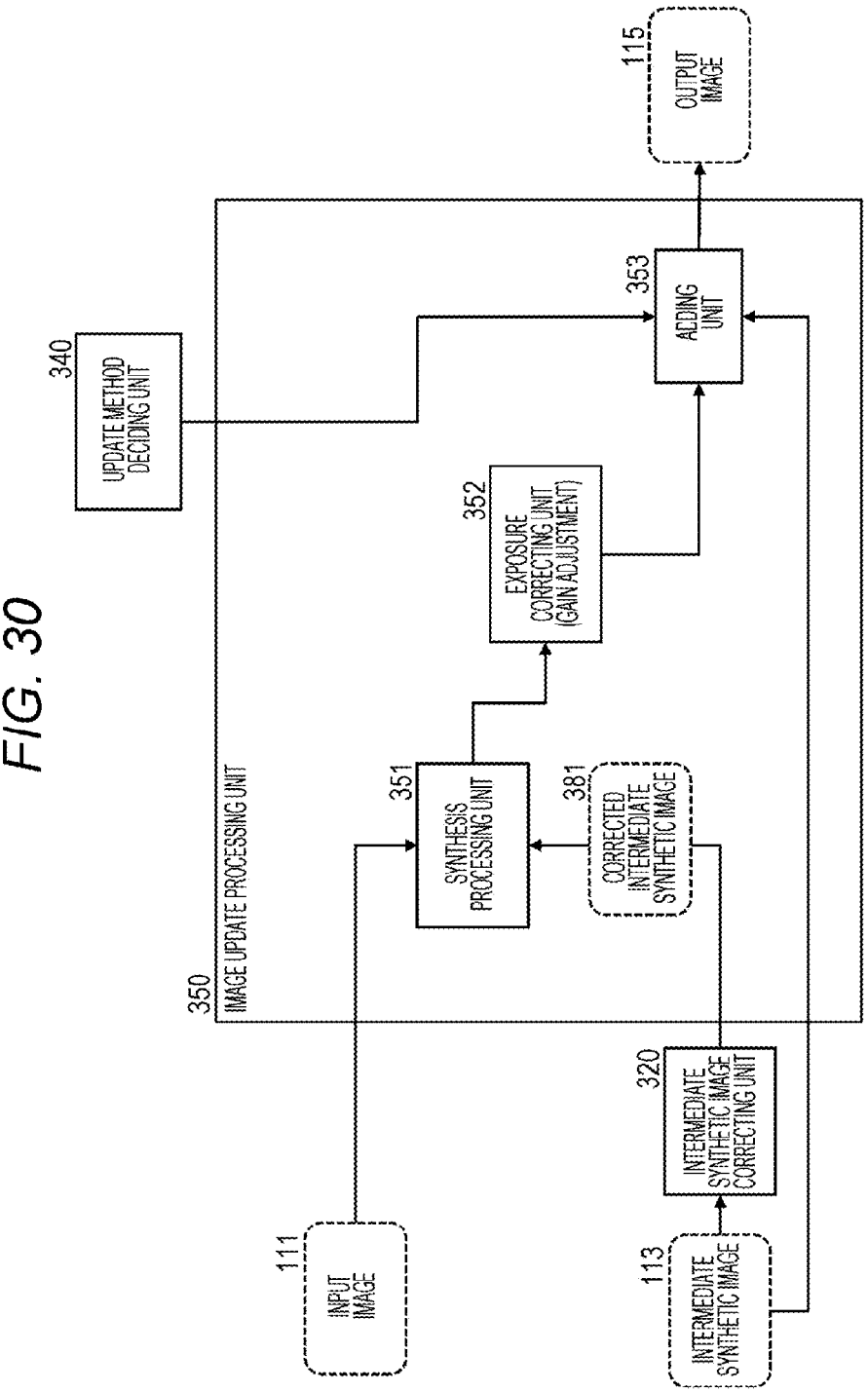
FIG. 30 is a diagram for describing a configuration and processing of an image update processing unit of an image processing device according to an embodiment of the present disclosure.

The image update processing unit 350 includes the synthesis processing unit 351, an exposure correcting unit 352, and the adding unit 353 as illustrated in FIG. 30.

The synthesis processing unit 351 receives the input image 111 and a corrected intermediate synthetic image 381 that is generated based on the intermediate synthetic image 113 by the intermediate synthetic image correcting unit 320.

As described above, the corrected intermediate synthetic image 381 is an image having the corrected pixel value ($I_{exp}$) when the intermediate synthetic image 113 is assumed to be photographed as the same condition as the input image 111.

The synthesis processing unit 351 performs the synthesis process (the 3DNR process) of the input image 111 and the corrected intermediate synthetic image 381. The synthesis process (3DNR) result image is input to the exposure correcting unit 352.

The exposure correcting unit 352 performs the exposure correction (the gain adjustment) of adjusting the synthesis process (3DNR) result image input from the synthesis processing unit 351 to the exposure condition of the output image 115 (=the exposure condition of the intermediate synthetic image 113). Further, the synthesis process (3DNR) result image input from the synthesis processing unit 351 is an image of the same exposure condition as that of the input image 111, for example, an image having various settings corresponding to the exposure condition of any of the WDR set. The pixel value correction process of correcting it to an image of the exposure condition of the output image 115 to be output and the same setting as the intermediate synthetic image is performed to generate the exposure-corrected 3DNR synthetic image, and the exposure-corrected 3DNR synthetic image is output to the adding unit 353.

The adding unit 353 receives the exposure-corrected 3DNR synthetic image input from the exposure correcting unit 352 and the intermediate synthetic image 113, and adds the pixels at the corresponding position of the two images according to the addition ratio β corresponding to each pixel decided by the update method deciding unit. In other words, output image pixel value=(intermediate synthetic image pixel value)·β+(3DNR synthetic image pixel value)(1−β)

a pixel value calculated according to this formula is set as the pixel value of the output image 115, and the output image 115 is generated.

The image update processing unit 350 performs such a process to generate the output image 115, and outputs the output image 115.

[5. Exemplary Overall Configuration of Image Processing Device]

Lastly, an exemplary overall configuration of an image processing device that performs the processes according to the above embodiments will be described.

Figure 31:
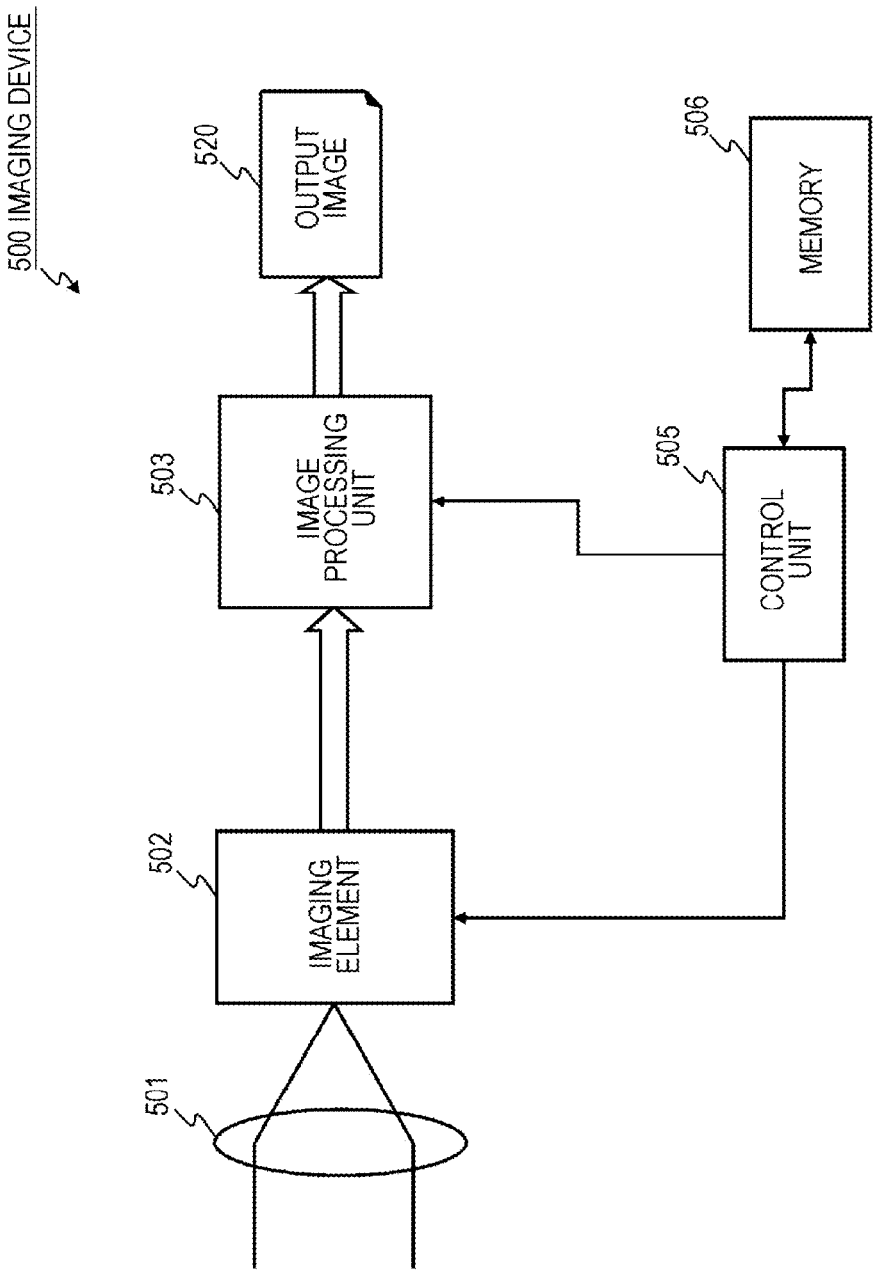
FIG. 31 is a diagram for describing an exemplary configuration of an image processing device according to an embodiment of the present disclosure.

FIG. 31 is a diagram illustrating an exemplary configuration of an imaging device 500 as an image processing device according to an embodiment of the present disclosure. Light incident through an optical lens 501 is incident on an imaging unit, for example, an imaging element 502 configured with a CMOS image sensor or the like, and image data obtained by photoelectric conversion is output. The output image data is input to an image processing unit 503.

The image processing unit 503 performs an output image generation process involving the processes according to the above embodiments, that is, the synthesis process of a plurality of images. Further, the image processing unit 503 performs general camera signal processing, for example, signal processing such as white balance (WB) adjustment and gamma correction on photographed data, and generates an output image 520. The output image 520 is stored in a storage unit (not illustrated). Alternatively, the output image is output to a display unit.

A control unit 505 outputs a control signal to the respective units according to a program stored, for example, in a memory 506, and performs control of various kinds of processes.

By using the image processing of the present disclosure, it is possible to perform a sequential synthesis while aligning an image photographed under a certain exposure condition with a synthetic image of up to an immediately previous frame.

Further, since the dynamic range expansion process can be performed at the same time as the noise reduction process, it is possible to generate the synthesis-processed image through a single alignment without performing the alignment process of each process individually. Thus, compared to a case where the dynamic range expansion process is simply connected with the noise reduction process, it is possible to reduce the circuit size and perform the process at low power consumption.

Further, as described above with reference to FIGS. 17 to 20, even when there is a moving subject, an image synthesis using an input image actively is performed, and thus it is possible to generate a synthetic image in which old image data does not remain.

[6. Conclusion of Configuration of Present Disclosure]

The embodiments of the present disclosure have been described above in detail with reference to the specific examples. However, it is obvious that a person skilled in the art can a modification or a substitution within the scope not departing from the gist of the present disclosure. In other words, since the present invention is disclosed in a form such as an example, it is not intended to be interpreted in a limited way. In order to determine the gist of the present disclosure, claims set forth below should be referred to.

Further, the technology disclosed in this specification may have the following configurations.

(1) An image processing device, including:

an image synthesis processing unit that sequentially receives continuous-photographed images photographed under different exposure conditions as an input image, performs a synthesis process of the input image and an intermediate synthetic image serving as a previously processed image, and generates an output image, wherein the image synthesis processing unit includes a region determining unit that classifies configuration pixels of the input image and the intermediate synthetic image into a noise pixel, an effective pixel, or a saturation pixel according to a threshold value, an update method deciding unit that decides a synthesis processing method of a pixel unit according to a combination of pixel classification results of the corresponding pixels of the input image and the intermediate synthetic image, and an image update processing unit that performs a synthesis process of the input image and the intermediate synthetic image according to an update method decided by the update method deciding unit, and generates the output image.

(2) The image processing device according to (1), wherein the input image is an image whose exposure condition is changed by changing an exposure period of time.

(3) The image processing device according to (1) or (2), wherein the update method deciding unit decides the following processes according to the combination of the pixel classification results of the corresponding pixels of the input image and the intermediate synthetic image:

(A) when at least one of the corresponding pixels of the input image and the intermediate synthetic image is the effective pixel, a process of performing a three-dimensional noise reduction (3DNR) process by a pixel value synthesis of the input image and the intermediate synthetic image and updating the pixel value of the intermediate synthetic image;

(B) when both of the corresponding pixels of the input image and the intermediate synthetic image are the saturation pixel or the noise pixel, a process of outputting the pixel value of the intermediate synthetic image without change without performing a synthesis using the input image; and (C) when the corresponding pixels of the input image and the intermediate synthetic image is a combination in which one is the saturation pixel, and the other is the noise pixel, (C1) the 3DNR process by the pixel value synthesis of the input image and the intermediate synthetic image, or (C2) the process of outputting the pixel value of the intermediate synthetic image without change without performing the synthesis using the input image, and the update method deciding unit decides the processes of (A) to (C) as the synthesis processing method of the pixel unit according to the combination of the pixel classification results of the corresponding pixels of the input image and the intermediate synthetic image.

(4) The image processing device according to (1) or (3), wherein the region determining unit receives photographing information including exposure period of time information of the input image, calculates the threshold value using the photographing information, and classifies the configuration pixels of the input image and the intermediate synthetic image into the noise pixel, the effective pixel, or the saturation pixel according to the calculated threshold value.

(5) The image processing device according to (4), wherein the photographing information includes an exposure period of time T, ISO sensitivity, and an F value of the input image, and the region determining unit calculates the threshold value using the exposure period of time T, the ISO sensitivity, and the F value of the input image.

(6) The image processing device according to any of (1) to (5), wherein the image update processing unit includes an exposure correcting unit that generates an exposure-corrected input image obtained by correcting the pixel value of the input image to a pixel value when an exposure process corresponding to the same exposure condition as the intermediate synthetic image is performed, and the image update processing unit sets the exposure condition of the intermediate synthetic image to the same exposure condition as an image having a largest exposure amount among a plurality of input images.

(7) The image processing device according to any of (1) to (6), wherein the image update processing unit includes an exposure correcting unit that generates an exposure-corrected input image obtained by correcting the pixel value of the input image to a pixel value when an exposure process corresponding to the same exposure condition as the intermediate synthetic image is performed among the continuous-photographed images, a synthesis processing unit that performs a synthesis process of corresponding pixels of the exposure-corrected input image and the intermediate synthetic image, and an output control unit that receives pixel unit update information decided by the update method deciding unit, and performs switching as to whether the pixel value of the intermediate synthetic image is output to the synthesis processing unit or the pixel value of the intermediate synthetic image is output as the pixel value of the output image without change according to the received information.

(8) The image processing device according to any of (1) to (7), wherein the image update processing unit includes an exposure correcting unit that generates an exposure-corrected input image obtained by correcting the pixel value of the input image to a pixel value when an exposure process corresponding to the same exposure condition as the intermediate synthetic image is performed, a synthesis processing unit that performs a synthesis process of corresponding pixels of the exposure-corrected input image and the intermediate synthetic image, and a selector that receives pixel unit update information decided by the update method deciding unit, and selects and outputs either of a synthesis processing result of the synthesis processing unit or the pixel value of the intermediate synthetic image as the pixel value of the output image according to the received information.

(9) The image processing device according to any of (1) to (8), wherein the region determining unit performs a smoothing process on each of the input image and the intermediate synthetic image, calculates a degree of pixel saturation and a degree of pixel noise corresponding to each of configuration pixels of a smoothed input image and a smoothed intermediate synthetic image, and outputs the degree of pixel saturation and the degree of pixel noise to the update method deciding unit.

(10) The image processing device according to (9), wherein the update method deciding unit calculates an addition ratio of the following pixel values (a) and (b) using the degree of pixel saturation and the degree of pixel noise:

(a) a 3DNR processed pixel value by the pixel value synthesis of the input image and the intermediate synthetic image; and (b) the pixel value of the intermediate synthetic image, and outputs the addition ratio to the image update processing unit, and the image update processing unit performs an addition process of the pixel values (a) and (b) according to the addition ratio, and decides the pixel value of the output image.

(11) The image processing device according to any of (1) to (10), wherein the image synthesis processing unit further includes an intermediate synthetic image correcting unit that corrects the intermediate synthetic image to a pixel value when the exposure condition is set to the exposure condition of the input image, and generates a corrected intermediate synthetic image, the region determining unit performs a smoothing process on each of the input image and the corrected intermediate synthetic image, calculates a degree of pixel saturation and a degree of pixel noise of each of configuration pixels of the respective images, and outputs the degree of pixel saturation and the degree of pixel noise to the update method deciding unit.

(12) The image processing device according to (11), wherein the update method deciding unit calculates an addition ratio of the following pixel values (a) and (b) using the degree of pixel saturation and the degree of pixel noise:

(a) a 3DNR processed pixel value by a pixel value synthesis of the input image and the corrected intermediate synthetic image; and (b) the pixel value of the intermediate synthetic image, and outputs the addition ratio to the image update processing unit, and the image update processing unit generates a 3DNR synthetic image by the pixel value synthesis of the input image and the corrected intermediate synthetic image, performs an exposure correction of correcting the generated 3DNR synthetic image to a pixel value when the exposure condition is set to the same exposure condition as the intermediate synthetic image, adds corresponding pixels of the generated exposure-corrected 3DNR synthetic image and the intermediate synthetic image according to the addition ratio, and decides the pixel value of the output image.

(13) An image processing method performed in an image processing device, including:

performing, by an image synthesis processing unit, an image synthesis process of sequentially receiving continuous-photographed images photographed under different exposure conditions as an input image, performing a synthesis process of the input image and an intermediate synthetic image serving as a previously processed image, and generating an output image, wherein the image synthesis processing unit performs, in the image synthesis process, a region determining process of classifying configuration pixels of the input image and the intermediate synthetic image into a noise pixel, an effective pixel, or a saturation pixel according to a threshold value, an update method deciding process of deciding a synthesis processing method of a pixel unit according to a combination of pixel classification results of the corresponding pixels of the input image and the intermediate synthetic image, and an image update process of performing a synthesis process of the input image and the intermediate synthetic image according to an update method decided by the update method deciding unit and generating the output image.

(14) A program causing an image processing device to execute image processing, the program causing an image synthesis processing unit to execute an image synthesis process of sequentially receiving continuous-photographed images photographed under different exposure conditions as an input image, performing a synthesis process of the input image and an intermediate synthetic image serving as a previously processed image, and generating an output image, wherein in the image synthesis process includes a region determining process of classifying configuration pixels of the input image and the intermediate synthetic image into a noise pixel, an effective pixel, or a saturation pixel according to a threshold value, an update method deciding process of deciding a synthesis processing method of a pixel unit according to a combination of pixel classification results of the corresponding pixels of the input image and the intermediate synthetic image, and an image update process of performing a synthesis process of the input image and the intermediate synthetic image according to an update method decided by the update method deciding unit and generating the output image.

Further, a series of processes described in this specification may be performed by hardware, software, or a combination thereof. When the process is performed by software, a program recording a processing sequence may be installed in a memory in a computer incorporated into dedicated hardware or installed in a general-purpose computer capable of performing various kinds of processes and executed. For example, the program may be recorded in a recording medium in advance. The program may be installed in a computer from the recording medium, and the program may be received via a network such as local area network (LAN) or the Internet and then installed in a recording medium such as an internal hard disk as well.

In addition, various kinds of processes described in this specification may be performed not only chronologically according to the description but also in parallel or individually according to processing performance of a device performing the processes or as necessary. Moreover, a system in this specification refers to a logical aggregation configuration of a plurality of devices, and is not limited to a form in which devices of respective configurations are arranged within the same housing.

INDUSTRIAL APPLICABILITY

As described above, according to a configuration of an embodiment of the present disclosure, it is possible to generate an image obtained by performing a noise reduction process and a dynamic range expansion process by a simple configuration through a sequential synthesis process using continuous-photographed images of different exposure conditions.

Specifically, continuous-photographed images of different exposure conditions are input, configuration pixels of an input image and an intermediate synthetic image are classified into a noise pixel, an effective pixel, or a saturation pixel, a synthesis processing method of a pixel unit is decided according to a combination of pixel classification results of the corresponding pixels, and the intermediate synthetic image is updated according to the decided method. A 3DNR process is performed when at least one of the corresponding pixels of the input image and the intermediate synthetic image is the effective pixel, the pixel value of the intermediate synthetic image is output without change when both of the corresponding pixels are the saturation pixel or the noise pixel, and the 3DNR process is performed, or the pixel value of the intermediate synthetic image is output when one of the corresponding pixels is the saturation pixel, and the other is the noise pixel.

Through the present configuration, it is possible to generate an image obtained by performing a noise reduction process and a dynamic range expansion process by a simple configuration through a sequential synthesis process using continuous-photographed images of different exposure conditions.

Further, as the process of the present disclosure is performed, when there is a moving subject in an image, an update process using a pixel value of an input image is likely to be performed on a moving subject region, and thus it is possible to reduce a remaining region of a previous image.

REFERENCE SIGNS LIST

11 Input image
12 Intermediate synthetic image
13 Output image
20 3DNR processing unit
21 Synthetic ratio calculating unit
22 Synthesis processing unit
31 Input image
32 Intermediate synthetic image
33 Output image
40 WDR processing unit
41 Synthetic ratio calculating unit
42 Synthesis processing unit
51 Input image
53 3DNR processing unit
54, 56 Frame memory
57 WDR processing unit
58 Output image
61 Input image
63, 64 Frame memory
65 WDR processing unit
67 3DNR processing unit
68 Frame memory
69 Output image
71, 72, 81, 82 Motion-compensated image generating unit
100 Image processing unit
101 Image synthesis processing unit
102 Image writing frame memory
103 Image reading frame memory
104 Motion-compensated image generating unit
111 Input image
112 Photographing information
113 Intermediate synthetic image
121 Input image region determining unit
122 Intermediate synthetic image region determining unit
123 Update method deciding unit
124 Image update processing unit
151 Exposure correcting unit
152 Output control unit
153 Synthesis processing unit
154 Selector
170 Image update processing unit
171 Exposure correcting unit
172 Synthesis processing unit
173 Adding unit
181 Smoothing processing unit
182 Saturation region determining unit
183 Noise region determining unit
191 Smoothing processing unit
192 Saturation region determining unit
193 Noise region determining unit
310 Input image region determining unit
311 Smoothing processing unit
312 Saturation region determining unit
313 Noise region determining unit
320 Intermediate synthetic image correcting unit
330 Synthetic image region determining unit
331 Smoothing processing unit
332 Saturation region determining unit
333 Noise region determining unit
340 Update method deciding unit
350 Image update processing unit
351 Synthesis processing unit
352 Exposure correcting unit
353 Adding unit
500 Imaging device
501 Optical lens
502 Imaging element
503 Image processing unit
505 Control unit
506 Memory
520 Output image

The invention claimed is:

1. An image processing device, comprising:
image synthesis processing circuitry that sequentially receives continuous-photographed images photographed under different exposure conditions as an input image, performs a synthesis process of the input image and an intermediate synthetic image serving as a previously processed image, and generates an output image,
wherein the image synthesis processing circuitry includes
region determining circuitry that classifies configuration pixels of the input image and the intermediate synthetic image into a noise pixel, an effective pixel, or a saturation pixel according to a threshold value,
update method deciding circuitry that decides a synthesis processing method of pixel circuitry according to a combination of pixel classification results of the corresponding pixels of the input image and the intermediate synthetic image, and
image update processing circuitry that performs a synthesis process of the input image and the intermediate synthetic image according to an update method decided by the update method deciding circuitry, and generates the output image;
wherein the region determining circuitry performs a smoothing process on each of the input image and the intermediate synthetic image, calculates a degree of pixel saturation and a degree of pixel noise corresponding to each of configuration pixels of a smoothed input image and a smoothed intermediate synthetic image, and outputs the degree of pixel saturation and the degree of pixel noise to the update method deciding circuitry;
wherein the update method deciding circuitry calculates an addition ratio of the following pixel values (a) and (b) using the degree of pixel saturation and the degree of pixel noise:
(a) a 3DNR processed pixel value by the pixel value synthesis of the input image and the intermediate synthetic image; and
(b) the pixel value of the intermediate synthetic image, and
outputs the addition ratio to the image update processing circuitry, and
the image update processing circuitry performs an addition process of the pixel values (a) and (b) according to the addition ratio, and decides the pixel value of the output image.

2. The image processing device according to claim 1,
wherein the input image is an image whose exposure condition is changed by changing an exposure period of time.

3. The image processing device according to claim 1,
wherein the update method deciding circuitry decides the following processes according to the combination of the pixel classification results of the corresponding pixels of the input image and the intermediate synthetic image:
(A) when at least one of the corresponding pixels of the input image and the intermediate synthetic image is the effective pixel, a process of performing a three-dimensional noise reduction (3DNR) process by a pixel value synthesis of the input image and the intermediate synthetic image and updating the pixel value of the intermediate synthetic image;
(B) when both of the corresponding pixels of the input image and the intermediate synthetic image are the saturation pixel or the noise pixel, a process of outputting the pixel value of the intermediate synthetic image without change without performing a synthesis using the input image; and
(C) when the corresponding pixels of the input image and the intermediate synthetic image is a combination in which one is the saturation pixel, and the other is the noise pixel,
(C1) the 3DNR process by the pixel value synthesis of the input image and the intermediate synthetic image, or
(C2) the process of outputting the pixel value of the intermediate synthetic image without change without performing the synthesis using the input image, and
the update method deciding circuitry decides the processes of (A) to (C) as the synthesis processing method of the pixel circuitry according to the combination of the pixel classification results of the corresponding pixels of the input image and the intermediate synthetic image.

4. The image processing device according to claim 1,
wherein the region determining circuitry receives photographing information including exposure period of time information of the input image, calculates the threshold value using the photographing information, and classifies the configuration pixels of the input image and the intermediate synthetic image into the noise pixel, the effective pixel, or the saturation pixel according to the calculated threshold value.

5. The image processing device according to claim 4,
wherein the photographing information includes an exposure period of time T, ISO sensitivity, and an F value of the input image, and the region determining circuitry calculates the threshold value using the exposure period of time T, the ISO sensitivity, and the F value of the input image.

6. The image processing device according to claim 1,
wherein the image update processing circuitry includes exposure correcting circuitry that generates an exposure-corrected input image obtained by correcting the pixel value of the input image to a pixel value when an exposure process corresponding to the same exposure condition as the intermediate synthetic image is performed, and
the image update processing circuitry sets the exposure condition of the intermediate synthetic image to the same exposure condition as an image having a largest exposure amount among a plurality of input images.

7. The image processing device according to claim 1,
wherein the image update processing circuitry includes
exposure correcting circuitry that generates an exposure-corrected input image obtained by correcting the pixel value of the input image to a pixel value when an exposure process corresponding to the same exposure condition as the intermediate synthetic image is performed,
synthesis processing circuitry that performs a synthesis process of corresponding pixels of the exposure-corrected input image and the intermediate synthetic image, and
output control circuit that receives pixel circuitry update information decided by the update method deciding circuit, and performs switching as to whether the pixel value of the intermediate synthetic image is output to the synthesis processing circuitry or the pixel value of the intermediate synthetic image is output as the pixel value of the output image without change according to the received information.

8. The image processing device according to claim 1,
wherein the image update processing circuitry includes
exposure correcting circuitry that generates an exposure-corrected input image obtained by correcting the pixel value of the input image to a pixel value when an exposure process corresponding to the same exposure condition as the intermediate synthetic image is performed,
synthesis processing circuitry that performs a synthesis process of corresponding pixels of the exposure-corrected input image and the intermediate synthetic image, and
a selector that receives pixel circuitry update information decided by the update method deciding circuitry, and selects and outputs either of a synthesis processing result of the synthesis processing circuitry or the pixel value of the intermediate synthetic image as the pixel value of the output image according to the received information.

9. The image processing device according to claim 1,
wherein the image synthesis processing circuitry further includes an intermediate synthetic image correcting circuitry that corrects the intermediate synthetic image to a pixel value when the exposure condition is set to the exposure condition of the input image, and generates a corrected intermediate synthetic image,
the region determining circuitry performs a smoothing process on each of the input image and the corrected intermediate synthetic image, calculates a degree of pixel saturation and a degree of pixel noise of each of configuration pixels of the respective images, and outputs the degree of pixel saturation and the degree of pixel noise to the update method deciding circuitry.

10. The image processing device according to claim 9,
wherein the update method deciding circuitry calculates an addition ratio of the following pixel values (a) and (b) using the degree of pixel saturation and the degree of pixel noise:
(a) a 3DNR processed pixel value by a pixel value synthesis of the input image and the corrected intermediate synthetic image; and
(b) the pixel value of the intermediate synthetic image, and outputs the addition ratio to the image update processing circuitry, and the image update processing circuitry generates a 3DNR synthetic image by the pixel value synthesis of the input image and the corrected intermediate synthetic image, performs an exposure correction of correcting the generated 3DNR synthetic image to a pixel value when the exposure condition is set to the same exposure condition as the intermediate synthetic image, adds corresponding pixels of the generated exposure-corrected 3DNR synthetic image and the intermediate synthetic image according to the addition ratio, and decides the pixel value of the output image.

11. An image processing method performed in an image processing device, comprising:

performing, by image synthesis processing circuitry, an image synthesis process of sequentially receiving continuous-photographed images photographed under different exposure conditions as an input image, performing a synthesis process of the input image and an intermediate synthetic image serving as a previously processed image, and generating an output image, wherein the image synthesis processing circuitry performs, in the image synthesis process, a region determining process of classifying configuration pixels of the input image and the intermediate synthetic image into a noise pixel, an effective pixel, or a saturation pixel according to a threshold value, an update method deciding process of deciding a synthesis processing method of a pixel circuitry according to a combination of pixel classification results of the corresponding pixels of the input image and the intermediate synthetic image, and an image update process of performing a synthesis process of the input image and the intermediate synthetic image according to an update method decided by the update method deciding process and generating the output image;

wherein the region determining process performs a smoothing process on each of the input image and the intermediate synthetic image, calculates a degree of pixel saturation and a degree of pixel noise corresponding to each of configuration pixels of a smoothed input image and a smoothed intermediate synthetic image, and outputs the degree of pixel saturation and the degree of pixel noise to the update method deciding process;

wherein the update method deciding process calculates an addition ratio of the following pixel values (a) and (b) using the degree of pixel saturation and the degree of pixel noise:

(a) a 3DNR processed pixel value by the pixel value synthesis of the input image and the intermediate synthetic image; and (b) the pixel value of the intermediate synthetic image, and outputs the addition ratio to the image update process, and the image update process performs an addition process of the pixel values (a) and (b) according to the addition ratio, and decides the pixel value of the output image.

12. A non-transitory computer readable medium having a program stored thereon causing an image processing device to execute image processing, the program causing image synthesis processing circuitry to execute an image synthesis process of sequentially receiving continuous-photographed images photographed under different exposure conditions as an input image, performing a synthesis process of the input image and an intermediate synthetic image serving as a previously processed image, and generating an output image, wherein in the image synthesis process includes a region determining process of classifying configuration pixels of the input image and the intermediate synthetic image into a noise pixel, an effective pixel, or a saturation pixel according to a threshold value, an update method deciding process of deciding a synthesis processing method of a pixel circuitry according to a combination of pixel classification results of the corresponding pixels of the input image and the intermediate synthetic image, and an image update process of performing a synthesis process of the input image and the intermediate synthetic image according to an update method decided by the update method deciding process and generating the output image;

wherein the region determining circuitry performs a smoothing process on each of the input image and the intermediate synthetic image, calculates a degree of pixel saturation and a degree of pixel noise corresponding to each of configuration pixels of a smoothed input image and a smoothed intermediate synthetic image, and outputs the degree of pixel saturation and the degree of pixel noise to the update method deciding process;

wherein the update method deciding circuitry calculates an addition ratio of the following pixel values (a) and (b) using the degree of pixel saturation and the degree of pixel noise:

(a) a 3DNR processed pixel value by the pixel value synthesis of the input image and the intermediate synthetic image; and (b) the pixel value of the intermediate synthetic image, and outputs the addition ratio to the image update processing circuitry, and the image update processing circuitry performs an addition process of the pixel values (a) and (b) according to the addition ratio, and decides the pixel value of the output image.

* * * * *